United States Patent
Arsalan et al.

(10) Patent No.: US 11,813,674 B2
(45) Date of Patent: Nov. 14, 2023

(54) METHODS FOR THE PRODUCTION OF NANOCOMPOSITES FOR HIGH TEMPERATURE ELECTROCHEMICAL ENERGY STORAGE DEVICES

(71) Applicant: Saudi Arabian Oil Company, Dhahran (SA)

(72) Inventors: Muhammad Arsalan, Dhahran (SA); Edreese Alsharaeh, Riyadh (SA); Nada Althubaiti, Riyadh (SA); Zahra Bayhan, Riyadh (SA); Yasmin Mussa, Riyadh (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 43 days.

(21) Appl. No.: 16/923,184

(22) Filed: Jul. 8, 2020

(65) Prior Publication Data

US 2021/0013492 A1   Jan. 14, 2021

Related U.S. Application Data

(60) Provisional application No. 62/871,785, filed on Jul. 9, 2019.

(51) Int. Cl.
*B22F 9/04* (2006.01)
*C01B 32/198* (2017.01)
(Continued)

(52) U.S. Cl.
CPC .............. *B22F 9/04* (2013.01); *C01B 21/064* (2013.01); *C01B 32/198* (2017.08); *C01G 51/04* (2013.01);
(Continued)

(58) Field of Classification Search
None
See application file for complete search history.

(56) References Cited

U.S. PATENT DOCUMENTS 8,557,916 B1   10/2013   Alsharaeh et al.
8,790,814 B2   7/2014   Wang et al.
(Continued)

FOREIGN PATENT DOCUMENTS

CN   104 649 700 A   5/2015
CN   106 398 179 A   2/2017
(Continued)

OTHER PUBLICATIONS

Li et al., Reduced Graphene Oxide/Boron Nitride Composite Film as a Novel Binder-Free Anode for Lithium Ion Batteries with Enhanced Performances, Jun. 2015, Electrochimica Acta, 166, 197-205 (Year: 2015).*
(Continued)

*Primary Examiner* — Daniel S Gatewood
(74) *Attorney, Agent, or Firm* — Osha Bergman Watanabe & Burton LLP

(57) ABSTRACT

Presented here are nanocomposites and electrochemical storage systems (e.g., rechargeable batteries and supercapacitors), which are resistant to thermal runaway and are safe, reliable, and stable electrode materials for electrochemical storage systems (e.g., rechargeable batteries and supercapacitors) operated at high temperature and high pressure, and methods of making the same.

15 Claims, 76 Drawing Sheets

(51) Int. Cl.

| | |
|---|---|
| C01B 21/064 | (2006.01) |
| C01G 51/04 | (2006.01) |
| H01M 4/1393 | (2010.01) |
| H01M 4/1397 | (2010.01) |
| H01M 4/36 | (2006.01) |
| H01M 10/0525 | (2010.01) |
| H01M 4/133 | (2010.01) |
| H01M 4/136 | (2010.01) |
| H01M 4/62 | (2006.01) |
| B82Y 30/00 | (2011.01) |
| B82Y 40/00 | (2011.01) |

(52) U.S. Cl.
CPC .......... *H01M 4/133* (2013.01); *H01M 4/136* (2013.01); *H01M 4/1393* (2013.01); *H01M 4/1397* (2013.01); *H01M 4/366* (2013.01); *H01M 4/625* (2013.01); *H01M 10/0525* (2013.01); *B22F 2009/043* (2013.01); *B82Y 30/00* (2013.01); *B82Y 40/00* (2013.01); *C01P 2004/64* (2013.01); *C01P 2004/80* (2013.01); *C01P 2006/40* (2013.01)

(56) References Cited

U.S. PATENT DOCUMENTS

| | | | |
|---|---|---|---|
| 9,029,228 B2 | 5/2015 | Seacrist et al. | |
| 9,203,084 B2 | 12/2015 | Wang et al. | |
| 9,362,549 B2 | 6/2016 | Rojeski et al. | |
| 9,368,831 B2 | 6/2016 | He et al. | |
| 9,705,136 B2 | 7/2017 | Rojeski | |
| 9,718,967 B2 | 8/2017 | Malshe | |
| 9,738,057 B2 | 8/2017 | Shin et al. | |
| 9,780,379 B2 | 10/2017 | Zhamu et al. | |
| 9,899,672 B2 | 2/2018 | Zhamu et al. | |
| 10,008,723 B1 | 6/2018 | Zhamu et al. | |
| 10,008,747 B1 | 6/2018 | Zhamu et al. | |
| 10,424,782 B2 | 9/2019 | Arsalan et al. | |
| 11,239,466 B2 | 2/2022 | Arsalan et al. | |
| 2010/0035093 A1 | 2/2010 | Ruoff et al. | |
| 2010/0218801 A1 | 9/2010 | Sung et al. | |
| 2011/0052998 A1 | 3/2011 | Liang et al. | |
| 2011/0086206 A1 | 4/2011 | Scheffer et al. | |
| 2011/0287316 A1 | 11/2011 | Lu et al. | |
| 2012/0142832 A1 | 6/2012 | Varma et al. | |
| 2013/0164635 A1 | 6/2013 | Schmidt et al. | |
| 2013/0180912 A1 | 7/2013 | Li | |
| 2013/0240830 A1 | 9/2013 | Seacrist et al. | |
| 2014/0106223 A1 | 4/2014 | Xu et al. | |
| 2016/0218353 A1 | 7/2016 | Kim et al. | |
| 2016/0344035 A1 | 11/2016 | Zhamu et al. | |
| 2017/0098856 A1* | 4/2017 | Zhamu | H01M 10/058 |
| 2017/0141387 A1 | 5/2017 | Hayner et al. | |
| 2017/0149051 A1 | 5/2017 | Fujita et al. | |
| 2017/0179475 A1 | 6/2017 | Lu et al. | |
| 2017/0294646 A1* | 10/2017 | Zhang | H01M 10/0566 |
| 2018/0248173 A1* | 8/2018 | Pan | H01M 4/366 |
| 2018/0248194 A1 | 8/2018 | Cheng et al. | |
| 2018/0286599 A1 | 10/2018 | Lin et al. | |
| 2019/0157665 A1 | 5/2019 | Pope et al. | |
| 2019/0214633 A1 | 7/2019 | Arsalan et al. | |
| 2019/0214634 A1 | 7/2019 | Arsalan et al. | |
| 2019/0214647 A1 | 7/2019 | Arsalan et al. | |
| 2021/0008628 A1 | 1/2021 | Arsalan et al. | |

FOREIGN PATENT DOCUMENTS

| | | |
|---|---|---|
| CN | 108 034 256 A | 5/2018 |
| CN | 109 182 856 A | 1/2019 |
| CN | 109762518 A | 5/2019 |
| EP | 2 578 539 A1 | 4/2013 |
| WO | WO-2017/033213 A1 | 3/2017 |
| WO | WO-2019/138271 A1 | 7/2019 |
| WO | WO-2019/138272 A1 | 7/2019 |
| WO | WO-2021/005535 A1 | 1/2021 |
| WO | WO-2021/005538 A1 | 1/2021 |

OTHER PUBLICATIONS

Byun et al, Ordered, Scalable Heterostructure Comprising Boron Nitride and Graphene for High-Performance Flexible Supercapacitors, Oct. 2016, Chem Mater, 28, 7750-7756 (Year: 2016).*

Song et al., "Advanced Sulfur Cathode Enabled by Highly Crumpled Nitrogen-Doped Graphene Sheets for High-Energy-Density Lithium-Sulfur Batteries," Nano Lett., 16:864-870 (2016).

International Search Report for PCT/IB2020/056431, 5 pages (dated Sep. 28, 2020).

International Search Report for PCT/IB2020/056436, 5 pages (dated Oct. 1, 2020).

Written Opinion for PCT/IB2020/056431, 11 pages (dated Sep. 28, 2020).

Written Opinion for PCT/IB2020/056436, 11 pages (dated Oct. 1, 2020).

Xu, J. et al., Sulfur-Graphene Nanostructured Cathodes via Ball-Milling for High-Performance Lithium-Sulfer Batteries, ACS Nano, 8(10): 10920-10930 (2014).

Aldalbahi, A. et al. Variations in Crystalline Structures and Electrical Properties of Single Crystalline Boron Nitride Nanosheets, Sci. Rep., 5: (16703): 1-9 (2015).

Alsharaeh, E.H. and Othman, A.A., Microwave Irradiation Synthesis and Characterization of RGO-AgNPs/Polystyrene Nanocomposites, Polymer Composites, 1-6 (2014).

Alsharaeh, E.H. et al., Evaluation of Nanomechanical Properties of (Styrene-Methyl Methacrylate) Copolymer Composites Containing Graphene Sheets, Ind. Eng. Chem. Res., 52: 17871-17881 (2013).

Alsharaeh, E.H. et al., Microwave Irradiation Effect on the Dispersion and Thermal: Stability of RGO Nanosheets within a Polystyrene Matrix, Materials, 7: 5212-5224 (2014).

Alsharaeh, E.H. et al., Novel synthesis of holey reduced graphene oxide (HRGO) by microwave irradiation method for anode in lithium-ion batteries, 6(29854): 1-13 (2016).

Byun, S. et al., Ordered, scalable heterostructure comprising boron nitride and graphene for high-performance flexible supercapacitors, Chemistry of Materials, 28:7750-7756 (2016).

Chen, T. et al., Self-Templated Formation of Interlaced Carbon Nanotubes Threaded Hollow Co3S4 Nanoboxes for High-Rate and Heat-Resistant Lithium-Sulfur Batteries, J. Am. Chem. Soc., 139:12710-12715 (2017).

Chiam, S. L. et al., Electrochemical Performance of Supercapacitor with Stacked Copper Foils Coated with Graphene Nanoplatelets. Sci. Rep. 8, 3093 (2018).

Conder, J. et al., Direct observation of lithium polysulfides in lithium—sulfur batteries using operando X-ray diffraction, Nat. Energy, 2: 201769 1-7 (2017).

Dean, C.R. et al., Boron nitride substrates for high quality graphene electronics, Nature Nanotechnology, 5: 722-726 (2010). Supplementary Information, 5 pages (2010).

Decker, R. et al., Local Electronic Properties of Graphene on a BN Substrate via Scanning Tunneling Microscopy, Nano Lett., 11: 2291-2295 (2011).

Deng, D. R. et al., Enhanced Adsorptions to Polysulfides on Graphene-Supported BN Nanosheets with Excellent Li-S Battery Performance in a Wide Temperature Range, ACS Nano, 12(11):11120-11129 (2018).

Fan, Y. et al., Functionalized Boron Nitride Nanosheets/Graphene Interlayer for Fast and Long-Life Lithium-Sulfur Batteries, Advanced Energy Materials, 7:1602380, 6 pages (2017).

Fu, L. et al., Microwave Irradiation-Assisted Exfoliation of Boron Nitride Nanosheets: A Platform for Loading High Density of Nanoparticles, ChemistrySelect, 1:1799-1803 (2016).

Gao, T. et al., Boron nitride/reduced graphene oxide nanocomposites as supercapacitors electrodes, Materials Letters, 159:54-57 (2015).

Golla, D. et al., Ultrafast relaxation of hot phonons in graphene-hBN heterostructures, APL Mater, 5: 056101 1-6 (2017).

(56) References Cited

OTHER PUBLICATIONS

Gyenes, B. et al., Understanding Anomalous Behavior in Coulombic Efficiency Measurements on Li-Ion Batteries, Journal of The Electrochemical Society, 162(3): A278-A283 (2015).
International Search Report for PCT/IB2018/056449, 5 pages (dated Nov. 23, 2018).
International Search Report for PCT/IB2018/056450, 5 pages (dated Dec. 11, 2018).
Ishigami, M. et al., Atomic Structure of Graphene on SiO2, Nano Letters, 7(6): 1643-1648 (2007).
Jing et al., Graphene, inorganic graphene analogs ant their composites for lithium ion batteries, J. Mater. Chem. A., 2:12104-12122 (2014).
Kang, Y, et al., Hybrids of reduced graphene oxide and hexagonal boron nitride: lightweight absorbers with tunable and highly efficient microwave attenuation properties, ACS applied materials & interfaces, 8:32468-32476 (2016).
Kayyar, A. Construction and Testing of Coin Cells of Lithium Ion Batteries, Journal of Visualized Experiments, 66(e4104): 1-5 (2012).
Kim, I. et al., Microwave-hydrothermal synthesis of boron/nitrogen co-doped graphene as an efficient metal-free electrocatalyst for oxygen reduction reaction, International Journal of Hydrogen Energy, 41:22026-22033 (2016).
Li, H. et al., Reduced Graphene Oxide/Boron Nitride Composite Film as a Novel Binder-Free Anode for Lithium Ion Batteries with Enhanced Performances, Electrochimica Acta, 166: 197-205 (2015).
Liang, Y. et al., Organic Electrode Materials for Rechargeable Lithium Batteries, Adv. Energy Mater., 2: 742-769 (2012).
Lin, D. et al., Reviving the lithium metal anode for high-energy batteries, Nature Nanotechnology, 12: 194-206 (2017).
Lin, Y. and Connell, J. W. Advances in 2D boron nitride nanostructures: nanosheets, nanoribbons, nanomeshes, and hybrids with graphene, Nanoscale, 4:6908-6939 (2012).
Liu, Y. et al., Synthesis of Composite Nanosheets of Graphene and Boron Nitride and Their Lubrication Application in Oil, Advanced Engineering Materials, 1700488 1-7 (2017).
Monajjem, Majid, Graphene/(h-BN)n/X-doped Graphene as Anode Material in Lithium Ion Batteries (X=Li, Be, B and N), Macedonian Journal of Chemistry and Chemical Engineering, 36(1):101-118 (2017).
Nakahara, K. et al., Rechargeable batteries with organic radical cathodes, Chemical Physics Letters, 359: 351-354 (2002).
Nesvadba, P. et al., Synthesis of A Novel Spirobisnitroxide Polymer and its Evaluation in an Organic Radical Battery, Chem. Mater., 22:783-788 783 (2010).
Pak, A. J. and Hwang, G. S., Theoretical Analysis of Thermal Transport in Graphene Supported on Hexagonal Boron Nitride: The Importance of Strong Adhesion Due to Bond Polarization, Phys. Rev., Appl. 6:034015 (2016).
Pan, M. et al., Modification of the electronic properties of hexagonal boron-nitride in BN/graphene vertical heterostructures, 2D Mater., 3:045002 (2016).
Pang, Q. et al., A Comprehensive Approach toward Stable Lithium—Sulfur Batteries with High Volumetric Energy Density, Adv. Energy Mater, 7: 1-9 (2017).
Park, M. et al., A review of conduction phenomena in Li-ion batteries, J. Power Sources, 1-26 (2010).
Patil, I. et al., Three dimensional nanocomposite of reduced graphene oxide and hexagonal boron nitride as an efficient metal-free catalyst for oxygen electroreduction. Journal of Materials Chemistry A, 4:4506-4515 (2016).
Rao, C.N.R. et al., Graphene Analogues of Inorganic Layered Materials, Angewandte Chemie International Edition, 52(50): 13162-13185 (2013).
Ren, G. et al., Bio-inspired CO3O4-polypyrrole-graphene complex as efficient oxygen reduction catalyst by one-step ball-milling, Nano Res., 1-8 (2015).
Saha, S. et al., Band gap engineering of boron nitride by graphene and its application as positive electrode material in asymmetric supercapacitor device, ACS applied materials & interfaces, 7:14211-14222 (2015).
Saha, S. et al., Investigation of band structure and electrochemical properties of h-BN/rGO composites for asymmetric supercapacitor applications, Materials Chemistry and Physics, 190: 53-165 (2017).
Saha, S. et al., Modified electrochemical charge storage properties of h-BN/rGO superlattice through the transition from n to p type semiconductor by fluorine doping, Chemical Engineering Journal, 339:334-345 (2018).
Sahoo, R., Pal, A. & Pal, T. 2D materials for renewable energy storage devices: Outlook and challenges. Chem. Commun. 52, 13528-13542 (2016).
Suga, T. and Nishide, H., Redox-Active Radical Polymers for a Totally Organic Rechargeable Battery, Chapter 3, Polymers for Energy Storage and Delivery: Polyelectrolytes for Batteries and Fuel Cells, Page, K., et al., American Chemical Society, 9 pages (2012).
Suga, T. et al., p- and n-Type Bipolar Redox-Active Radical Polymer: Toward Totally Organic Polymer-Based Rechargeable Devices with Variable Configuration, Adv. Mater., 23:751-754 (2011).
Sun, X. et al., Developing Polymer Composite Materials: Carbon Nanotubes or Graphene?, Adv. Mater., 25: 5153-5176 (2013).
Wang, L. et al., Convenient synthesis and applications of gram scale boron nitride nanosheets, Catal. Sci. Technol., 1:1119-1123 (2011).
Wang, Y. et al., Boron nitride nanosheets: large-scale exfoliation in methanesulfonic acid and their composites with polybenzimidazole, J. Mater. Chem, 21:11371-11377 (2011).
Written Opinion for PCT/IB2018/056449, 10 pages (dated Nov. 23, 2018).
Written Opinion for PCT/IB2018/056450, 11 pages (dated Dec. 11, 2018).
Xue, J. et al., STM Spectroscopy of ultra-flat graphene on hexagonal boron nitride, Nature Materials, 10: 282-285 (2011).
Xue, Y. et al., Excellent electrical conductivity of the exfoliated and fluorinated hexagonal boron nitride nanosheets, Nanoscale Research Letters, 8(49): 1-7 (2013).
Yan, K. et al., Ultrathin Two-Dimensional Atomic Crystals as Stable Interfacial Layer for Improvement of Lithium Metal Anode, Nano Lett., 1-7 (2014).
Yang, S. et al., Mechanical ball-milling preparation of mass sandwich-like cobalt-graphene nanocomposites with high electrochemical hydrogen storage ability, Journal of Materials Chemistry A, 1:6731-6735 (2013).
Yang, Y. et al., Graphene-based materials with tailored nanostructures for energy conversion and storage, Materials Science and Engineering R, 102: 1-72 (2016).
Zhang, Z. et al., Hexagonal boron nitride: a promising substrate for graphene with high heat dissipation, Nanotechnology, 28:225704 (2017).
Zhu, J. et al., Facile synthesis of metal oxide/reduced graphene oxide hybrids with high lithium storage capacity and stable cyclability, Nanoscale, 3:1084-1089 (2011).
Alsharaeh, E. H. and Othman, A. A., Facile Method for InSitu Preparation of STY-MMA Copolymer Containing Graphene Sheets Using MWI, Prepr. Pap-Am. Chem. Soc. Div. Pet. Chem., 57(1):142-147 (2012).
Liu, X. et al., Shape-controlled synthesis and properties of uniform spinel cobalt oxide nanocubes, Nanotech., 16:3035-3040 (2005).
Shearer, C.J. et al., Accurate thickness measurement of graphene, Nanotech., 27(125704):1-10 (2016).
Abruña, Héctor D., et al., "Batteries and electrochemical capacitors", Physics Today, American Institute of Physics, Dec. 2008, pp. 43-47.

* cited by examiner

METHODS FOR THE PRODUCTION OF NANOCOMPOSITES FOR HIGH TEMPERATURE ELECTROCHEMICAL ENERGY STORAGE DEVICES

CROSS REFERENCE TO RELATED APPLICATIONS

This application claims priority to and the benefit of U.S. Provisional Patent Application Ser. No. 62/871,785, filed on Jul. 9, 2019, entitled "METHODS FOR THE PRODUCTION OF METAL OXIDE/GRAPHENE/HEXAGONAL BORON NITRIDE NANOCOMPOSITES FOR HIGH TEMPERATURE ELECTROCHEMICAL ENERGY STORAGE DEVICES," the disclosure of which is incorporated herein by reference in its entirety.

BACKGROUND

Electrochemical energy storage devices, such as rechargeable batteries and supercapacitors are used to power a broad range of consumer devices such as electric vehicles and portable electronic devices. Electrochemical energy storage devices batteries are, however, susceptible to failure and can be unsafe under "abuse conditions" such as when a rechargeable battery is overcharged, over-discharged, or operated at high temperature and high pressure. For example, when operated at high temperature, a rechargeable battery can undergo "thermal runaway," which is when high temperatures trigger a chain of exothermic reactions in a battery, causing a rapid increase in battery temperature. Thermal runaway can cause battery failure, damage to devices, and harm to users. In particular, lithium-ion and lithium-sulfur rechargeable batteries can be prone to thermal runaway leading to fire and explosion because electrode materials (for example, anode and cathode materials) can be highly reactive and unstable. Even when thermal runaway does not occur, electrode materials used in rechargeable batteries can suffer from performance decay when operated at high temperatures. For example, lithium-based and silicon-based anode materials can suffer from a loss of capacity when operated at high temperatures.

Super capacitors provide an alternative candidate for electrochemical energy storage devices due to their high power density, safety, and long life cycles. However, currently available super capacitors are limited by low energy density (6-10 WH/kg) and poor cycling stability. Development of more energy dense and robust materials is required for effective commercialization of super capacitors as energy storage devices. One approach to designing improved super capacitor materials is the use of 2D materials, which have high surface-to-volume ratios, short diffusion paths, high mechanical strengths, and high conductivity; such properties result in a high specific ion storage capacity and facilitate accumulation and storage of ions by intercalation, providing materials which are excellent candidates for use in energy storage devices. For example, graphene exhibits characteristics highly desirable for use in a super capacitor; however, layers of sheets of 2D materials, such as graphene, tend to overlap and restack when fabricated into electrodes. Restacking of graphene sheets diminishes the capacitive nature of graphene and reduces cycling stability.

SUMMARY

There is a need for improved electrode materials (e.g., electrodes for lithium-sulfur batteries, supercapacitors and the like) which are resistant to thermal runaway and are safe, reliable, and stable when operated at conditions of high temperature and high pressure.

Presented here are nanocomposites, useful for incorporation into energy storage devices such as rechargeable batteries and supercapacitors that overcome the deficiencies of previous energy storage devices, and methods of preparing and using the same. In some embodiments, a nanocomposite is resistant to thermal runaway. In some embodiments, nanocomposites described here are useful as an electrode material in rechargeable batteries. In some embodiments, nanocomposites described here are useful as an electrode material in supercapacitors. In some embodiments, nanocomposites described here are safe, reliable, and stable when operated at high temperature and high pressure. In some embodiments, a nanocomposite includes two different two-dimensional (2D) materials, which, without wishing to be bound to any particular theory, act in synergy to produce desirable properties. In some embodiments, a nanocomposite includes (i) a 2D carbon material, and (ii) a 2D boron nitride (BN) material, which, without being bound to theory, act in synergy to provide an improved thermal stability, an increased surface area, and enhanced electrochemical properties to provided nanocomposites. In some embodiments, a nanocomposite includes reduced graphene oxide and boron nitride. In some embodiments, a nanocomposite includes graphene and boron nitride.

The present disclosure also recognizes that certain 2D materials, in combination, exhibit improved properties. For example, in some embodiments, a first 2D material and a second 2D material are less susceptible to restacking and loss of active surface area during operation over a broad temperature range or at high pressure, resulting in an increased operating life and improved tolerance to elevated temperatures and high pressure. Moreover, without wishing to be bound to any particular theory, it is understood that a second 2D material acts as a "substrate" for a first 2D material and effectively increases its carrier mobility and thus improves its electrochemical properties as an electrode material over a broad range of temperatures and under conditions of high pressure.

The present disclosure also encompasses the recognition that including a thermally stable two-dimensional (2D) material (for example, hexagonal boron nitride) in a nanocomposite results in a nanocomposite having certain improved properties, including at least thermal stability and electrochemical performance when used as an electrode material. For example, in certain embodiments, a thermally stable 2D material (for example, hexagonal boron nitride) acts in synergy with a second 2D material (for example, reduced graphene oxide) in a nanocomposite to enhance (i) thermal stability, (ii) mechanical properties (for example, strength), (iii) physical properties (for example, specific surface area), (iv) and electrochemical properties (for example, specific capacity, coulombic efficiency, cycling performance, and the like) of a corresponding electrode material. In some embodiments, 2D materials of nanocomposites of the present disclosure include a 2D carbon material (for example, graphene, graphene oxide, reduced graphene oxide, and the like), a 2D nitride (for example, hexagonal boron nitride and the like), a 2D metal chalcogenide (for example, $MoS_2$, $SnS_2$, $TiS_2$, $WS_2$, $MoSe_2$, or $WSe_2$), a 2D oxide (for example, $TiO_2$, $ZnO$, or $MnO_2$), or a 2D hybrid material (for example, $MoS_2$/graphene or $MoSe_2/MnO_2$).

In some embodiments, nanocomposites described in the present disclosure perform better, are more stable, and cost less than conventional electrode materials. For example, nanocomposites described in the present disclosure are stable at high temperatures (of about 150° C. or greater) and have consistent electrochemical properties even after 1,000 or more charge-discharge cycles at about 150° C. For example, in some embodiments, nanocomposites described in the present disclosure do not suffer from the characteristic capacity decay of silicon-based anodes after a few charge-discharge cycles at high temperature. For example, in some embodiments, nanocomposites described in the present disclosure have substantially the same (i.e., equal to or within 75% of) capacity after one or more charge-discharge cycles. In some embodiments, nanocomposites described in the present disclosure are prepared by methods based on ball-milling and calcination and are less costly than existing methods to prepare conventional anode materials. In some embodiments, nanocomposites described in the present disclosure are prepared by methods based on hydrothermal synthesis.

In another aspect, nanocomposites described in the present disclosure are also useful as components in electrochemical storage systems (e.g., rechargeable batteries and supercapacitors). In particular, electrochemical storage systems (e.g., rechargeable batteries and supercapacitors) described in the present disclosure provide safe and reliable power sources for devices operated at high temperatures and pressures. For example, in some embodiments, electrochemical storage systems (e.g., rechargeable batteries and supercapacitors) described in the present disclosure are useful as part of the downhole equipment used in the oil industry. In some embodiments, electrochemical storage systems (e.g., rechargeable batteries and supercapacitors) including nanocomposites described in the present disclosure exhibit improved performance and stability as compared to previous nanocomposites over a broad range of temperatures, including, for example 25° C. up to and including 150° C. or greater.

In some embodiments, electrochemical storage systems (e.g., rechargeable batteries such as lithium-sulfur batteries and supercapacitors) described in the present disclosure are less susceptible to failure than conventional batteries when operated at a high temperature. For example, in some embodiments, dendritic lithium, which is a major source of thermal runaway events in conventional anode materials, does not form in nanocomposites described in the present disclosure (in other words, in some embodiments, batteries of the present disclosure do not include dendritic lithium). For example, in some embodiments, at high temperatures, short circuit(s) in batteries of the present disclosure occur less frequently, or in some embodiments, not at all. In some embodiments, electrochemical storage systems (e.g., rechargeable batteries and supercapacitors) of the present disclosure do not undergo thermal runaway at temperatures of about 150° C. or greater. Accordingly, nanocomposites and electrochemical storage systems (e.g., rechargeable batteries and supercapacitors) described in the present disclosure can be used in safe energy-storage devices and in devices operated at high temperatures and pressure. For example, in some embodiments, electrochemical storage systems (e.g., rechargeable batteries and supercapacitors) described in the present disclosure can be used in the oil industry to power downhole equipment (for example, equipment used to monitor conditions in oil wells and other oil-related applications) where high temperatures and pressure are encountered.

BRIEF DESCRIPTION OF THE DRAWING

The drawing is presented in the present disclosure for illustration purposes, without intention of limiting scope of subject matter described in the present disclosure.

The foregoing and other objects, aspects, features, and advantages of the present disclosure will become more apparent and better understood by referring to the following description taken in conjunction with the accompanying drawing, in which.

DEFINITIONS

Figure 1:
FIG. 1 is a photograph of composite solutions for preparation of Samples 1 to 5, according to an illustrative embodiment.

Throughout the specification, several terms are employed that are defined in the following paragraphs. Other definitions may also be found within the body of the specification.

About, Approximately: As used in the present disclosure, the terms "about" and "approximately," in reference to a number, are used to include numbers that fall within a range of 20%, 10%, 5%, 1%, or 0.5% in either direction of (greater than or less than) the number unless otherwise stated or otherwise evident from the context (except where such number would exceed 100% of a possible value).

Anode: As used in the present disclosure, the term "anode" refers to the negative electrode of a battery. Oxidation reactions occur at the anode.

Carrier Mobility: As used in the present disclosure, the term "carrier mobility" refers to a metric of how quickly an electron or hole can be transported through a material in the presence of an electric field. For example, an electrode with an increased carrier mobility tends to have an increased conductivity and improved electrochemical properties compared to an electrode with a decreased carrier mobility.

Cathode: As used in the present disclosure, the term "cathode" refers to the positive electrode of a battery. Reduction reactions occur at the cathode.

Capacity, specific capacity, specific charge capacity: As used in the present disclosure, the term "capacity" means the product of the discharge current (for example, in amps (A) or milliamps/milliamperes (mA)) and the discharge time (for example, in hours (h)) for a battery at a given load. For example, in some embodiments, a "capacity" is expressed in amp-hours (Ah) or milliamp-hours (mAh). As used in the present disclosure, the term "specific capacity" means the product of the discharge current and the discharge time of a battery at a given load for a given weight of electrode material (for example, for a given weight of nanocomposite used as an anode material in a battery). For example, in some embodiment, a "specific capacity" is expressed in amp-hours per gram (Ah/g) or milliamp-hours per gram (mAh/g). In some embodiments, "specific capacity" is referred to as "specific discharge capacity." As used in the present disclosure, the term "specific charge capacity" means the product of the charge current and the charge time for a battery at a given load for a given weight of electrode material (for example, for a given weight of nanocomposite used as an anode material). For example, in some embodiments, a "specific charge capacity" is expressed in Ah/g or mAh/g.

Charge-discharge cycle, Cycle: As used in the present disclosure, the terms "charge-discharge cycle" and "cycle" refer to the process of charging, discharging, or both a battery. For example, a single "charge-discharge cycle" includes charging and discharging a battery. In some embodiments, a battery is discharged either fully or partially during a discharge cycle. For example, in some embodiments, 100%, 90%, 80%, 70%, or less of a battery's capacity is discharged during a discharge cycle. In some embodiments, a battery is charged either fully or partially during a charge cycle. For example, in some embodiments, a battery is charged to 100%, 90%, 80%, 70%, or less of its full capacity during a charge cycle.

Downhole equipment: As used in the present disclosure, the term "downhole equipment" refers to devices used to measure conditions inside an oil well. For example, in some embodiments, downhole equipment includes a pressure sensor for measuring pressure inside an oil well. In some embodiments, downhole equipment includes a temperature sensor for measuring temperature inside an oil well. In some embodiments, downhole equipment includes a pressure sensor and a temperature sensor. As used in the present disclosure, the term "oil well" means a boring (for example, a drilled hole or tunnel) in the earth that is designed to bring hydrocarbons (for example, oil) from an underground hydrocarbon reservoir to the surface.

Graphene oxide: As used in the present disclosure, the term "graphene oxide" refers to a material substantially composed of ultrathin sheets of a compound of/carbon, oxygen, and hydrogen, where each sheet has a thickness defined by a monolayer of carbon rings (for example, a layer of carbon rings approximately one atom thick, with attached oxygen-containing moieties on the edges of the carbon rings, above the plane of carbon rings, below the plane of carbon rings, or combinations of these). In some embodiments, carbon, oxygen, and hydrogen are present in variable ratios. In some embodiments, carbon, oxygen, and hydrogen are present in the same or substantially similar ratios. In some embodiments, graphene oxide is obtained by treating graphite with strong oxidizers. In some embodiments, graphene oxide includes a dopant. In some embodiments, graphene oxide does not include a dopant. Examples of dopants include boron and nitrogen.

High Pressure: As used in the present disclosure, the term "high pressure" refers to a pressure of greater than atmospheric pressure (1 atmosphere). For example, an oil well is typically under conditions of high pressure during oil recovery because of the high temperature of the well, hydrostatic pressure from the column of water extending from the well bore to the oil-bearing formation, pressure induced by pumping fluid in and out of the reservoir, and internal sources of pressure such as from the gases and fluids in the reservoir. Examples of high pressure are, for example, at least 1 atmosphere, at least 10 pounds per square inch gauge (psig), at least 50 psig, at least 100 psig, at least 200 psig, at least 500 psig, at least 1000 psig, at least 2000 psig, at least 3000 psig, or at least 5000 psig.

High Temperature: As used in the present disclosure, the term "high temperature" refers to a temperature from about 80° C. to about 150° C. For example, in some embodiments, an oil reservoir, during drilling or oil recovery, has a temperature of 80° C. to 150° C. or greater (for example, greater than 80° C., greater than 100° C., greater than 120° C., greater than 150° C.).

Improve, Increase, Reduce, Decrease: As used in the present disclosure, the terms "improve", "increase", "reduce, "decrease", or their grammatical equivalents, indicate values that are relative to a baseline or other reference measurement. In some embodiments, an appropriate reference measurement may be or include a measurement under particular reference conditions (for example, at a temperature near an average ambient temperature) absent the presence of (for example, prior to) a particular change in these conditions (for example, a change in temperature). For example, in some embodiments, when a material exhibits "improved thermal stability," it has a greater thermal stability than a reference material, such that thermal decomposition occurs at a temperature that is at least 5° C., or 10° C., or 25° C., or 50° C., or 100° C. greater than the temperature at which the reference material decomposes. Similarly, in some embodiments, an "increase" in temperature refers to the raising of a temperature from a baseline value to a greater temperature, for example, a temperature that is at least 5° C., or 10° C., or 20° C., or 30° C., or 50° C., or 100° C. greater than the baseline temperature. In some embodiments, when, for example, the moisture content of a material is "reduced," the moisture content of that material is of a lesser value after subjected to certain conditions relative to the moisture content of the material prior to being subjected to those conditions, such that the moisture content of the material after being subjected to certain conditions is at least 1%, or 5%, or 10%, or 15%, or 20%, or 25%, or 30%, or 40% or 50%, or 60%, or 70%, or 80%, or 90%, or 100% less than prior to treatment. Similarly, in some embodiments, a "decrease" in particle size, for example, refers to a change in the size of particles after being subjected to certain conditions, such that the treated particles are at least 1%, or 5%, or 10%, or 15%, or 20%, or 25%, or 30%, or 40%, or 50%, or 60%, or 70%, or 80%, or 90%, or 95% smaller by volume than the size of the particles prior to treatment.

Nanocomposite: As used in the present disclosure, the term "nanocomposite" refers to a material that contains at least one nanoparticle and at least one additional agent or ingredient. In some embodiments, a nanocomposite contains a substantially uniform collection of nanoparticles.

Restacking: As used in the present disclosure, the term "restacking" refers to a change in confirmation of 2D carbon materials due to strong $\pi$-$\pi$ interactions, for example, formation of graphite-like powders from ordered graphene sheets when such 2D materials are processed into electrode materials. Restacking results in a reduced specific surface area and decreased efficiency of electrochemical energy storage. In some embodiments, nanocomposites described in the present disclosure are less susceptible to restacking and loss of active surface area during operation over a broad temperature range or at high pressure.

Stable: As used in the present disclosure, the term "stable" refers to physical properties that do not substantially change or deteriorate in performance over a usable lifetime. For example, in some embodiments, a stable nanocomposite does not undergo substantial physical changes during a predetermined useable lifetime of the product in which the nanocomposite is used. For example, in some embodiments, a stable electrode of an electrochemical storage system (e.g., a rechargeable battery or supercapacitor) substantially retains its charge capacity after repeated use. For example, in some embodiments, an electrochemical storage system described in the present disclosure has substantially the same (e.g., equal to or within 75% of) capacity after one or more charge-discharge cycles.

Substantially: As used in the present disclosure, the term "substantially" refers to the qualitative condition of exhibiting total or near-total extent or degree of a characteristic or property, where "near-total" means within 20%, 10%, 5%, 1%, or 0.5% of the total (in either direction). For example, as used in the present disclosure, a material that is "substantially composed of", for example, an ultrathin sheet, refers to a material that is 100%, or 99.5%, or 99%, or 95%, or 90%, or 80% composed of the specified ultrathin sheet. Similarly, a "substantially uniform collection of nanoparticles" refers to, for example, a collection of nanoparticles that are composed of 100% uniform nanoparticles, or 99.5% or 99% or 95% or 90% or 80% of uniform nanoparticles. Similarly, properties that are "not substantially changed" refers to properties that are stable because they are 100%, or 99.5% or 99%, or 90%, or 80% the same after being subjected to certain conditions.

Two-dimensional (2D) material: As used in the present disclosure, the term "2D material" refers to a material substantially composed of ultrathin sheets having a thickness defined by a monolayer approximately one atom thick. For example, in some embodiments, graphene and hexagonal boron nitride are two-dimensional materials. In some embodiments, a 2D material includes a dopant. In some embodiments, a 2D material does not include a dopant. Examples of dopants include carbon, boron, and nitrogen.

Thermal Stability: As used in the present disclosure, the term "thermal stability" refers to a measure of the extent to which a material is stable at high temperature. For example, in some embodiments, an electrode material with a superior thermal stability will remain stable at high temperature, while an electrode material with an inferior thermal stability will likely undergo changes (for example, chemical or structural transformations) leading to decreased performance.

DETAILED DESCRIPTION

It is contemplated that systems, architectures, devices, methods, and processes described in the present disclosure encompass variations and adaptations developed using information from the embodiments described in the present disclosure. Adaptation, modification, or both of the systems, architectures, devices, methods, and processes described in the present disclosure may be performed, as contemplated by this description.

Throughout the description, where articles, devices, systems, and architectures are described as having or including specific components, or where processes and methods are described as having or including specific steps, it is contemplated that, additionally, there are articles, devices, systems, and architectures of the present disclosure that consist essentially of, or consist of, the recited components, and that there are processes and methods according to the present disclosure that consist essentially of, or consist of, the recited processing steps.

The mention in the present disclosure of any publication, for example, in the Background section, is not an admission that the publication serves as prior art with respect to any of the claims presented in the present disclosure. The Background section is presented for purposes of clarity and is not meant as a description of prior art with respect to any claim.

Headers are provided for the convenience of the reader— the presence, placement, or both of a header is not intended to limit the scope of the subject matter described in the present disclosure.

Presently, there is a need for electrode materials and electrochemical systems (e.g., rechargeable batteries and supercapacitors) which are resistant to thermal runaway and are safe, reliable, and stable when operated at conditions of high temperature and high pressure. Such materials are useful in high stress situations, such as in the oil and drilling industry, where tools are frequently used at high temperatures and pressures. For example, nanocomposites that are useful in high stress situations such as oil recovery and drilling, and batteries including such nanocomposites are described in the present disclosure.

Nanocomposites

In one aspect, the present disclosure provides nanocomposites useful for incorporation into electrochemical storage systems (e.g., rechargeable batteries and supercapacitors), and methods of preparing and using the same, that overcome the deficiencies of previous electrochemical storage systems (e.g., rechargeable batteries and supercapacitors), described above. In some embodiments, nanocomposites of the present disclosure are resistant to thermal runaway. In some embodiments, nanocomposites of the present disclosure are useful as an electrode material in electrochemical storage systems (e.g., rechargeable batteries and supercapacitors). In some embodiments, nanocomposites described here are safe, reliable, and stable when operated at high temperature and high pressure. In some embodiments, a nanocomposite includes two different two-dimensional (2D) materials, which, without wishing to be bound to any particular theory, act in synergy to produce desirable properties, such as increased resistance to thermal runaway, and improved thermal stability. In some embodiments, a nanocomposite includes (i) a 2D carbon material, and (ii) a 2D boron nitride (BN) material, which, without being bound to theory, act in synergy to provide an improved thermal stability, an increased surface area, and enhanced electrochemical properties to provided nanocomposites. In some embodiments, a nanocomposite includes reduced graphene oxide and boron nitride. In some embodiments, a nanocomposite includes graphene and boron nitride.

In some embodiments, a nanocomposite includes hexagonal boron nitride sheets and graphene sheets. In some embodiments, such a nanocomposite provides improved thermal properties and improved electrochemical properties when used as an electrode material in electrochemical storage systems (e.g., rechargeable batteries and supercapacitors). For example, in some embodiments, a nanocomposite in which a weight percent of graphene is in a range from 0.1% to 99.9% and a weight percent of hexagonal boron nitride is in a range from 0.1% to 99.9% exhibits an enhanced specific surface area, an improved specific charge/discharge capacity, or a stable cycling performance at both room temperature (for example, about 25° C.) and at high temperatures (for example, at about 150° C. or greater), or any combination of these properties.

Without wishing to be bound to any particular theory, it is thought that thermal, mechanical, and chemical properties of hexagonal boron nitride provide benefits to nanocomposites and batteries described in the present disclosure relative to reduced graphene oxide or graphene alone. For example, in some embodiments, superior thermal stability of hexagonal boron nitride compared to that of common carbon materials helps to prevent thermal runaway events. For example, in some embodiments, when graphene and boron nitride are combined, chemical properties of boron nitride improve carrier mobility (for example, electron mobility) of graphene via a substrate effect. For example, in some embodiments, a nanocomposite that includes both graphene and boron nitride materials has an increased carrier mobility (and thus improved electrochemical properties) compared to that of a nanocomposite that includes graphene or boron nitride alone.

Additionally, without wishing to be bound to any particular theory, use of two different 2D materials (for example, graphene and hexagonal boron nitride) in a nanocomposite prevents restacking of 2D materials when a nanocomposite is used as an anode material. For example, in some embodiments, nanocomposites described in the present disclosure are less prone to restacking during charging and discharging, resulting in retention of desirable physical and electrochemical properties. For example, in some embodiments, a nanocomposite retains its large surface area and its superior specific capacity even after many (for example, 1,000 or more) charge-discharge cycles. For example, in some embodiments, a nanocomposite has substantially the same (e.g., equal to or within 75% of) capacity after many charge-discharge cycles (e.g., 500 or more, 1,000 or more).

In some embodiments, the present disclosure is related to nanocomposites including two different 2D materials. In some embodiments, 2D materials of nanocomposites of the present disclosure include a 2D carbon material (for example, graphene, graphene oxide, reduced graphene oxide, and the like), a 2D nitride (for example, hexagonal boron nitride and the like), a 2D metal chalcogenide (for example, $MoS_2$, $SnS_2$, $TiS_2$, $WS_2$, $MoSe_2$, or $WSe_2$), a 2D oxide (for example, $TiO_2$, $ZnO$, or $MnO_2$), or a 2D hybrid material (for example, $MoS_2$/graphene or $MoSe_2$/$MnO_2$). In some embodiments, a first 2D material is a 2D carbon material and a second 2D material is a 2D nitride. In some embodiments, a nanocomposite includes (i) a 2D carbon material, and (ii) a 2D boron nitride (BN) material. Without being bound by theory, it is theorized that such 2D materials act in synergy to provide improved thermal stability, an increased surface area, and enhanced electrochemical properties to provided nanocomposites. In some embodiments, a nanocomposite includes reduced graphene oxide and hexagonal boron nitride. In some embodiments, a nanocomposite includes graphene and hexagonal boron nitride. In some embodiments, a nanocomposite includes graphene oxide and hexagonal boron nitride.

In some embodiments, a 2D carbon material makes up about 99.9% or less (for example, 0% to about 99.9%) of a nanocomposite by weight. In some embodiments, a 2D carbon material makes up 0.1% to 99.9% of a nanocomposite by weight. In some embodiments, a 2D carbon material makes up 0.1% to 70% of a nanocomposite by weight. In some embodiments, a 2D carbon material makes up 0.1% to 50% of a nanocomposite by weight. In some embodiments, a 2D carbon material makes up 0.1% to 30% of a nanocomposite by weight. In some embodiments, a 2D carbon material makes up 0.1% to 20% of a nanocomposite by weight. In some embodiments, a 2D carbon material makes up about 10% to about 90% of a nanocomposite. In some embodiments, a 2D carbon material makes up about 10% to about 50% of a nanocomposite. In some embodiments, a 2D carbon material makes up about 30% to about 70% of a nanocomposite. In some embodiments, a 2D carbon material makes up about 50% to about 90% of a nanocomposite. In some embodiments, a 2D carbon material makes up about 10% to about 30% of a nanocomposite. In some embodiments, a 2D carbon material makes up about 5% to about 70% of a nanocomposite by weight. In some embodiments, a 2D carbon material makes up about 10% to about 60% of a nanocomposite by weight.

In some embodiments, reduced graphene oxide makes up about 99.9% or less of a nanocomposite by weight. In some embodiments, graphene makes up about 99.9% or less of a nanocomposite by weight. In some embodiments, graphene oxide makes up about 99.9% or less of a nanocomposite by weight.

In some embodiments, reduced graphene oxide makes up about 0.1% to about 99.9% of a nanocomposite by weight. In some embodiments, graphene makes up about 0.1% to about 99.9% of a nanocomposite by weight. In some embodiments, graphene oxide makes up about 0.1% to about 99.9% of a nanocomposite by weight. In some embodiments, reduced graphene oxide makes up about 10% to about 90% of a nanocomposite by weight. In some embodiments, graphene makes up about 10% to about 90% of a nanocomposite by weight. In some embodiments, graphene oxide makes up about 10% to about 90% of a nanocomposite by weight.

In some embodiments, a 2D boron nitride makes up about 99.9% or less of a nanocomposite by weight (for example, 0% to about 99.9%). In some embodiments, a 2D boron nitride is hexagonal boron nitride (h-BN). In some embodiments, hexagonal boron nitride makes up 99.9% or less of a nanocomposite by weight (for example, 0% to about 99.9%). In some embodiments, hexagonal boron nitride makes up 0.1% to 99.9% of a nanocomposite by weight. In some embodiments, hexagonal boron nitride makes up about 0.1% to about 70% of a nanocomposite by weight. In some embodiments, hexagonal boron nitride makes up about 0.1% to about 50% of a nanocomposite by weight. In some embodiments, hexagonal boron nitride makes up about 0.1% to about 30% of a nanocomposite by weight. In some embodiments, hexagonal boron nitride makes up about 0.1% to 20% of a nanocomposite by weight. In some embodiments, h-BN makes up about 10% to about 90% of a nanocomposite. In some embodiments, h-BN makes up about 10% to 50% of a nanocomposite. In some embodiments, h-BN makes up about 30% to 70% of a nanocomposite. In some embodiments, h-BN makes up about 50% to 90% of a nanocomposite. In some embodiments, h-BN makes up about 10% to 30% of a nanocomposite. In some embodiments, hexagonal boron nitride makes up about 5% to 70% of a nanocomposite by weight. In some embodiments, hexagonal boron nitride makes up about 10% to 60% of a nanocomposite by weight.

In some embodiments, a nanocomposite has a weight ratio of 2D carbon material to hexagonal boron nitride material of between about 10:90 and about 90:10. In some embodiments, a nanocomposite has a weight ratio of 2D carbon material to hexagonal boron nitride material of between about 10:90 and about 50:50. In some embodiments, a nanocomposite has a weight ratio of 2D carbon material to hexagonal boron nitride material of between about 50:50 and about 90:10. In some embodiments, a nanocomposite has a weight ratio of 2D carbon material to hexagonal boron nitride material of about 10:90, about 30:70, about 50:50, about 70:30, or about 90:10. In some embodiments, a nanocomposite has a weight ratio of 2D carbon material to hexagonal boron nitride material of about 10:90. In some embodiments, a nanocomposite has a weight ratio of 2D carbon material to hexagonal boron nitride material of about 30:70. In some embodiments, a nanocomposite has a weight ratio of 2D carbon material to hexagonal boron nitride material of about 50:50. In some embodiments, a nanocomposite has a weight ratio of 2D carbon material to hexagonal boron nitride material of about 70:30. In some embodiments, a nanocomposite has a weight ratio of 2D carbon material to hexagonal boron nitride material of about 90:10.

In some embodiments, a nanocomposite also includes sulfur. In some embodiments, a nanocomposite is made up of between 40% and 90% sulfur by weight. For example, in some embodiments, a nanocomposite is made up of 55% to 65% sulfur by weight. For example, in some embodiments, a nanocomposite is made up of 65% to 75% sulfur by weight. For example, in some embodiments, a nanocomposite is made up of 75% to 85% sulfur by weight.

Preparation of Nanocomposites by Ball-Milling and Calcination (Method 1)

In another aspect, the present disclosure is related to methods of preparing a nanocomposite including steps of: ball-milling a mixture including a 2D carbon material and a 2D boron nitride; and calcinating the mixture.

In some embodiments, a 2D carbon material is selected from reduced graphene oxide, graphene, graphene oxide, or combinations thereof. In some embodiments, a 2D carbon material is selected from reduced graphene oxide, graphene, or combinations thereof. In some embodiments, a 2D carbon material is reduced graphene oxide. In some embodiments, a 2D carbon material is graphene. In some embodiments, a 2D carbon material is graphene oxide.

In some embodiments, a 2D boron nitride is hexagonal boron nitride.

In some embodiments, a mixture is ball-milled for less than 1 hour. In some embodiments, a mixture is ball-milled for at least 20 minutes. In some embodiments, a mixture is ball-milled for about 20 to 90 minutes. In some embodiments, a mixture is ball-milled for about 30 to 90 minutes. In some embodiments, a mixture is ball-milled for about 30 to 60 minutes. In some embodiments, a mixture is ball-milled for about 1 to 3 hours. In some embodiments, a mixture is ball-milled for about 1 to 5 hours. In some embodiments, a mixture is ball-milled for about 1 to 7 hours. In some embodiments, a mixture is ball-milled for about 3 to 5 hours. In some embodiments, a mixture is ball-milled for about 3 to 7 hours. In some embodiments, a mixture is ball-milled for about 3 to 9 hours. In some embodiments, a mixture is ball-milled for about 5 to 10 hours. In some embodiments, a mixture is ball-milled for about 7 to 12 hours. In some embodiments, a mixture is ball-milled for about 10 to 24 hours.

In some embodiments, a mixture is ball-milled at a speed of greater than 500 rpm. In some embodiments, a mixture is ball-milled at a speed of about 500 to 2500 rpm. In some embodiments, a mixture is ball-milled at a speed of about 1000 to 2500 rpm. In some embodiments, a mixture is ball-milled at a speed of about 1000 to 2000 rpm. In some embodiments, a mixture is ball-milled at a speed of about 1200 to 1800 rpm. In some embodiments, a mixture is ball-milled at a speed of about 1275 to 1725 rpm.

In some embodiments, calcination (for example, a calcination step) is performed at a temperature (for example, the calcination temperature) of about 200° C. to 500° C. In some embodiments, calcination is performed at a temperature of about 300° C. to 750° C. In some embodiments, calcination is performed at a temperature of about 325° C. to 500° C. In some embodiments, calcination is performed at a temperature of about 325° C. to 375° C. In some embodiments, calcination is performed at a temperature of about 325° C. to 350° C. In some embodiments, calcination is performed at a temperature of about 340° C. to 360° C. In some embodiments, calcination is performed at a temperature of about 345° C. to 355° C. In some embodiments, calcination is performed at a temperature of about 350° C. to 375° C. In some embodiments, calcination is performed at a temperature of about 350° C. to 550° C. In some embodiments, calcination is performed at a temperature of about 500° C. to 1000° C. In some embodiments, calcination is performed at a temperature of about 500° C. to 750° C.

In some embodiments, an oven used for calcination is heated at a rate of about 1 to 15° C./min until calcination temperature is reached. In some embodiments, an oven used for calcination is heated at a rate of about 1 to 10° C./min until calcination temperature is reached. In some embodiments, an oven used for calcination is heated at a rate of about 1 to 7° C./min until calcination temperature is reached. In some embodiments, an oven used for calcination is heated at a rate of about 1 to 5° C./min until calcination temperature is reached. In some embodiments, an oven used for calcination is heated at a rate of about 1 to 3° C./min until calcination temperature is reached. In some embodiments, an oven used for calcination is heated at a rate of about 3 to 15° C./min until calcination temperature is reached. In some embodiments, an oven used for calcination is heated at a rate of about 3 to 10° C./min until calcination temperature is reached. In some embodiments, an oven used for calcination is heated at a rate of about 3 to 7° C./min until calcination temperature is reached. In some embodiments, an oven used for calcination is heated at a rate of about 5 to 20° C./min until calcination temperature is reached. In some embodiments, an oven used for calcination is heated at a rate of about 7 to 13° C./min until calcination temperature is reached.

In some embodiments, a calcination step is performed for about 1 to 10 hours. In some embodiments, a calcination step is performed for about 1 to 7 hours. In some embodiments, a calcination step is performed for about 1 to 5 hours. In some embodiments, a calcination step is performed for about 3 to 7 hours. In some embodiments, a calcination step is performed for about 2 to 5 hours.

In some embodiments, a method includes a second ball-milling step after calcination, wherein a mixture is ball-milled with sulfur. In some embodiments, in a second ball milling step, a mixture is ball-milled for less than 1 hour. In some embodiments, in a second ball milling step, a mixture is ball-milled for at least 20 minutes. In some embodiments, in a second ball milling step, a mixture is ball-milled for about 20 to 90 minutes. In some embodiments, in a second ball milling step, a mixture is ball-milled for about 30 to 90 minutes. In some embodiments, in a second ball milling step, a mixture is ball-milled for about 30 to 60 minutes. In some embodiments, in a second ball milling step, a mixture is ball-milled for about 1 to 3 hours. In some embodiments, a mixture is ball-milled for about 1 to 5 hours. In some embodiments, in a second ball milling step, a mixture is ball-milled for about 1 to 7 hours. In some embodiments, in a second ball milling step, a mixture is ball-milled for about 3 to 5 hours. In some embodiments, in a second ball milling step, a mixture is ball-milled for about 3 to 7 hours. In some embodiments, in a second ball milling step, a mixture is ball-milled for about 3 to 9 hours. In some embodiments, in a second ball milling step, a mixture is ball-milled for about 5 to 10 hours. In some embodiments, in a second ball milling step, a mixture is ball-milled for about 7 to 12 hours. In some embodiments, in a second ball milling step, a mixture is ball-milled for about 10 to 24 hours.

In some embodiments, in a second ball milling step, a mixture is ball-milled at a speed of greater than 500 rpm. In some embodiments, in a second ball milling step, a mixture is ball-milled at a speed of about 500 to 2500 rpm. In some embodiments, in a second ball milling step, a mixture is ball-milled at a speed of about 1000 to 2500 rpm. In some embodiments, in a second ball milling step, a mixture is ball-milled at a speed of about 1000 to 2000 rpm. In some embodiments, in a second ball milling step, a mixture is ball-milled at a speed of about 1200 to 1800 rpm. In some embodiments, in a second ball milling step, a mixture is ball-milled at a speed of about 1275 to 1725 rpm.

Preparation of Nanocomposites by Hydrothermal Synthesis (Method 2)

In some aspects, the present disclosure provides methods of preparing a nanocomposite including steps of: preparing a first solution of graphene oxide in a first volume of a first solvent; preparing a second solution of boron nitride in a second volume of a second solvent; combining the first and second solutions to form a combined solution; applying microwave irradiation to heat the combined solution to a temperature for a period of time; and drying the combined solution, thereby providing a nanocomposite.

Preparing Precursor(s) to 2D Material(s)—Preparing a First 2D Material

Figure 43A:
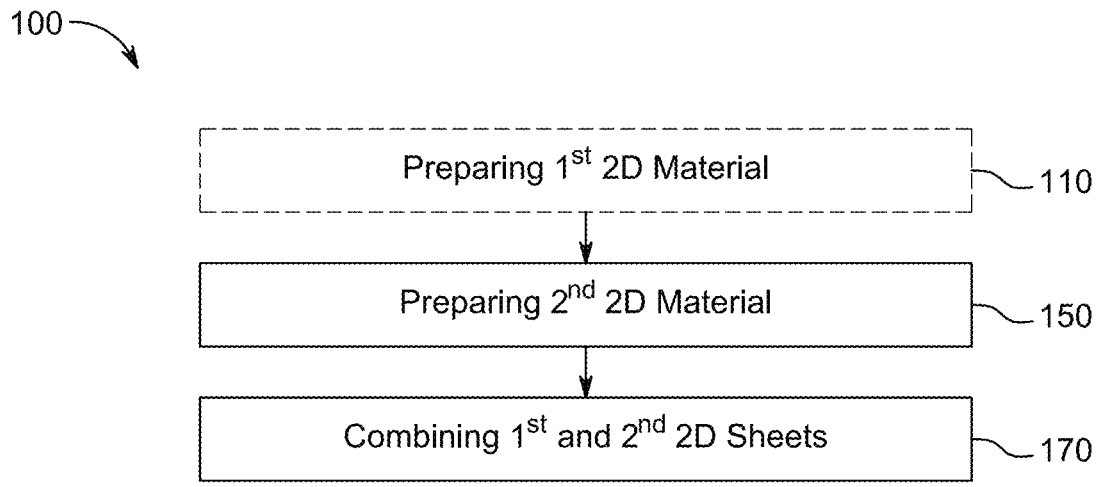
FIG. 43A is a block diagram showing a method for preparing a nanocomposite, according to an illustrative embodiment.

FIG. 43A shows an illustrative example of a method 100 for preparing a nanocomposite, according to an illustrative embodiment. In some embodiments, the method, optionally, begins with preparing a precursor to a first 2D material in Step 110. As an illustrative example of this step, FIG. 43B shows an example method 102 for preparing graphene oxide from graphite.

Figure 43B:
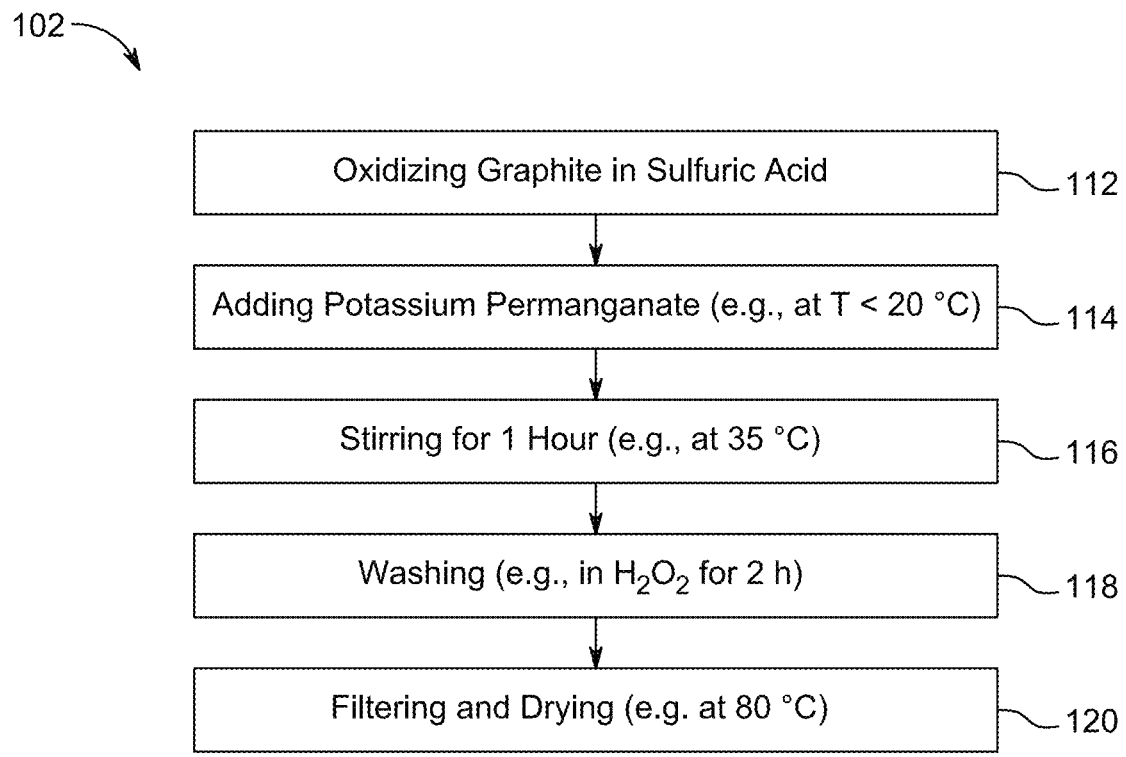
FIG. 43B is a block diagram showing a method for preparing a first 2D material, according to an illustrative embodiment.

As shown in illustrative example FIG. 43B, graphite is oxidized in sulfuric acid (Step 112). Concentration of graphite is about 5 milligrams per milliliter (mg/mL) or more. For example, concentration of added graphite may be in a range from about 5 mg/mL to about 20 mg/mL. Concentration of sulfuric acid is at least 1 mole per liter (mol/L). For example, concentration of sulfuric acid may be in a range from 1 mol/L to 3 mol/L.

In Step 114, potassium permanganate is added to a mixture that was prepared in Step 112. Potassium permanganate is added to achieve a final concentration of potassium permanganate of at least 1 mol/L. For example, concentration of potassium permanganate may be in a range from 1 mol/L to 2 mol/L. In Step 114, potassium permanganate is added to a mixture prepared in Step 112 at a volume ratio of 1:1 (volume potassium permanganate solution:volume of sulfuric acid solution). In some embodiments, a mixture prepared in Step 112 is cooled to 20° C. or less prior to addition of potassium permanganate.

In Step 116, a mixture prepared in Step 114 is stirred or mixed. For example, a mixture may be stirred for 5 minutes (min), 10 min, 30 min, 1 hour, 12 hours, or a similar time interval. For example, a mixture may be stirred mechanically, agitated with a magnetic stir bar, or exposed to ultrasonic irradiation. A method of stirring may be selected to correspond to size of vessel used to prepare a mixture in Step 112 and Step 114. Mixing or stirring in Step 116 may be performed at a temperature in a range from about 30° C. to 40° C.

Following Step 116, oxidation was completed in Step 118. For example, solids in a mixture are separated from liquids (for example, via centrifugation and removal of the supernatant). Solids are then redispersed in a reaction fluid to complete oxidation reaction. In some embodiments, a reaction fluid includes hydrogen peroxide ($H_2O_2$). Concentration of hydrogen peroxide in a reaction fluid is at least 0.1 mol/L. For example, in some embodiments, concentration of hydrogen peroxide is in a range from 0.1 mol/L to 0.3 mol/L. In some embodiments, a reaction fluid includes sodium percarbonate. Graphene oxide is produced after Step 118.

After reaction of Step 118 is completed, a solid product is separated from a reaction fluid and dried to obtain a graphene oxide powder in Step 120. In some embodiments, solid material is isolated using centrifugation, filter paper, vacuum filtration, or combinations of these. In some embodiments, a solid material is dried at room temperature or at 50° C., 60° C., 70° C., or 80° C. to obtain a dry powder of graphene oxide. In some such embodiments, a solid material is dried for 1 hour, 2 hours, 6 hours, 12 hours, 24 hours, or similar intervals of time.

In some embodiments, preparation of graphene oxide is not be required. For example, graphene oxide may be purchased (for example, as a dry powder or dispersed in a fluid) and used as-received. In some embodiments, graphene oxide sheets may be modified before use. For example, graphene oxide may be washed, purified, filtered, dried, or combinations of the same before further use.

Preparing Precursor(s) to 2D Material(s)—Preparing a Second 2D Material

Figure 43C:
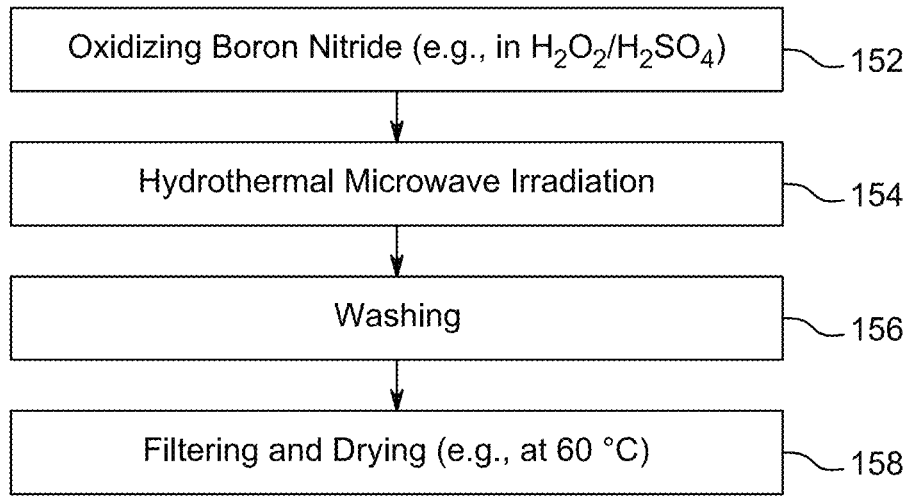
FIG. 43C is a block diagram showing a method for preparing a second 2D material, according to an illustrative embodiment.

In some embodiments, a second 2D material may be prepared by oxidation. For example, in Step 152 of method 106, as shown in an illustrative embodiment of FIG. 43C, boron nitride is oxidized. In some embodiments, boron nitride is oxidized in a mixture of hydrogen peroxide and sulfuric acid. In some embodiments, a mixture of hydrogen peroxide and sulfuric acid has a volumetric ratio of hydrogen peroxide to sulfuric acid ($H_2O_2:H_2SO_4$) in a range from 1:0.5 to 1:3. In some embodiments, boron nitride is added to a solution to achieve a concentration in a range from 0.5 mg/mL to 12 mg/mL. In some embodiments, hexagonal boron nitride is purchased from a commercial source and used as received.

Following Step 152, in some embodiments, a mixture is stirred or mixed. For example, a mixture may be stirred for 5 min, 10 min, 30 min, 1 hour, 12 hours, or a similar interval of time. For example, a mixture may be stirred mechanically, agitated with a magnetic stir bar, exposed to ultrasonic irradiation, or combinations of these. For example, a method of stirring may be selected to correspond to size of vessel used to prepare a second 2D material in method 106.

Step 154 of example method 106 includes hydrothermal microwave irradiation of a mixture from Step 152. In Step 154, a mixture is exposed to microwaves under a high pressure at a high temperature. In some embodiments, a mixture is heated (for example, in an autoclave) to a temperature of at least 140° C. For example, in some embodiments, a mixture is heated to a temperature in a range from 140° C. to 220° C. For example, in some embodiments, a mixture is heated to a temperature 180° C. During Step 154, in some embodiments, a mixture is held in a vessel (for example, an autoclave) at a pressure of at least 150 psi. For example, in some embodiments, a mixture is held in a vessel at a pressure in a range from 150 psi to 350 psi. In Step 154, in some embodiments, a mixture is irradiated with microwaves at a power in a range from 900 W to 1800 W. In some embodiments, hydrothermal microwave irradiation in Step 154 is performed for a reaction time in a range from 30 minutes to 60 minutes or more.

In Step 156, a mixture is washed. For example, solids in a mixture are separated from liquids based on density (for example, by centrifugation and removal of supernatant). In some embodiments, solids are then redispersed in a washing fluid to remove residual materials from solid product. In some embodiments, such process is repeated multiple times. In some embodiments, a washing fluid includes distilled water, another solvent (for example, an organic solvent), one or more salts, an acid (for example, dilute hydrochloric acid), or combinations of these.

After a solid material is washed in Step 156, it is, in some embodiments, separated from a washing fluid and dried to obtain a functionalized boron nitride powder in Step 158. In some embodiments, a solid material is isolated using centrifugation, filter paper, vacuum filtration, or combinations of these. For example, in some embodiments, a material is dried at room temperature or at a temperature of 30° C., 40° C., 50° C., or 60° C. to obtain a dry powder of a 2D material. For example, in some embodiments, a product is dried for 1 hour, 2 hours, 6 hours, 12 hours, 24 hours, or similar intervals of time.

In some embodiments, a second 2D material is a 2D carbon material (for example, graphene, graphene oxide, or reduced graphene oxide), a 2D nitride (for example, functionalized boron nitride or hexagonal boron nitride), a 2D metal chalcogenide (for example, $MoS_2$, $SnS_2$, $TiS_2$, $WS_2$, $MoSe_2$, or $WSe_2$), a 2D oxide (for example, $TiO_2$, ZnO, $MnO_2$, or a perovskite), or a 2D hybrid material (for example, $MoS_2$/graphene or $MoSe_2/MnO_2$). For example, in some embodiments, a second 2D material is hexagonal boron nitride, boron nitride, or functionalized boron nitride (for example, functionalized via chemical oxidation (Step 152) and hydrothermal microwave irradiation (Step 154), as shown in FIG. 1D).

Mixing Materials and Drying

A first 2D material sample from Step 110 and a second 2D material from Step 150 are contacted together (for example, added to a solvent and mixed) in Step 170 of method 100. For example, in some embodiments, a first 2D material prepared in Step 110 is added to a volume of solvent along with a second 2D material prepared in Step 150. As an illustrative example of this step, FIG. 43D shows example method 108 for combining materials prepared in Step 110 and Step 150 to form a nanocomposite.

Figure 43D:
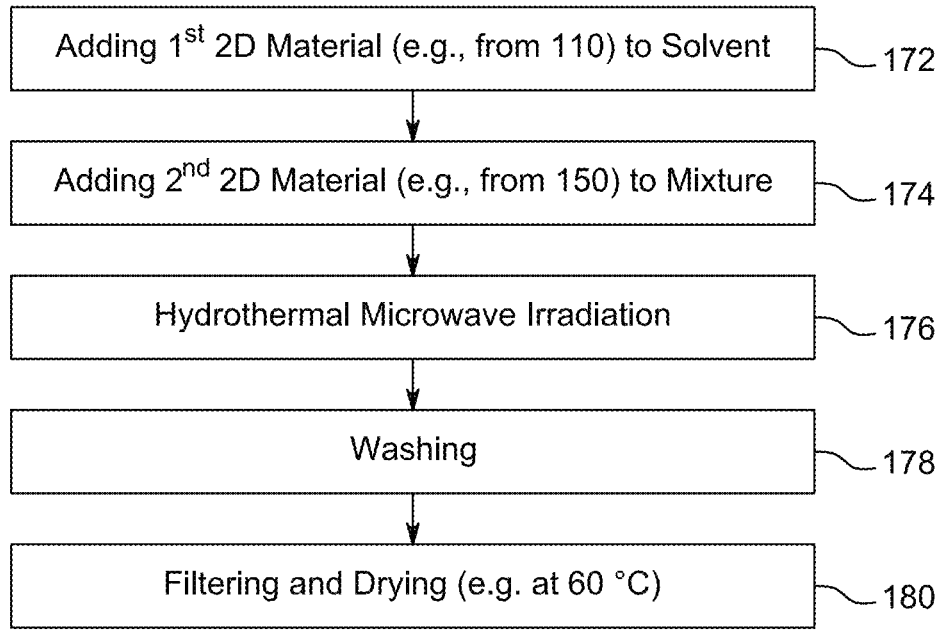
FIG. 43D is a block diagram showing a method for combining a first 2D material with a second 2D material, according to an illustrative embodiment.

As shown in FIG. 43D, a first 2D material sample is dispersed in a solvent (Step 172). In some embodiments, a solvent is ethanol, distilled water, isopropyl alcohol, acetone, dimethylformamide, or combinations of these. In some embodiments, a first 2D material sample is added to a solvent at a concentration in a range from 1 mg/mL to 3 mg/mL. In some embodiments, a mixture obtained in Step 172 is stirred or mixed. For example, in some embodiments, a mixture is stirred for 5 min, 10 min, 30 min, 1 hour, 12 hours, or a similar interval of time. In some embodiments, a mixture is stirred mechanically, agitated with a magnetic stir bar, exposed to ultrasonic irradiation, or combinations of the same. In some embodiments, a method of stirring is selected to correspond to size of vessel in which a first 2D material is added to solvent in Step 172.

In Step 174, a second 2D material (for example, from Step 150 of FIG. 43A) are added to a mixture prepared in Step 172. In some embodiments, a second 2D material (for example, hexagonal boron nitride) is dispersed in a fluid (for example, water, a salt solution, or a solvent), and this mixture is added to a mixture from Step 172. Alternatively, a dry powder of a second 2D material may be added to a mixture from Step 172. In some embodiments, a second 2D material is added to achieve a concentration of at least 1 mg/mL of a second 2D material in a mixture. For example, in some embodiments, a concentration of a second 2D material in a mixture prepared in Step 174 is in a range from 1 mg/mL to 3 mg/mL.

Step 176 of example method 108 includes hydrothermal microwave irradiation of a mixture from Step 174. In some embodiments, a mixture from Step 174 is exposed to microwaves under a high pressure at a high temperature. In some embodiments, a mixture is heated (for example, in an autoclave) to a temperature of at least 140° C. For example, in some embodiments, a mixture may be heated to a temperature in a range from 140° C. to 220° C. For example, in some embodiments, a mixture may be heated to a temperature 180° C. In some embodiments, a mixture is held in a vessel (for example, an autoclave) at a pressure of at least 150 psi. For example, in some embodiments, a mixture is held in a vessel at a pressure in a range from 150 psi to 350 psi. In some embodiments, a mixture is irradiated with microwaves at a power in a range from 900 W to 1800 W. In some embodiments, hydrothermal microwave irradiation is performed for a reaction time in a range from 30 minutes to 60 minutes or more.

In Step 178, a mixture is washed. Solids in a mixture are separated from liquids based on density (for example, by centrifugation and removal of supernatant fluid). In some embodiments, solids are then dispersed in a washing fluid to remove residual materials from solid product. In some embodiments, this process is repeated multiple times. In some embodiments, a washing fluid may include distilled water, another solvent (for example, an organic solvent), one or more salts, an acid (for example, dilute hydrochloric acid), or combinations of these.

In some embodiments, after a solid material is washed in Step 178, it is separated from washing fluid and dried to obtain a powder of a final nanocomposite in Step 180. In some embodiments, a solid material is isolated using centrifugation, filter paper, vacuum filtration, or combinations of these. For example, in some embodiments, a material may be dried at room temperature or at a temperature of 30° C., 40° C., 50° C., or 60° C. to obtain a dry powder of a nanocomposite. For example, in some embodiments, a product may be dried for 1 hour, 2 hours, 6 hours, 12 hours, 24 hours, or a similar interval of time.

Without wishing to be bound to any particular theory, it is thought that the thermal, mechanical, and chemical properties of a second 2D material (for example, hexagonal boron nitride), in some embodiments, provides benefits to nanocomposites and batteries described in the present disclosure. For example, it is believe that, in some embodiments, superior thermal stability of hexagonal boron nitride compared to that of common carbon materials helps to prevent thermal runaway events. In some embodiments, when a first 2D material and second 2D material are combined, chemical properties of a second 2D material (for example, hexagonal boron nitride) may improve carrier mobility (for example, electron mobility) of a first 2D material (for example, reduced graphene oxide) via a substrate effect. For example, a nanocomposite that includes both a first 2D material and a second 2D material may have an increased carrier mobility (and thus improved electrochemical properties) compared to that of a nanocomposite that includes a first 2D material or second 2D material alone.

It is thought, without wishing to be bound to any particular theory, that use of two different 2D materials (for example, reduced graphene oxide and hexagonal boron nitride) in a nanocomposite may prevent restacking of 2D materials when a nanocomposite is used as an electrode material. For example, nanocomposites described in the present disclosure are, in some embodiments, believed to be less prone to restacking during charging and discharging, resulting in retention of desirable physical and electrochemical properties. For example, a nanocomposite retains its large surface area and its superior specific capacity even after many (for example, 1,000 or more) charge/discharge cycles. For example, in some embodiments, a nanocomposite has substantially the same (e.g., equal to or within 75% of) capacity after many charge-discharge cycles (e.g., 500 or more, 1,000 or more).

Electrode Formulation

In some embodiments of the present disclosure an electrode is prepared by a method including step of: mixing a nanocomposite described in the present disclosure with one or more conductive agents, a binding agent, and an optional additive in a solvent to obtain a slurry; coating a foil substrate with the slurry to form a film; and drying the film under vacuum. In some embodiments, a film is dried at 60 to 140° C.

In some embodiments of the present disclosure an electrode is prepared by a method including step of: dispersing one or more conductive agents in a solvent to prepare a first solution; preparing a second solution of a binding agent with an optional additive in a solvent; dispersing a nanocomposite described in the present disclosure in a solvent to prepare a third solution; mixing the first, second, and third solutions to obtain a slurry; coating a foil substrate with the slurry to form a film; and drying the film under vacuum. In some embodiments, a nanocomposite is dried at 60 to 140° C. prior to being dispersed in the solvent.

In some embodiments, a conductive agent is selected from the group consisting of carbon black, C-NERGY™ Super C65®, C-NERGY™ SFG6L, Super P®, a carbon nanotube-based material and combinations of the same. In some embodiments, conductive agents include carbon black.

In some embodiments, a binding agent is polyvinylidene fluoride, a polyvinylidene fluoride resin (for example, Kynar® HSV900), or styrene butadiene. In some embodiments, a binding agent includes a polyvinylidene resin. In some embodiments, a binding agent includes polyvinylidene fluoride. In some embodiments, a binding agent comprises a polyvinylidene fluoride resin.

In some embodiment, a solvent includes a mixture of dimethyl sulfoxide and ethanol. In some such embodiments, a solvent includes equal volumes of dimethyl sulfoxide and ethanol. In some embodiments, a mixture of DMSO and ethanol is a 2:1 mixture by volume. In some embodiments, a mixture of DMSO and ethanol is a 1:2 mixture by volume. In some embodiments, a solvent includes N-methyl-2-pyrrolidone.

In some embodiments, an additive is oxalic acid.

Supercapacitor and Lithium Sulfur Batteries

In some embodiments, nanocomposites described in the present disclosure are useful as electrode materials in electrochemical storage systems (e.g., lithium-sulfur batteries and supercapacitors) designed to tolerate operation at high temperatures and high pressures. In some embodiments, a nanocomposite is dried by heating under vacuum prior to use in fabrication of electrode materials. In some embodiments, a nanocomposite is dried such that moisture content is reduced to less than 5% by weight. In some embodiments, a nanocomposite is dried such that moisture content is reduced to less than 3% by weight. In some embodiments, a nanocomposite is dried such that moisture content is reduced to less than 1% by weight.

In some embodiments, electrode materials are prepared by mixing a nanocomposite with one or more additives in a solvent. In some embodiments, additives include, among other things, conductive agents and binding agents. In some embodiments, a conductive agent is selected from the group consisting of carbon black, C-NERGY™ Super C65®, C-NERGY™ SFG6L, Super P®, a carbon nanotube-based material and combinations of the same. In some embodiments, a binding agent is polyvinylidene fluoride, a polyvinylidene fluoride resin (for example, Kynar® HSV900), or styrene butadiene. In some embodiments, a binding agent is polyvinylidene fluoride. In some embodiments, a binding agent is a polyvinylidene fluoride resin. In some embodiments, one or more additives include an acid. In some embodiments, an additive is oxalic acid. In some embodiments, a solvent is a mixture of dimethyl sulfoxide (DMSO) and ethanol. In some embodiments, a mixture of DMSO and ethanol is a 1:1 mixture by volume. In some embodiments, a mixture of DMSO and ethanol is a 2:1 mixture by volume. In some embodiments, a mixture of DMSO and ethanol is a 1:2 mixture by volume. In some embodiments, a solvent is N-methyl-2-pyrrolidone (NMP).

In an illustrative embodiment, a solution is mixed to obtain a homogenous slurry, which is spread on a foil substrate and allowed to dry. In some embodiments, a foil substrate acts as a current collector. In some embodiments, a foil substrate is a copper foil substrate. In some embodiments, a foil substrate is an aluminum substrate. In an illustrative embodiment, a slurry is applied to a foil substrate to form a 50 to 200 μm film, and the film is dried under vacuum. In some embodiments, a film is dried at a temperature of about 60 to 110° C. In some embodiments, a film is dried at a temperature of about 60 to 90° C. In some embodiments, a film is dried at a temperature of about 80 to 130° C.

In some embodiments, a nanocomposite makes up about 50% to about 95% of an electrode coating (for example, an electrode coating for use in preparation of a battery). In some embodiments, a nanocomposite makes up about 60% to about 80% of an electrode coating (for example, an electrode coating for use in preparation of a battery). In some embodiments, a nanocomposite makes up about 75% to about 85% of the electrode coating (for example, an electrode coating for use in preparation of a battery).

A summed weight percent of additive(s) in the electrode formulation in a nanocomposite is in a range from 5% to 50%. For example, in some embodiments, the amount of a binding agent in a nanocomposite is zero, or the amount of conductive additive in a nanocomposite is zero. Alternatively, in some embodiments, a nanocomposite includes both a binding agent and a conductive additive. In some embodiments, a conductive agent makes up about 1% to about 25% of an electrode coating. In some embodiments, a conductive agent makes up about 5% to about 20% of an electrode coating. In some embodiments, a conductive agent makes up about 5% to about 15% of an electrode coating. In some embodiments, a binding agent makes up about 1% to about 25% of an electrode coating. In some embodiments, a binding agent makes up about 5% to about 20% of an electrode coating. In some embodiments, a binding agent makes up about 5% to about 15% of an electrode coating.

Figure 44:
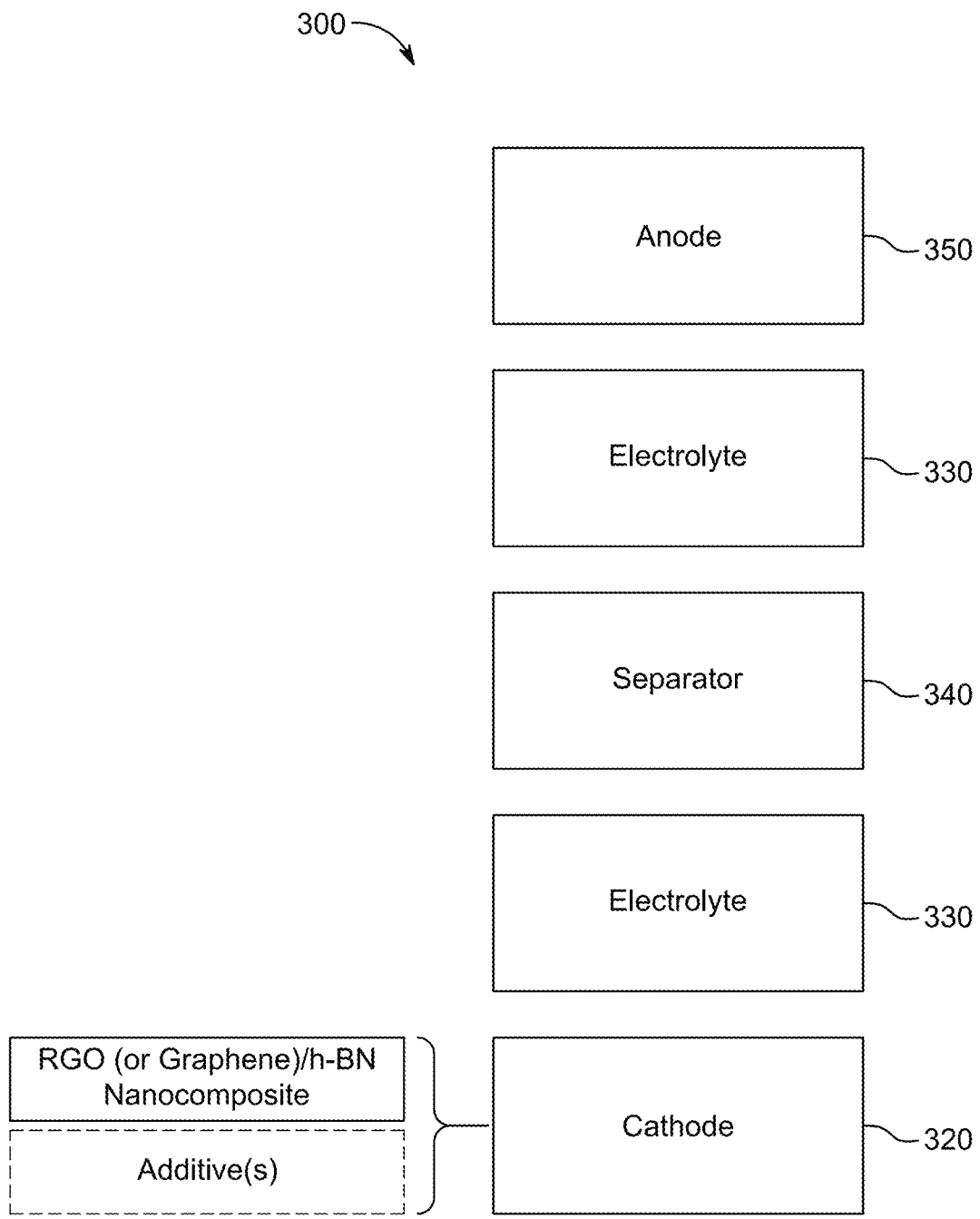
FIG. 44 is a block diagram of a lithium-sulfur battery, according to an illustrative embodiment.

In some embodiments, nanocomposites described in the present disclosure are useful as cathode materials for lithium-sulfur batteries. FIG. 44 is a block diagram of an example lithium-sulfur battery 300 designed to tolerate operation at high temperatures and high pressures. Lithium-sulfur battery 300 includes a cathode 320, an electrolyte 330, a separator 340, and an anode 350. In some embodiments, an anode includes an electrode formulated with a nanocomposite as described in the present disclosure.

In an example embodiment of lithium-sulfur battery 300, anode 350 is, in some embodiments, for example, a lithium metal. For lithium-sulfur battery 300, electrolyte 330 includes, in some embodiments, for example, one or more lithium salts dissolved in one or more organic solvents. For example, in some embodiments, one or more lithium salts are present in concentrations of about 0.05 mol % to about 1 mol %. In some embodiments, one or more lithium salts are present at a concentration of about 0.1 mol %. In some embodiments, lithium salts include bis(trifluoromethane) sulfonimide lithium salt (LiTFSI) or lithium nitrate. For example, organic solvents include 1,2-dimethoxyethane (DME) or 1,3-dioxolane (DOL). Separator 345 is, in some embodiments, a polypropylene membrane that is placed between an anode and a cathode.

Figure 45:
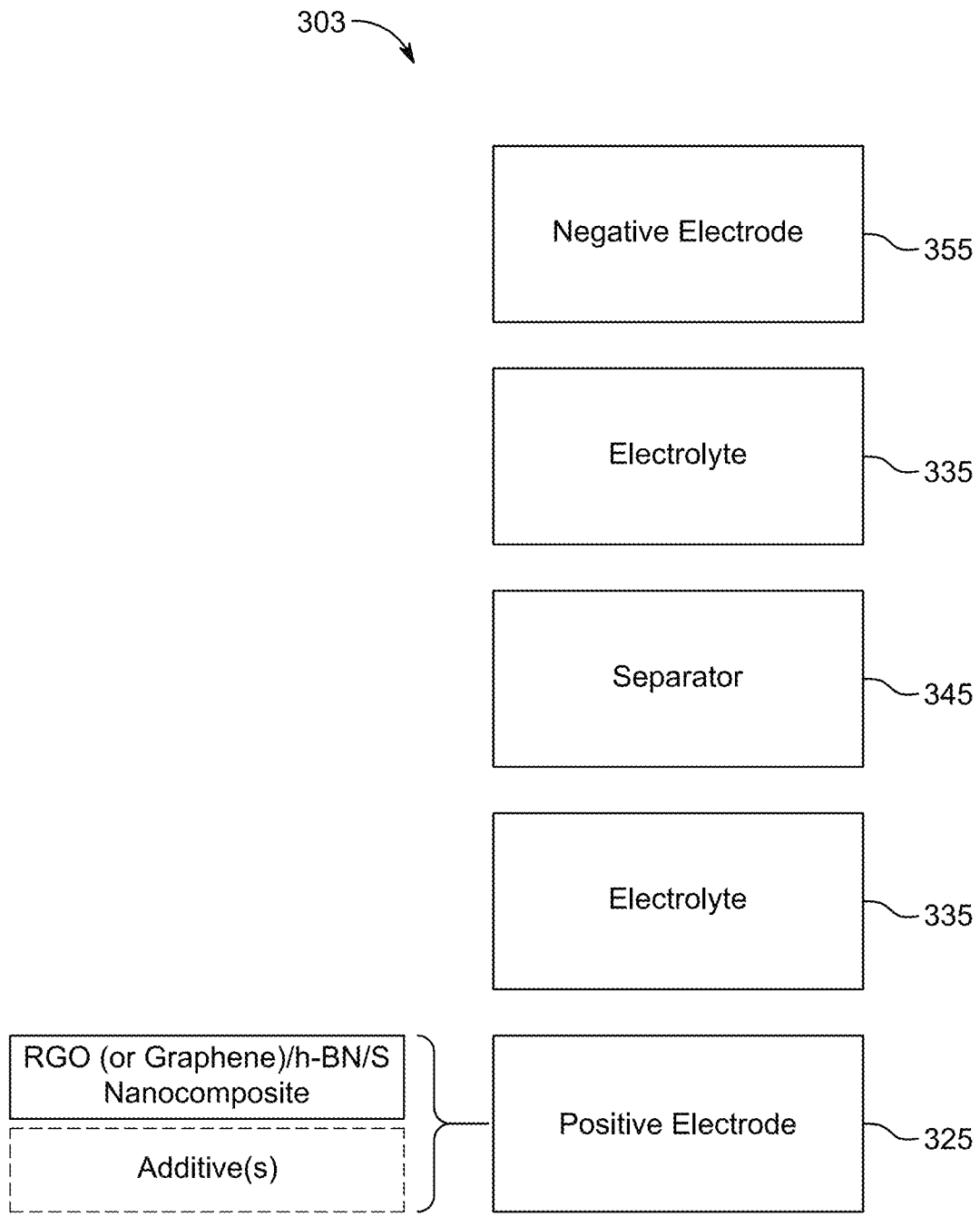
FIG. 45 is a block diagram of an asymmetric supercapacitor, according to an illustrative embodiment.

FIG. 45 shows an illustrative example of an asymmetric supercapacitor 303. Supercapacitor 303 includes positive electrode 325, electrolyte 335, separator 345, and negative electrode 355. In some embodiments, positive electrode 325 is formulated with a nanocomposite as described here.

Figure 46:
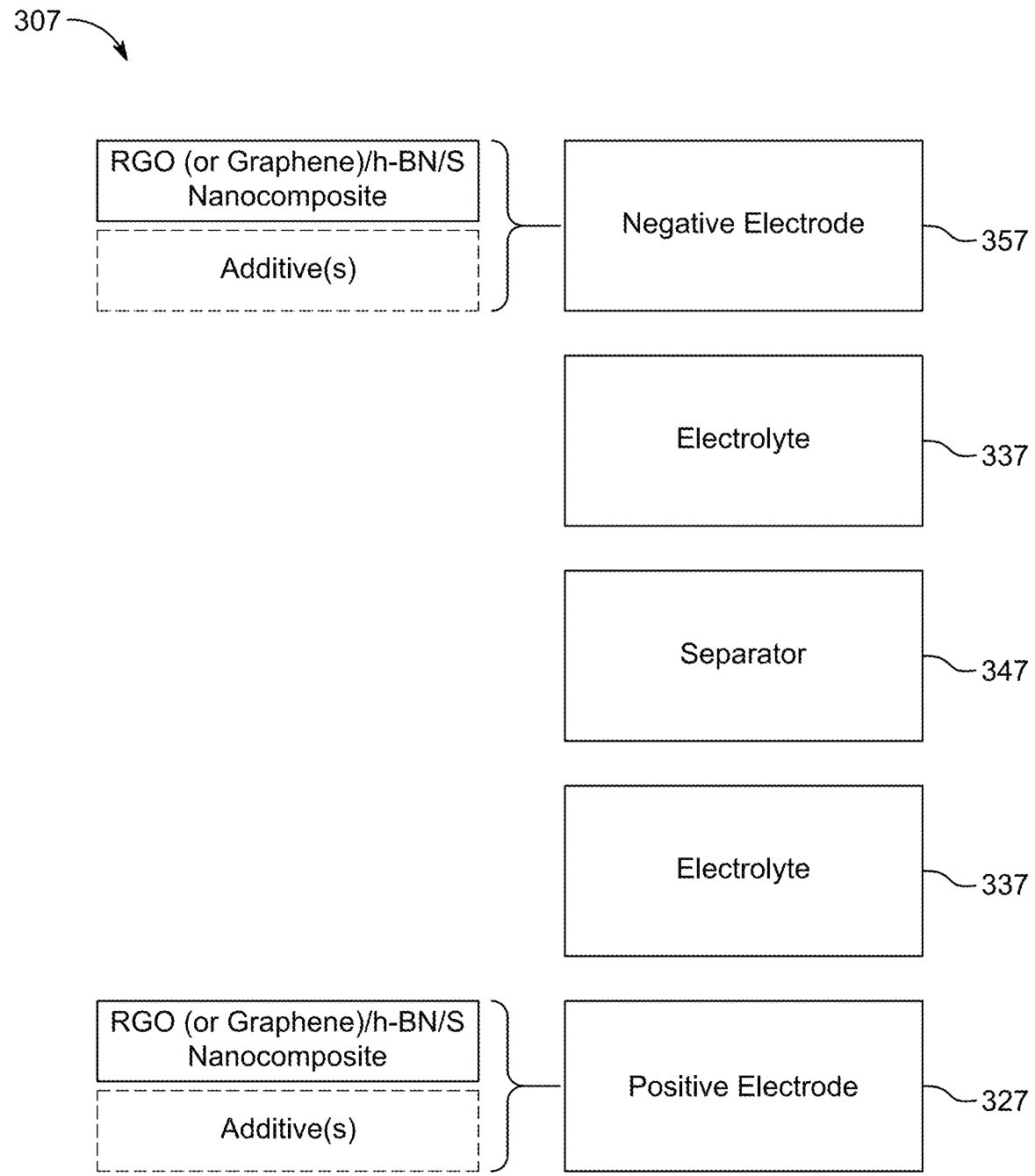
FIG. 46 is a block diagram of a symmetric supercapacitor, according to an illustrative embodiment.

FIG. 46 shows an illustrative example of a symmetric supercapacitor 307. Supercapacitor 307 includes positive electrode 327, electrolyte 337, separator 347, and negative electrode 357. In some embodiments, both positive electrode 327 and negative electrode 357 are formulated with a nanocomposite as described here.

EXAMPLE EMBODIMENTS

The embodiments presented below are examples of nanocomposites, and methods of making and using the same described in the present application. In some embodiments, nanocomposites described herein are used as electrodes in lithium-ion and lithium sulfur batteries.

Embodiment 1. A nanocomposite comprising one or more 2D layers of a carbon material and one or more 2D layers of hexagonal boron nitride material, wherein a weight ratio of the carbon material to the hexagonal boron nitride material is between 1:99 and 99:1, and wherein the nanocomposite is, characterized in that the nanocomposite is thermally stable at a temperature of about 100° C. to about 450° C., as measured by thermogravimetric analysis.

Embodiment 2. The nanocomposite of embodiment 1, wherein the weight ratio of the 2D carbon material to the hexagonal boron nitride material is between 1:9 and 9:1.

Embodiment 3. The nanocomposite of embodiment 1, wherein the 2D carbon material is selected from the group consisting of reduced graphene oxide, graphene, and graphene oxide, or combinations thereof.

Embodiment 4. The nanocomposite of any one of embodiments 1-3, wherein the 2D carbon material is reduced graphene oxide.

Embodiment 5. The nanocomposite of embodiment 4, wherein reduced graphene oxide makes up 99.9% or less of the nanocomposite by weight.

Embodiment 6. The nanocomposite of embodiment 5, wherein the reduced graphene oxide makes up 0.1% to 99.9% of the nanocomposite by weight.

Embodiment 7. The nanocomposite of embodiment 1, wherein the hexagonal boron nitride makes up 99.9% or less of the nanocomposite by weight.

Embodiment 8. The nanocomposite of embodiment 7, wherein the hexagonal boron nitride makes up 0.1% to 99.9% of the nanocomposite by weight.

Embodiment 9. The nanocomposite of embodiment 1, wherein the weight ratio of the carbon material to the hexagonal boron nitride material is about 1:9, about 3:7, about 1:1, about 7:3, or about 9:1.

Embodiment 10. The nanocomposite of any one of embodiments 1 to 9, wherein the nanocomposite further includes $Co_3O_4$.

Embodiment 11. The nanocomposite of embodiment 10, wherein $Co_3O_4$ makes up between 85% and 95% of the nanocomposite by weight.

Embodiment 12. The nanocomposite of any one of embodiments 1 to 9, wherein the nanocomposite further includes sulfur.

Embodiment 13. The nanocomposite of embodiment 12, wherein sulfur makes up between 40% and 90% of the nanocomposite by weight.

Embodiment 14. The nanocomposite of embodiment 12 or 13, wherein sulfur makes up 55% to 65% of the nanocomposite by weight.

Embodiment 15. The nanocomposite of embodiment 12 or 13, wherein sulfur makes up 65% to 75% of the nanocomposite by weight.

Embodiment 16. The nanocomposite of embodiment 12 or 13, wherein sulfur makes up 75% to 85% of the nanocomposite by weight.

Embodiment 17. The nanocomposite of any one of embodiments 1 to 16 characterized in that it has a specific surface area of 300 $m^2$/g or less.

Embodiment 18. The nanocomposite of any one of embodiments 1 to 17, wherein the nanocomposite has a hardness of about 0.05 GPa or greater.

Embodiment 19. The nanocomposite of any one of embodiments 1 to 18, wherein the nanocomposite has a stiffness, as characterized by Young's module of about 5 GPa or greater.

Embodiment 20. An electrode including the nanocomposite of any one of embodiments 1 to 19.

Embodiment 21. A supercapacitor including an anode, a cathode, an electrolyte and a separator between the anode and the cathode, wherein the cathode includes the nanocomposite of any one of embodiments 1 to 9.

Embodiment 22. A supercapacitor including an anode, a cathode, an electrolyte and a separator between the anode and the cathode, wherein the cathode and the anode each independently include the nanocomposite of any one of embodiments 1 to 9.

Embodiment 23. A supercapacitor including an anode, a cathode, an electrolyte and a separator between the anode and the cathode, wherein the cathode includes the nanocomposite of any one of embodiments 10 to 11.

Embodiment 24. The supercapacitor of embodiment 21, characterized in that it has a capacitance of equal to or greater than 65 F/g.

Embodiment 25. The supercapacitor of embodiment 21, characterized in that it exhibits a capacity retention of at least 75% over 500 cycles.

Embodiment 26. The supercapacitor of embodiment 23, characterized in that it exhibits a capacitance of equal to or greater than 75 F/g.

Embodiment 27. The supercapacitor of embodiment 23, characterized in that it exhibits a capacity retention of at least 65% after 5000 cycles.

Embodiment 28. A lithium-sulfur battery including an anode, a cathode, an electrolyte and a separator between the anode and the cathode, wherein the cathode includes the nanocomposite of any one of embodiments 12 to 16.

Embodiment 29. The lithium-sulfur battery of embodiment 28, wherein after 10 charge-discharge cycles at 25° C., at least 75% capacity is retained.

Embodiment 30. The lithium-sulfur battery of embodiment 28, characterized in that it has a discharge capacity of at least 190 mAh/g after 10 cycles at 100° C.

Embodiment 31. The lithium-sulfur battery of embodiment 28, characterized in that it has a charge-discharge capacity is maintained at high current rates.

Embodiment 32. The lithium-sulfur battery of embodiment 28, characterized in that it has a capacity retention of at least 80% after 25 cycles at 100° C.

Embodiment 33. A method of preparing a nanocomposite, the method including steps of: ball-milling a mixture including a 2D carbon material and a 2D boron nitride; and calcinating the mixture.

Embodiment 34. The method of embodiment 33, wherein the 2D carbon material is selected from reduced graphene oxide, graphene, or combinations thereof.

Embodiment 35. The method of embodiment 33 or 34, wherein the mixture is ball-milled for at least 20 minutes.

Embodiment 36. The method of any one of embodiments 33 to 35, wherein the mixture is ball-milled for 30 to 90 minutes.

Embodiment 37. The method of any one of embodiments 33 to 36, wherein the mixture is ball-milled at a speed of 1000 to 2500 rpm.

Embodiment 38. The method of any one of embodiments 33 to 37, wherein the step of calcinating the mixture includes heating the mixture in an oven, wherein the temperature of the oven is increased from room temperature to a second temperature in a range of 325 to 375° C. and subsequently held at the second temperature for at least 1 hour.

Embodiment 39. The method of embodiment 38, wherein the second temperature is in a range of 345 to 355° C.

Embodiment 40. The method of embodiment 39, wherein the temperature of the oven is increased from room temperature to the second temperature at a rate of 3 to 15° C./min.

Embodiment 41. The method of any one of embodiments 33 to 40, including a second ball-milling step after calcination, wherein the mixture is ball-milled with sulfur.

Embodiment 42. The method of embodiment 41, wherein the second ball-milling step is performed for at least 20 minutes.

Embodiment 43. The method of embodiment 41 or 42, wherein the second ball-milling step is performed for 30 to 60 minutes.

Embodiment 44. A method of preparing a nanocomposite, the method including steps of: preparing a first solution of graphene oxide in a first volume of a first solvent; preparing a second solution of boron nitride in a second volume of a second solvent; combining the first and second solutions to form a combined solution; applying microwave irradiation to heat the combined solution to a temperature for a period of time; and drying the combined solution, thereby providing a nanocomposite.

Embodiment 45. The method of embodiment 44, wherein the temperature is at least about 140° C.

Embodiment 46. The method of embodiment 45, wherein the temperature is in the range of about 140° C. to about 220° C.

Embodiment 47. The method of embodiment 44, wherein the microwave irradiation applied to the combined solution is at a power of at least about 700 W.

Embodiment 48. The method of embodiment 47, wherein the microwave irradiation applied to the combined solution has a power in a range of about 700 W to about 1800 W.

Embodiment 49. The method of embodiment 44, wherein the microwave irradiation applied to the combined solution is applied at a pressure of at least about 100 psi.

Embodiment 50. The method of embodiment 49, wherein the microwave irradiation applied to the combined solution is applied at a pressure in the range of about 100 psi to about 350 psi.

Embodiment 51. The method of embodiment 44, wherein the first solvent is water.

Embodiment 52. The method of embodiment 44, wherein the second solvent is isopropanol.

Embodiment 53. The method of embodiment 44, wherein the microwave irradiation applied to the combined solution is at a temperature in the range of about 120° C. to about 250° C. and a power of about 900 W.

Embodiment 54. The method of embodiment 53, wherein the microwave irradiation applied to the combined solution is at a temperature in a range of about 140° C. to about 220° C., at a power of about 900 W, and a pressure of about 150 psi.

Embodiment 55. The method of embodiment 44, wherein the nanocomposite mixture is dried for about 12 hours at 60° C.

Embodiment 56. The method of embodiment 44, comprising, following drying the combined solution, contacting together the nanocomposite mixture with sulfur.

Embodiment 57. The method of embodiment 56, wherein the sulfur is in a form selected from a group consisting of elemental sulfur, a sulfur-containing salt, or a sulfur/graphene composite.

Embodiment 58. The method of embodiment 57, wherein the sulfur-containing salt further comprises lithium.

Embodiment 59. The method of embodiment 56, wherein sulfur is present at a weight percent in a range of about 50% to about 80%, wherein the weight percent is based on total weight of the nanocomposite.

Embodiment 60. The method of embodiment 59, wherein the weight percent of sulfur is about 60% to 80%.

Embodiment 61. The method of embodiment 59, wherein the weight percent of sulfur is about 70% to 80%.

EXAMPLES

A. Fabrication of Nanocomposites

Example 1: Preparation of Reduced Graphene Oxide/h-BN Nanocomposites

Example 1A. Preparation of Graphene Oxide (GO)

Oxidation of graphite to graphite oxide was followed by ultrasonication to produce graphene oxide (GO). In a typical reaction, $H_2SO_4$ (115 mL) and $NaNO_3$ (2.5 g) were combined and stirred in an ice bath for 15 minutes prior to addition of graphite (2 g). After an additional 15 minutes of stirring, $KMnO_4$ (20 g) was added to the reaction mixture. The reaction mixture was stirred for an additional 20 minutes while in the ice bath. The reaction mixture was then heated to a temperature in the range of 32° C. to 40° C., and stirred at that temperature for 2 hours. A color change from black to dark green was observed. The reaction mixture was transferred to an ice bath and diluted with distilled water (230 mL). After 20 minutes, $H_2O_2$ (30 wt %, 20 mL) was added to the reaction mixture. A color change to yellow was observed. The reaction mixture was neutralized by addition of HCl (10 wt %), followed by washing and centrifugation (HERAEUS-LABOFUGE 400 Centrifuge). The isolated resultant solution was subjected to 5 minutes of ultrasonication, then dried at room temperature over the course of two days. Resultant graphene oxide was dispersed in distilled water to prepare a solution at 2 mg/mL.

Example 1B. Preparation of Hexagonal Boron Nitride (h-BN)

Bulk hexagonal boron nitride (h-BN) was exfoliated by a liquid phase exfoliation method. Boron nitride powder (1 mg) was dispersed in isopropanol (3 mL) and sonicated for 30 minutes.

Example 1C. Preparation of Reduced Graphene Oxide (RGO)/h-BN Nanocomposites by Hydrothermal Synthesis (Method 2)

Graphene oxide (GO) and h-BN solutions prepared as described above were combined in varying concentrations, summarized in Table 1. Combined solutions were heated for 1 hour in a CEM MARS 6, microwave acid digestion system to a temperature of 180° C., at a power of 900 W, and a pressure of 150 psi. Samples were filtered and the collected solid was dried at room temperature to yield RGO/h-BN nanocomposites.

TABLE 1

Composition of solutions for preparing RGO/h-BN nanocomposites

| | GO Solution | | h-BN solution | | | |
| --- | --- | --- | --- | --- | --- | --- |
| Sample | GO mass (mg) | Solvent volume (mL) | h-BN mass (mg) | Solvent volume (mL) | Composite Solution wt % GO | BN:GO ratio |
| 1 | 10 | 10 | 90 | 540 | 10 | 9:1 |
| 2 | 30 | 30 | 70 | 420 | 30 | 7:3 |
| 3 | 50 | 50 | 50 | 300 | 50 | 5:5 |
| 4 | 70 | 70 | 30 | 180 | 70 | 3:7 |
| 5 | 90 | 90 | 10 | 60 | 90 | 1:9 |

Figure 2:
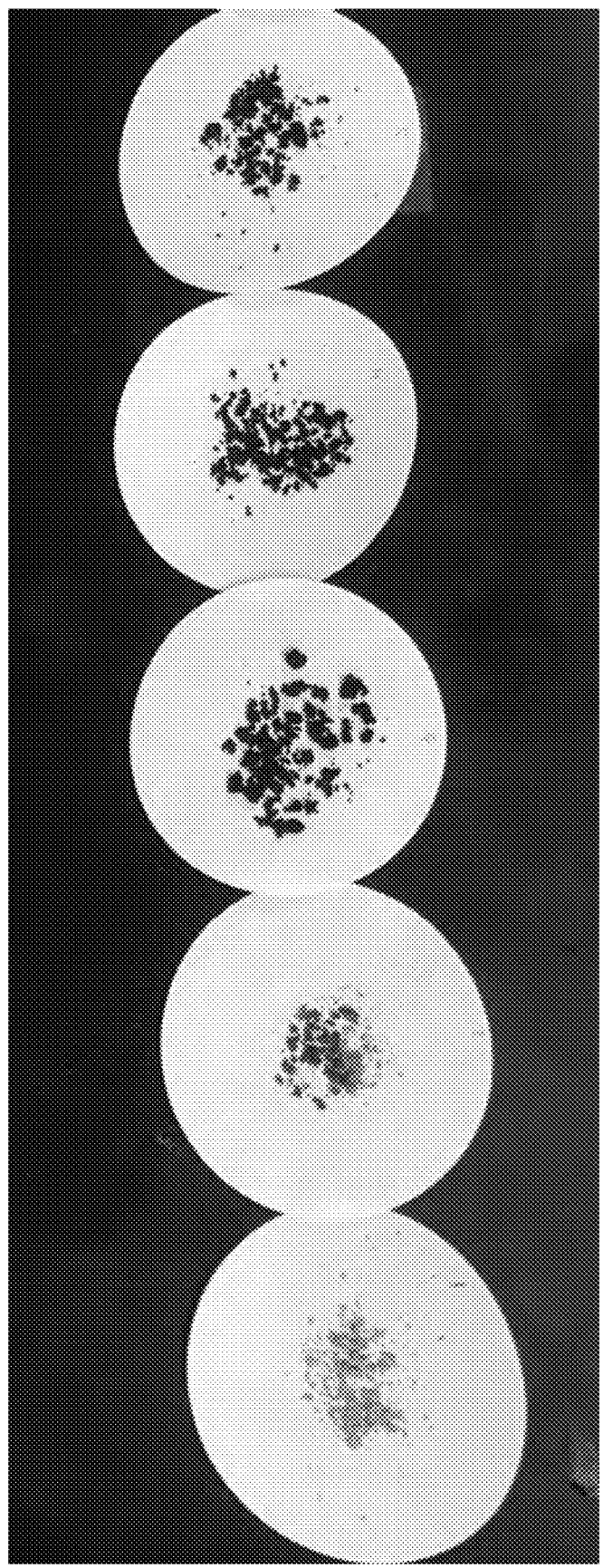
FIG. 2 is a photograph of RGO/h-BN nanocomposite Samples 1 to 5, according to an illustrative embodiment.

FIGS. 1 and 2 depict the combined GO and h-BN solutions and isolated product, respectively, for Samples 1 to 5 described in Table 1.

Example 1D. Preparation of Reduced Graphene Oxide (RGO)/h-BN Nanocomposites by Ball-Milling and Calcination (Method 1)

Boron nitride micropowder (0.7 g, 28.2 mmol, Graphene Supermarket) and graphene nanoplatelets (2.31 g, 192 mmol, XG Sciences) were combined in a SPEX SamplePrep 8000M Mixer/Mill ball milling apparatus equipped with four 0.25 inch steel balls and two 0.5 inch steel balls. The mixture was ball-milled for 1 hour at a speed of 1725 rpm. The resulting powder was calcinated in an oven at a temperature of 350° C. for 4 hours with a heating rate of 7° C./min (i.e., 350° C. to 950° C.).

Example 1E. Preparation of Reduced Graphene Oxide (RGO)/h-BN/S Nanocomposites

RGO/h-BN/S nanocomposites were prepared with varying amounts of sulfur. A RGO/h-BN nanocomposite prepared in accordance with Example 1C or 1D (20 wt %, 30 wt %, and 40 wt %) was mixed with elemental sulfur (80 wt %, 70 wt %, and 60 wt %) and ball-milled for 45 minutes in a SPEX SamplePrep 8000M Mixer/Mill equipped with four 0.25 inch steel balls and two 0.5 inch steel balls with a speed of 1725 rpm to obtain a RGO/h-BN/S nanocomposite as a fine black powder.

Analogous GO/S and h-BN/S nanocomposites were prepared in the same fashion as reference samples.

B. Characterization of Nanocomposites

Example 2: X-Ray Diffraction (XRD) of Nanocomposites

To study the crystallinity of the nanocomposites, X-ray diffraction (XRD) powder patterns of the nanocomposites were measured over the range of 5 to 80° at 30 kV and 40 mA using a Rigaku MiniFlex 600 X-ray diffractometer (Japan) equipped with Cu Kα radiation (1.54430 Å).

Figure 3:
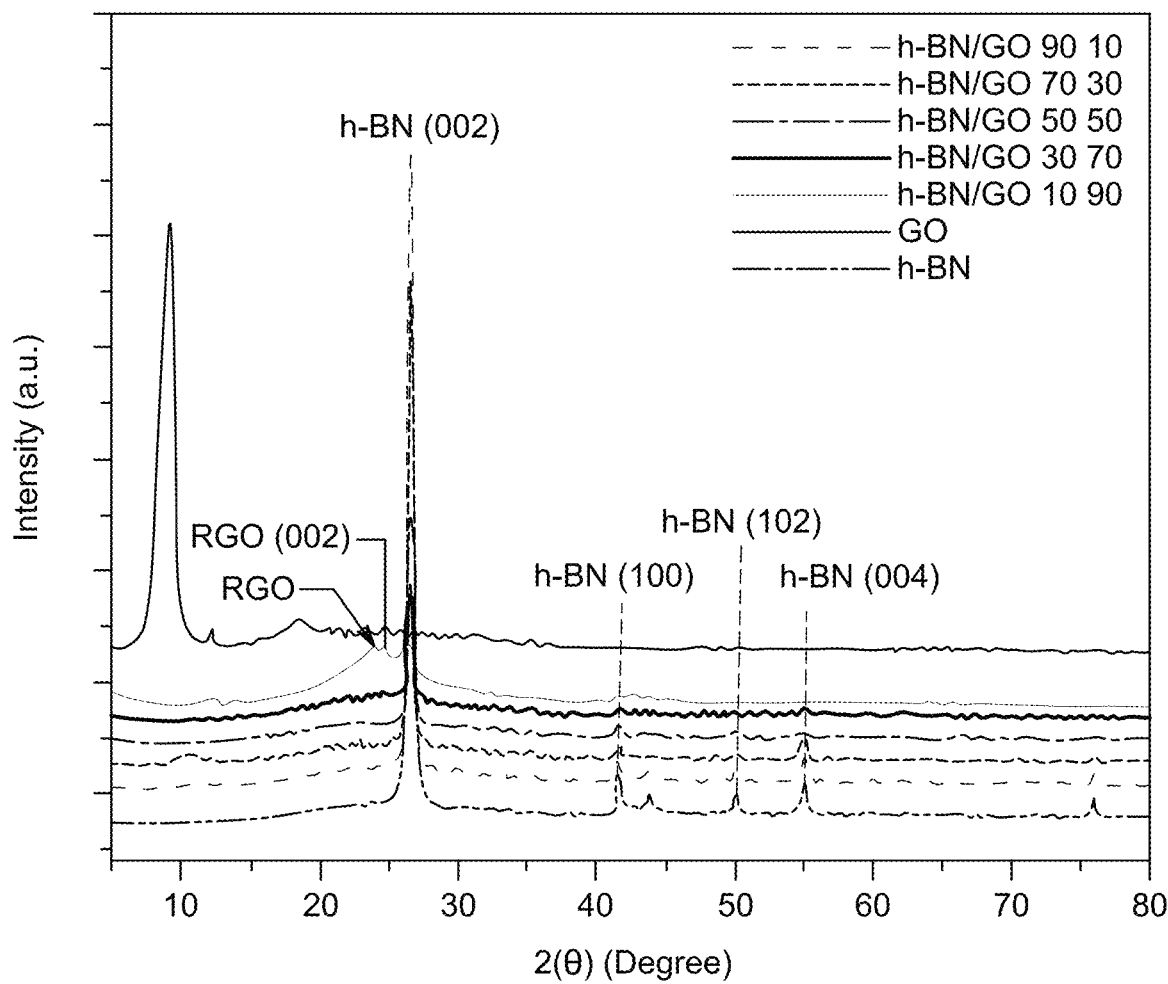
FIG. 3 is a plot of XRD patterns of RGO/h-BN nanocomposites, h-BN, and GO, according to an illustrative embodiment.
Figure 21:
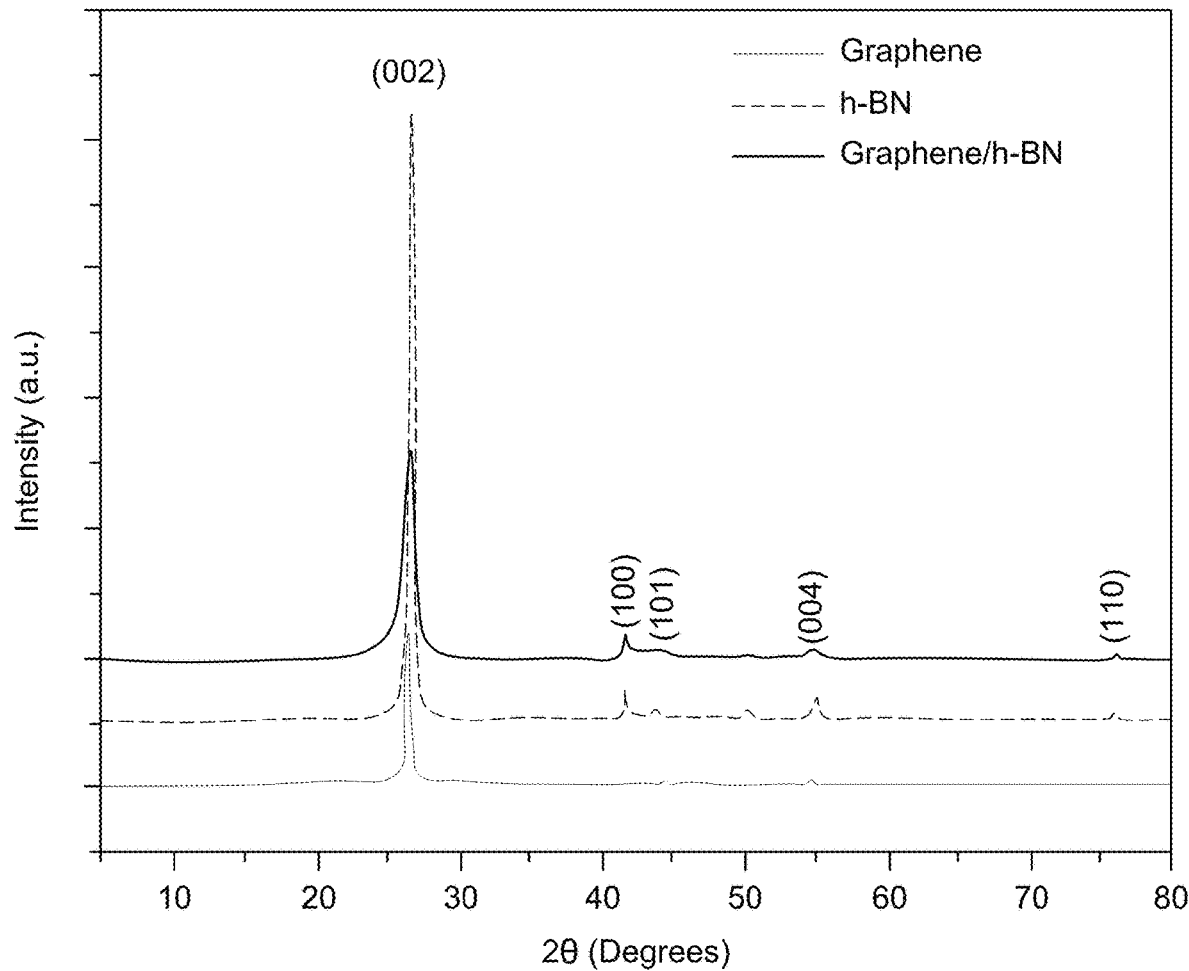
FIG. 21 is a plot of XRD patterns of graphene/h-BN nanocomposites, h-BN, and GO, according to an illustrative embodiment.

Representative XRD patterns for RGO/h-BN nanocomposites, h-BN, and GO are depicted in FIGS. 3 and 21. The strong characteristic peaks for graphene oxide and hexagonal boron nitride occur at 2θ=9.1° and 26.6°, respectively. While RGO/h-BN nanocomposites maintain the characteristic h-BN peaks, the smaller peaks which correspond to the (100), (102) and (004) planes of h-BN naturally decrease as h-BN content decreases. In contrast, the characteristic GO peak is absent from spectra of exemplary RGO/h-BN nanocomposites, instead exhibiting an amorphous peak around 2θ=23.5 corresponding to reduced graphene oxide.

Figure 12:
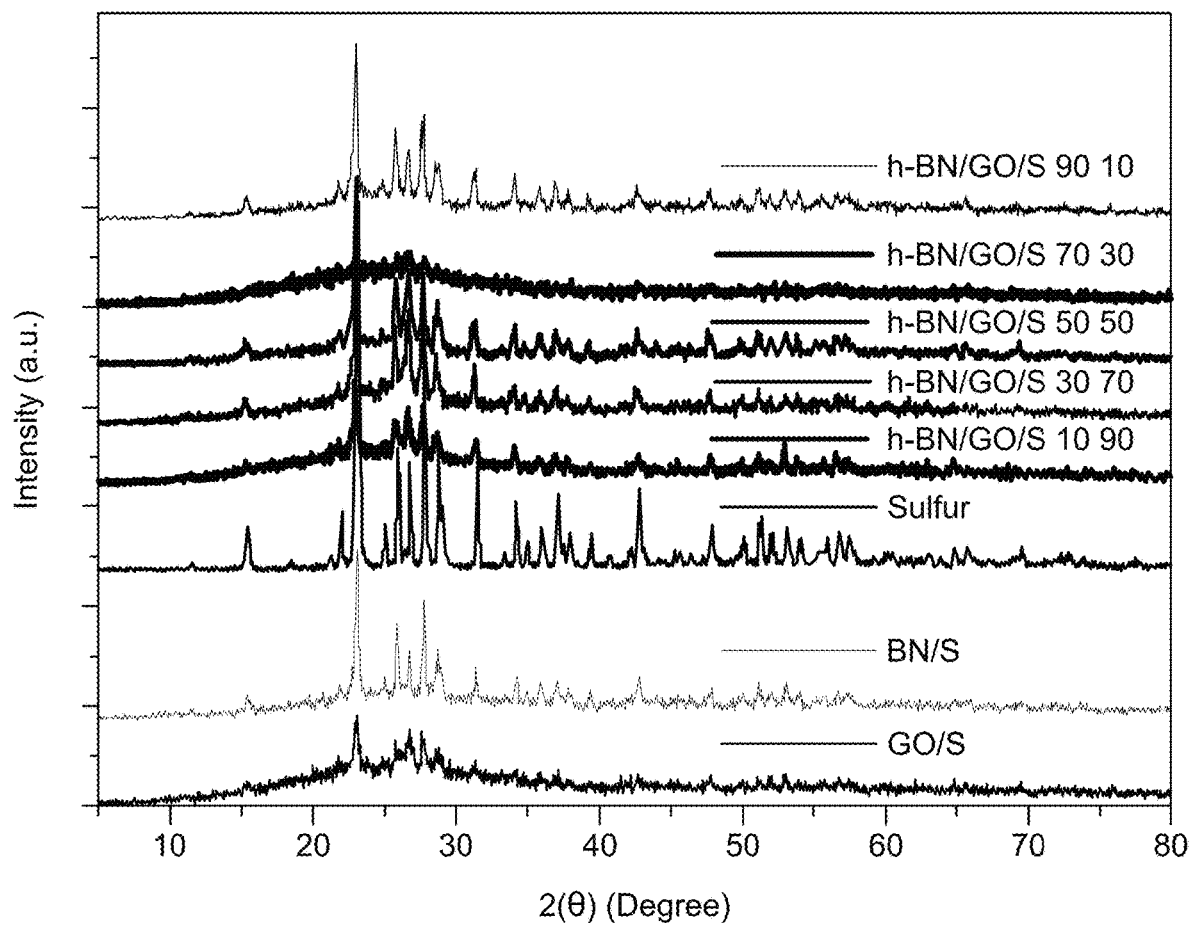
FIG. 12 is a plot of XRD patterns of RGO/h-BN/S, h-BN/S, and GO/S nanocomposites, according to an illustrative embodiment.

Representative XRD patterns for RGO/h-BN, h-BN/S, and GO/S nanocomposites are depicted in FIG. 12. Sharp diffraction peaks, corresponding to crystalline sulfur decrease in intensity among RGO/h-BN/S nanocomposites, indicating incorporation of a homogenously distributed, or interlaminated, amorphous sulfur.

Example 3: Optical Properties of Nanocomposites

To study the optical absorption of the nanocomposites, samples were analyzed by Ultraviolet/Visible (UV/Vis) spectroscopy, Raman spectroscopy, and Fourier transform infrared spectroscopy.

UV/Vis spectra were measured over the range of 200-800 nm using a Perkin Elmer Lambda 25 UV/Vis absorption spectrometer.

UV/Vis spectra of RGO/h-BN nanocomposites, RGO, and h-BN were used to calculate band gaps. Specifically, band gap was calculated according to the Tauc relationship:

$$\alpha h\nu = B(h\nu - E_g)_n$$

Figure 6:
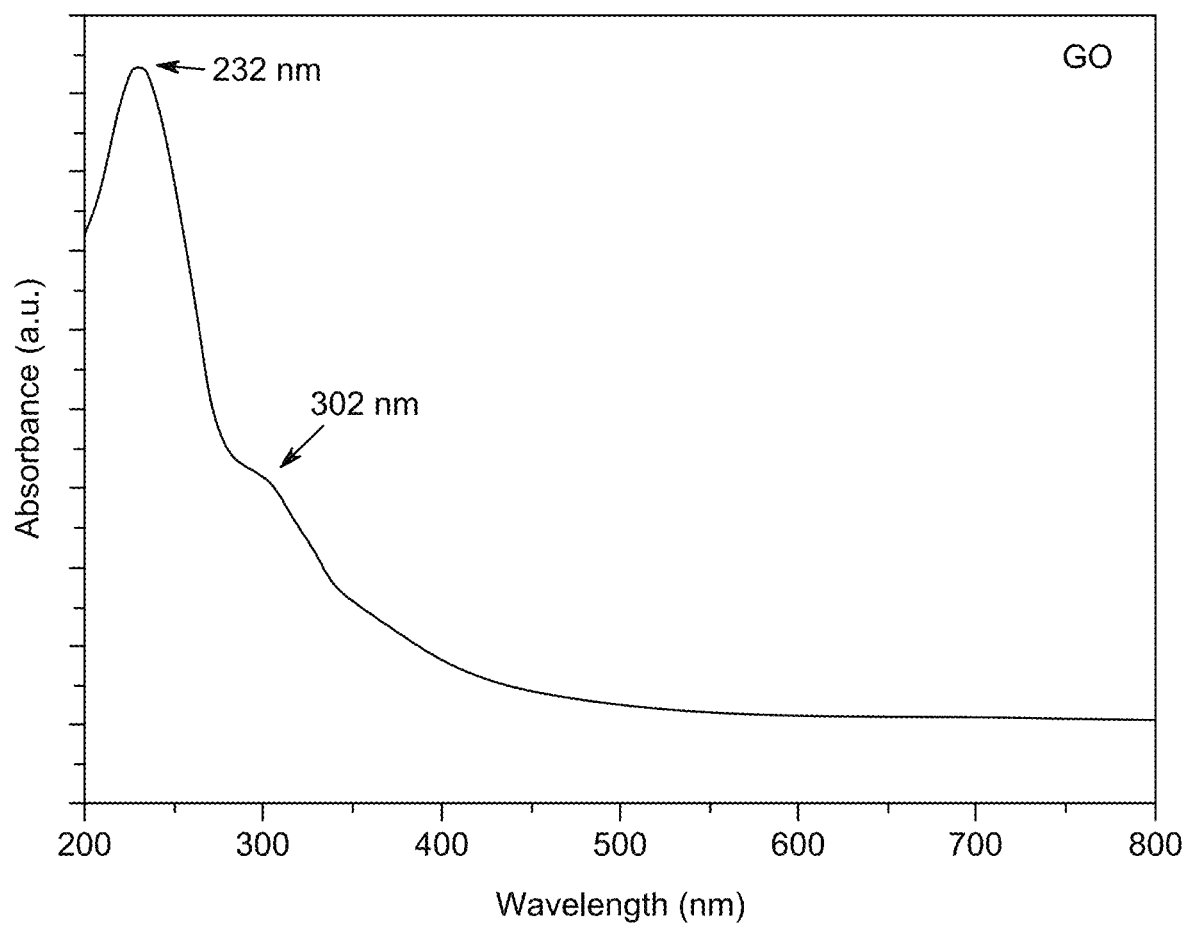
FIG. 6 is a plot of a representative UV/Vis spectrum of GO, according to an illustrative embodiment.
Figure 7:
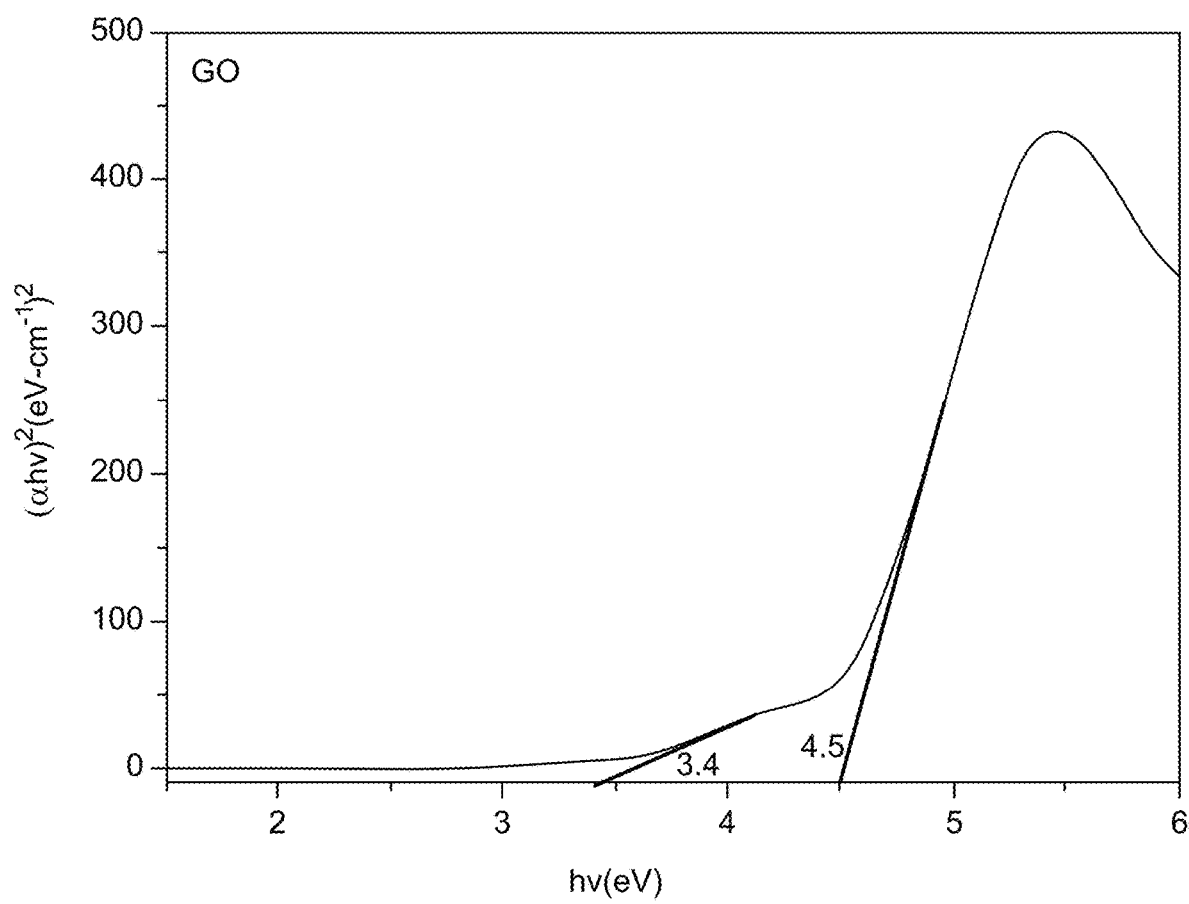
FIG. 7 is a Tauc plot derived from a UV/Vis spectrum of GO, according to an illustrative embodiment.

Absorption spectra of RGO, such as depicted in FIG. 6, exhibit absorption peaks at 232 nm and 302 nm corresponding to $\pi \to \pi^*$ and $n \to \pi^*$ transitions, respectively. The corresponding Tauc plot for RGO is depicted in FIG. 7, illustrating band gaps of 3.4 and 4.5 eV. Conversely, only a single absorbance at 220 nm is observed for h-BN, corresponding to a band gap of 5.08 eV. Band gaps measured for RGO/h-BN nanocomposites, in addition to h-BN and RGO are summarized in Table 2.

TABLE 2

Band gap values for RGO/h-BN nanocomposites, h-BN and RGO

| Sample | Band Gap 1 (eV) | Band Gap 2 (eV) |
| --- | --- | --- |
| 1 | 3.09 | 4.1 |
| 2 | 2.9 | 3.1 |
| 3 | 3.1 | 3.55 |
| 4 | 3.2 | 3.8 |
| 5 | 3.4 | 4.1 |

TABLE 2-continued

Band gap values for RGO/h-BN nanocomposites, h-BN and RGO

| Sample | Band Gap 1 (eV) | Band Gap 2 (eV) |
|---|---|---|
| h-BN | — | 4.8 |
| RGO | 3.4 | 4.5 |

Figure 16:
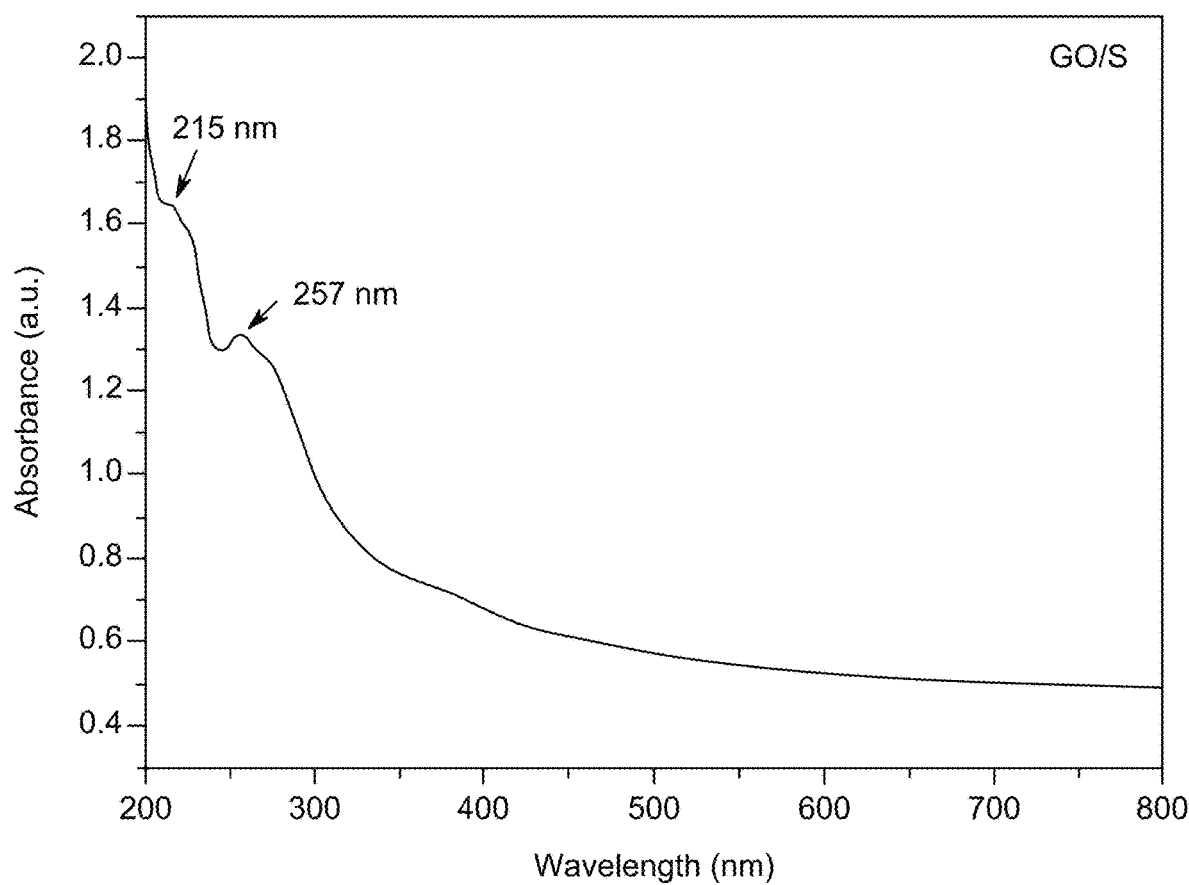
FIG. 16 is a plot of a representative UV/Vis spectrum of GO/S, according to an illustrative embodiment.
Figure 17:
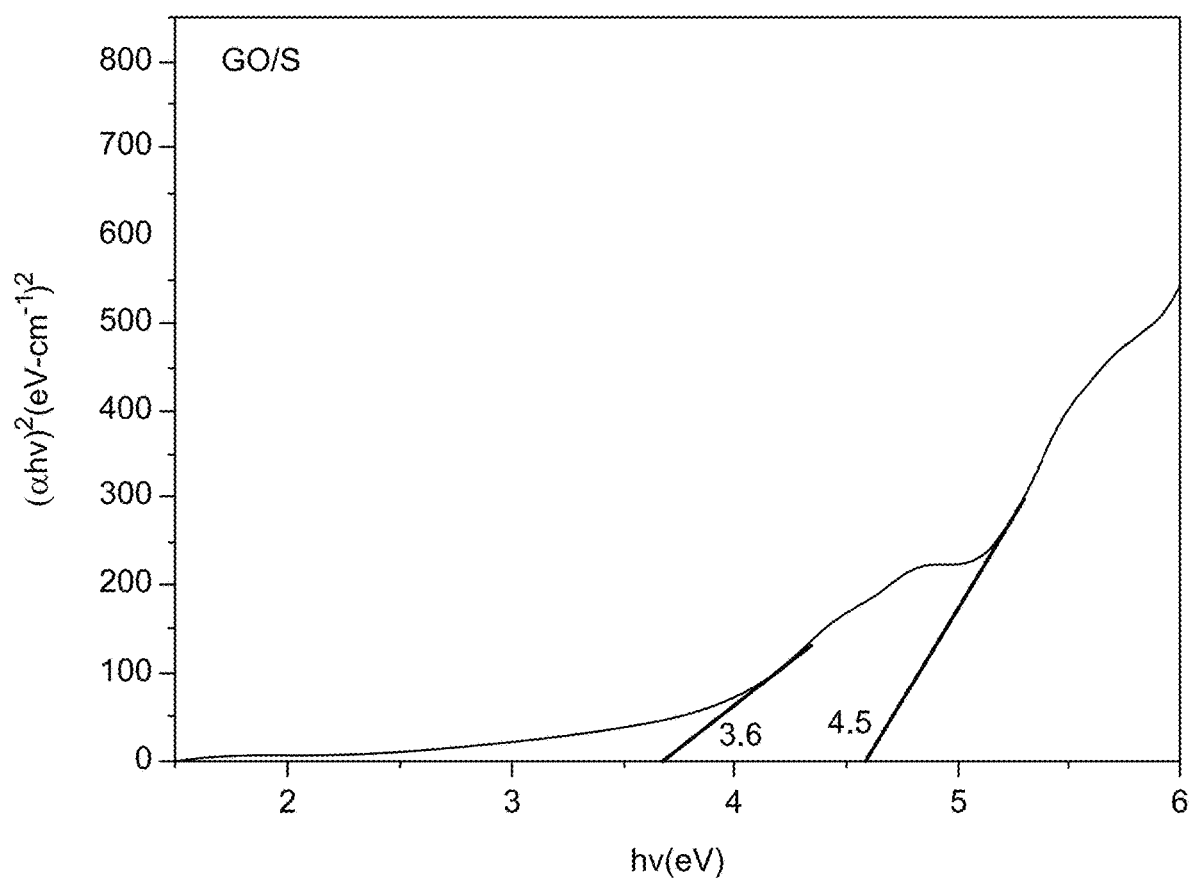
FIG. 17 is a Tauc plot derived from a UV/Vis spectrum of GO/S, according to an illustrative embodiment.

UV/Vis spectra of RGO/h-BN/S, h-BN/S, and RGO/S nanocomposites are similar to those for the corresponding materials without sulfur. FIGS. 16 and 17 show a representative UV/Vis spectrum for RGO/S and corresponding Tauc plot, respectively. Band gaps calculated for RGO/h-BN/S, h-BN/S, and RGO/S nanocomposites are summarized in Table 3.

TABLE 3

Band gap values for RGO/h-BN/S, h-BN/S and RGO/S nanocomposites

| Sample | Band Gap 1 (eV) | Band Gap 2 (eV) |
|---|---|---|
| 1/S | — | 5.1 |
| 2/S | 4.9 | 5.2 |
| 3/S | 4.4 | 5.4 |
| 4/S | 3.7 | 4.5 |
| 5/S | 3.6 | 4.7 |
| S | 4.9 | 5.3 |
| h-BN/S | — | 5.6 |
| RGO/S | 3.6 | 4.5 |

Analysis of samples using a Thermo Scientific™ DXR™ Raman Microscope enabled detection of the ordering of carbon, boron, and sulfur materials of the nanocomposites.

Figure 5:
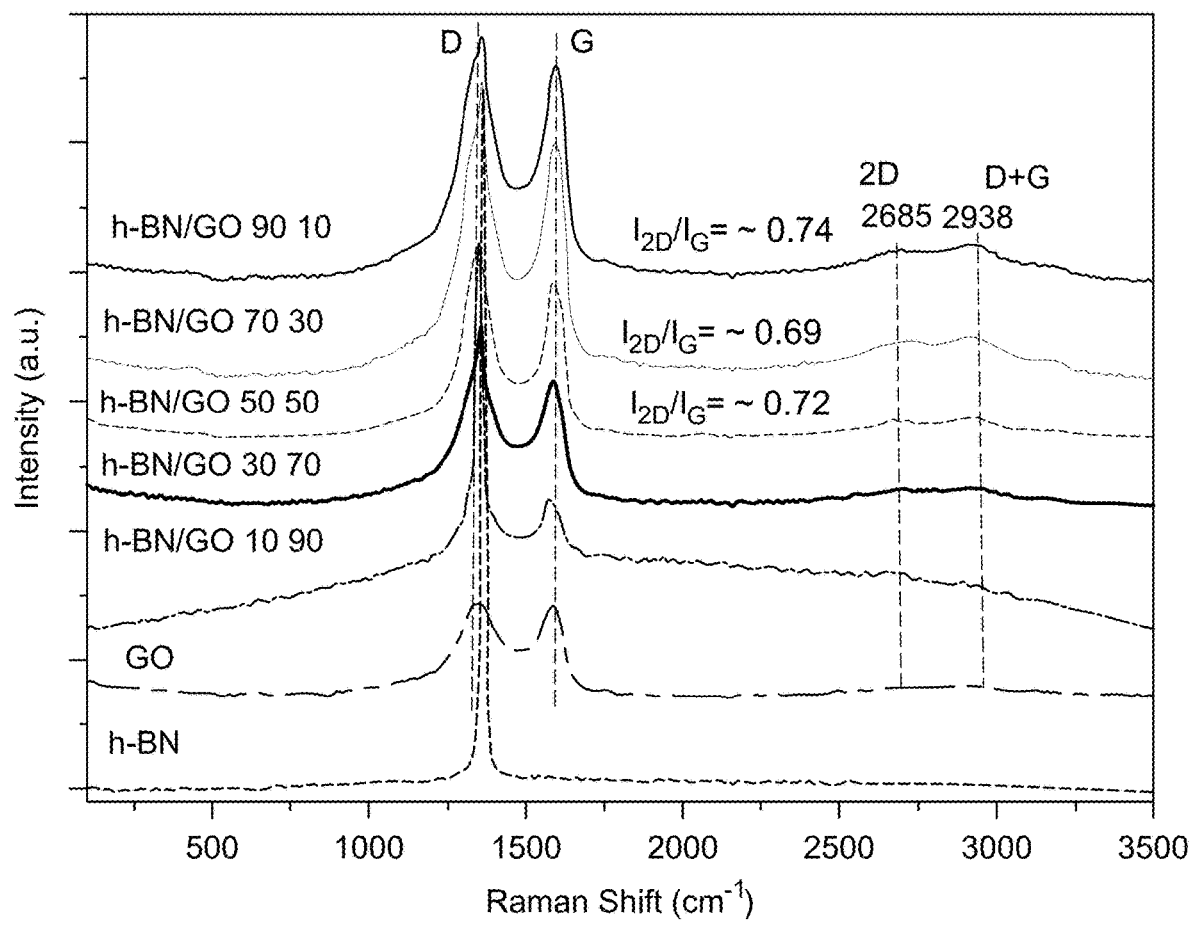
FIG. 5 is a plot of Raman spectra of RGO/h-BN nanocomposites, h-BN, and GO, according to an illustrative embodiment.

Representative Raman spectra of RGO/h-BN nanocomposites, h-BN, and RGO are depicted in FIG. 5. Raman spectra show a D band for h-BN at 1365 cm$^{-1}$. The characteristic D band for RGO appears at 1341 cm$^{-1}$, shifting to higher wavenumbers as RGO percent decreases in a nanocomposite. The characteristic G band of the graphite structure is observed in spectra for RGO and nanocomposites near 1563 cm$^{-1}$, shifting to higher wavenumbers as RGO percent decreases in a nanocomposite.

Figure 14:
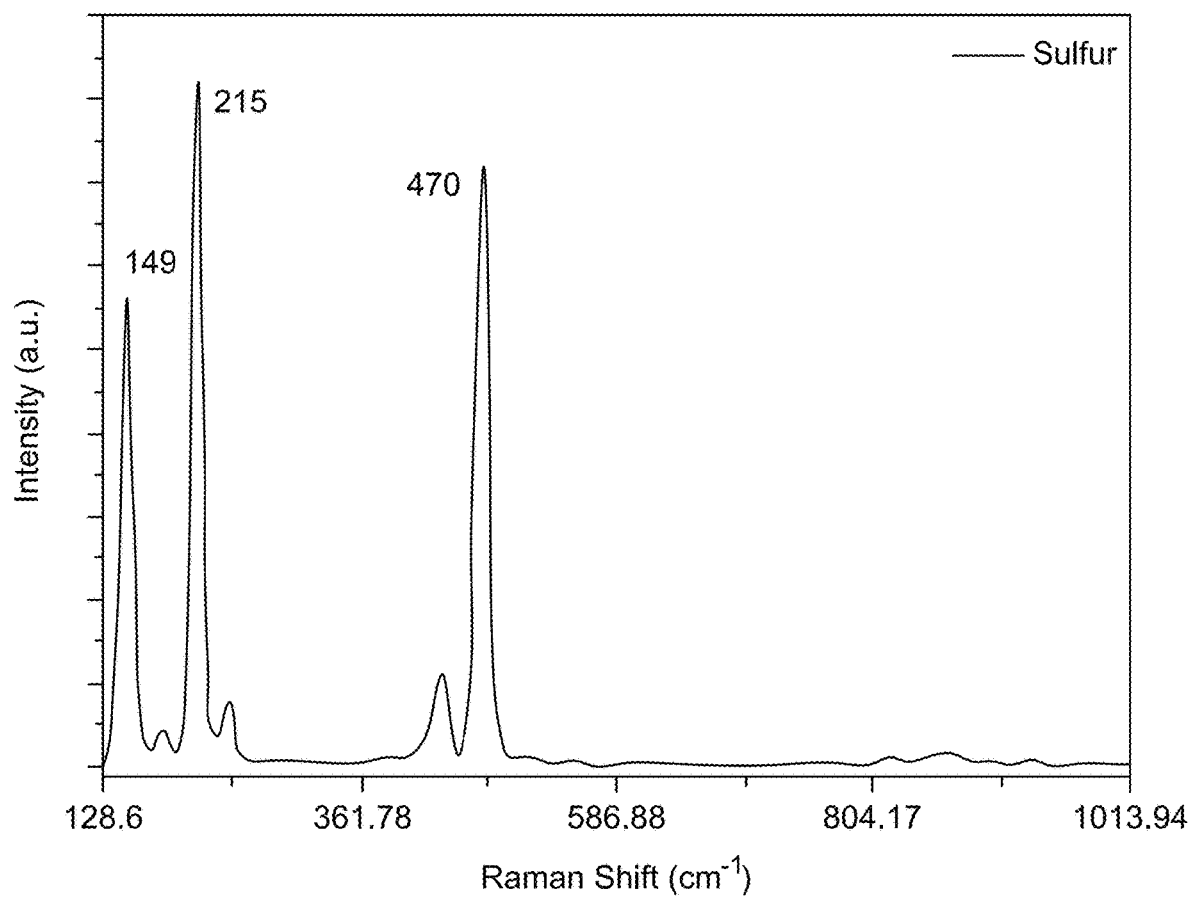
FIG. 14 is a plot of a representative Raman spectrum of elemental sulfur.
Figure 15:
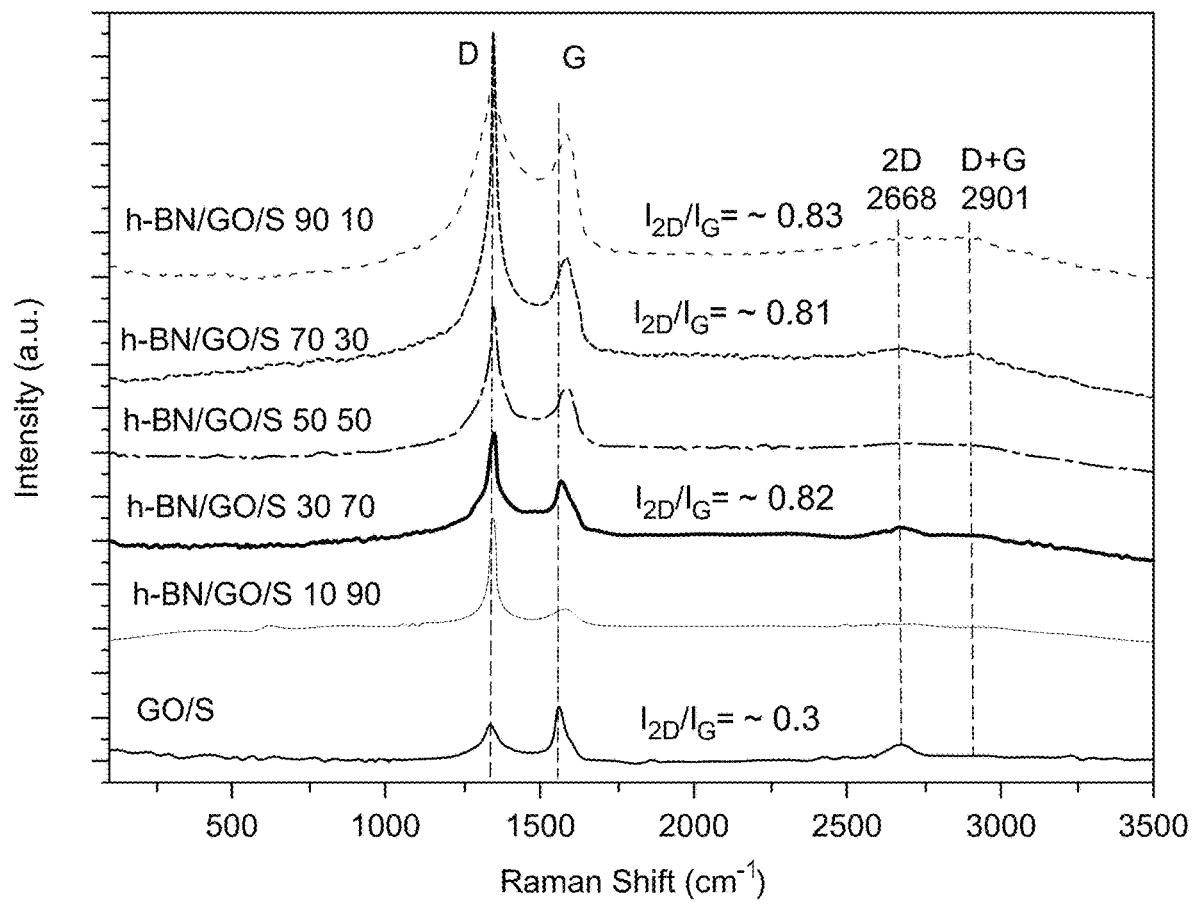
FIG. 15 is a plot of Raman spectra of RGO/h-BN/S, h-BN/S, and GO/S nanocomposites, according to an illustrative embodiment.

A representative Raman spectrum of elemental sulfur is depicted in FIG. 14, exhibiting intense signals at 151, 216, and 410 cm$^{-1}$. Representative Raman spectra of RGO/h-BN/S, h-BN/S, and RGO/S nanocomposites are depicted in FIG. 15. Raman spectra show a D band for h-BN/S at 1365 cm$^{-1}$. The characteristic D band for RGO/S appears at 1347 cm$^{-1}$, shifting to higher wavenumbers as RGO percent decreases in a nanocomposite. The characteristic G band of the graphite structure is observed in spectra for RGO and nanocomposites near 1565 cm$^{-1}$, shifting to higher wavenumbers as RGO percent decreases in a nanocomposite.

Fourier transform infrared (FT-IR) spectra collected in the range of 4000 to 500 cm$^{-1}$ using a Thermo Scientific™ Nicolet-i10 spectrometer enabled determination of chemical composition of the nanocomposites.

Figure 4:
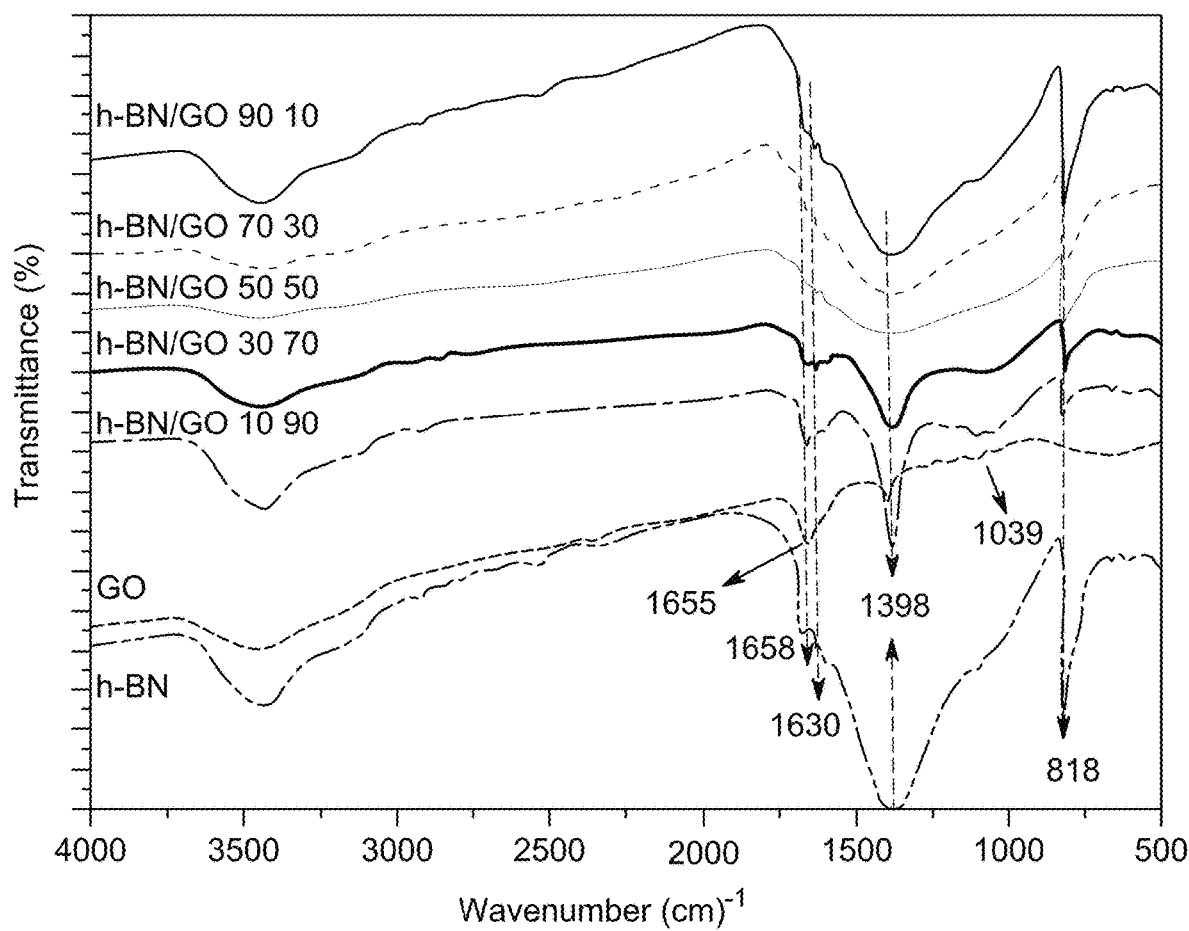
FIG. 4 is a plot of FT-IR spectra of RGO/h-BN nanocomposites, h-BN, and GO, according to an illustrative embodiment.

Representative FT-IR spectra of RGO/h-BN nanocomposites, h-BN, and RGO are depicted in FIG. 4. Analysis of the peaks observed provides insight into the chemical species making up the composites. For example, the broad peak around 3500 cm$^{-1}$ is characteristic of an OH functional group. Peaks near 1655 cm$^{-1}$ correspond to absorption by double bonds, such as C=O, C=N, and C=C. The peak at 1630 cm$^{-1}$ corresponds to a —COOH functional group, and peaks at 1398 cm$^{-1}$ and 1039 cm$^{-1}$ correspond to C—OH and C—O single bonds, respectively. Peaks corresponding to h-BN are observed at 818 cm$^{-1}$ and 1398 cm$^{-1}$.

Figure 13:
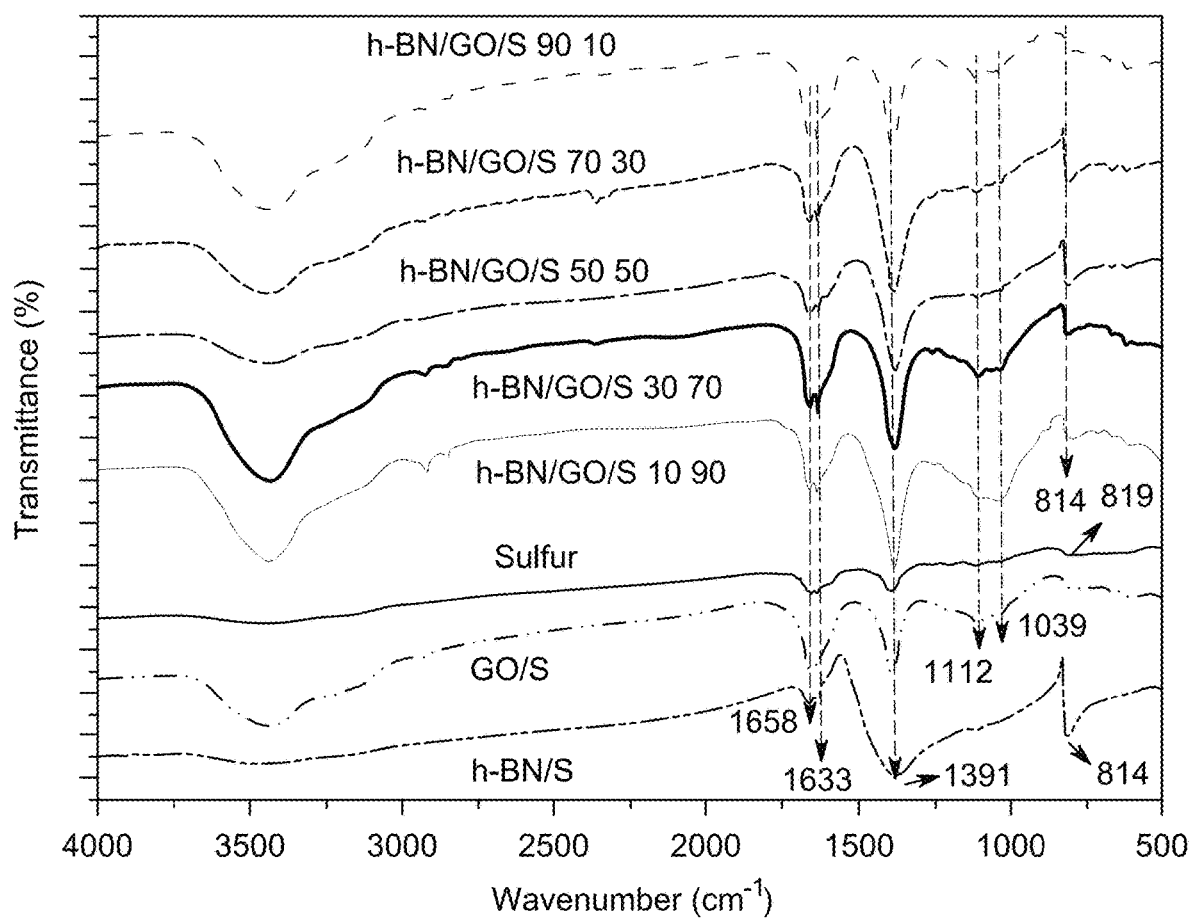
FIG. 13 is a plot of FT-IR spectra of RGO/h-BN/S, h-BN/S, and GO/S nanocomposites, according to an illustrative embodiment.

Representative FT-IR spectra of RGO/h-BN/S, h-BN/S, and RGO/S nanocomposites are depicted in FIG. 13. FT-IR spectra of such sulfur-containing nanocomposites are similar to those obtained for non-sulfur containing materials (of FIG. 4), with an additional peak at 1112 cm$^{-1}$, corresponding to a BC or CS single bond.

Example 3: Thermal Properties of Nanocomposites

Thermogravimetric analysis (TGA) was performed using an STA 7200 thermogravimetric analysis system to determine thermal stability of nanocomposites at temperatures from 30° C. to 500° C. with a heating rate of 7 or 10° C./min.

Figure 8:
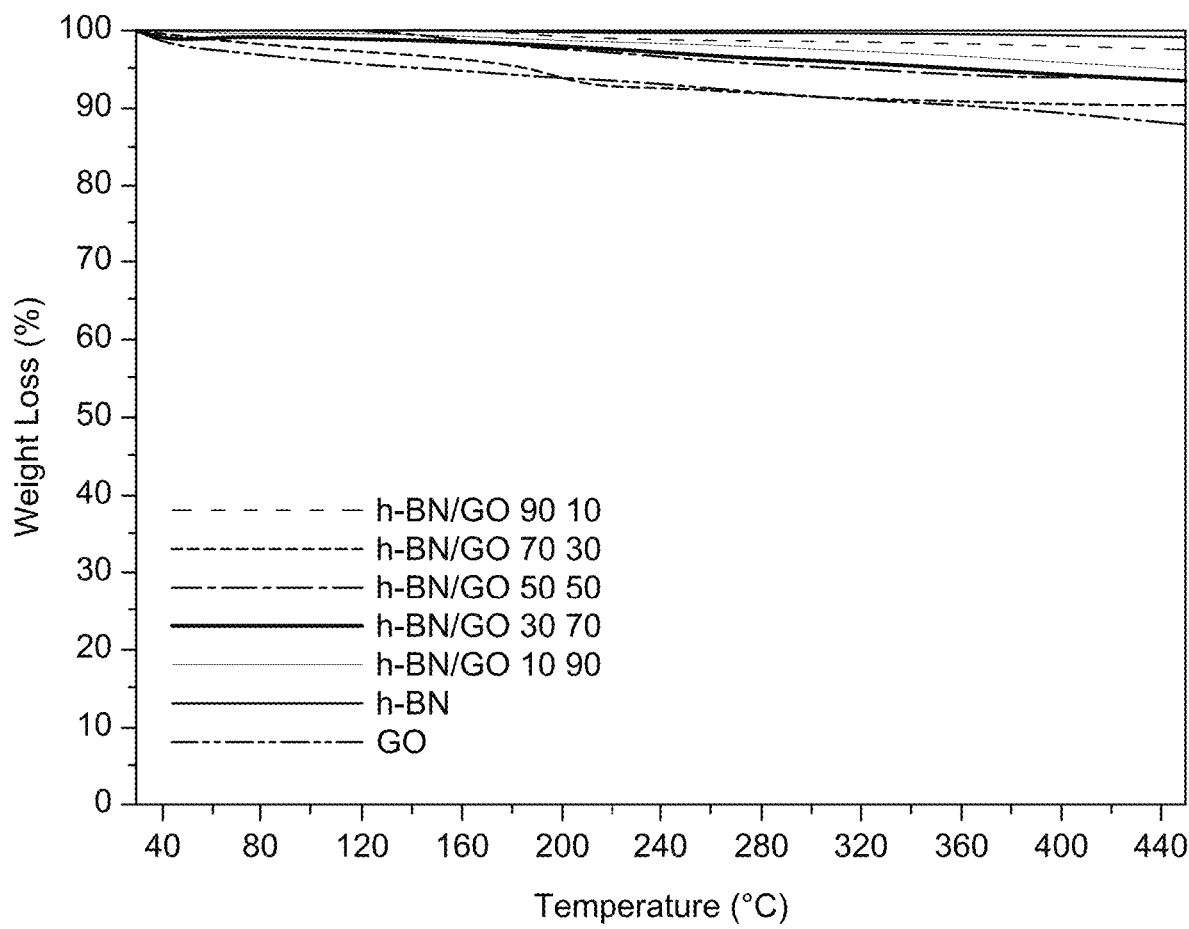
FIG. 8 is a plot of TGA curves of RGO/h-BN nanocomposites, h-BN, and GO, according to an illustrative embodiment.
Figure 9:
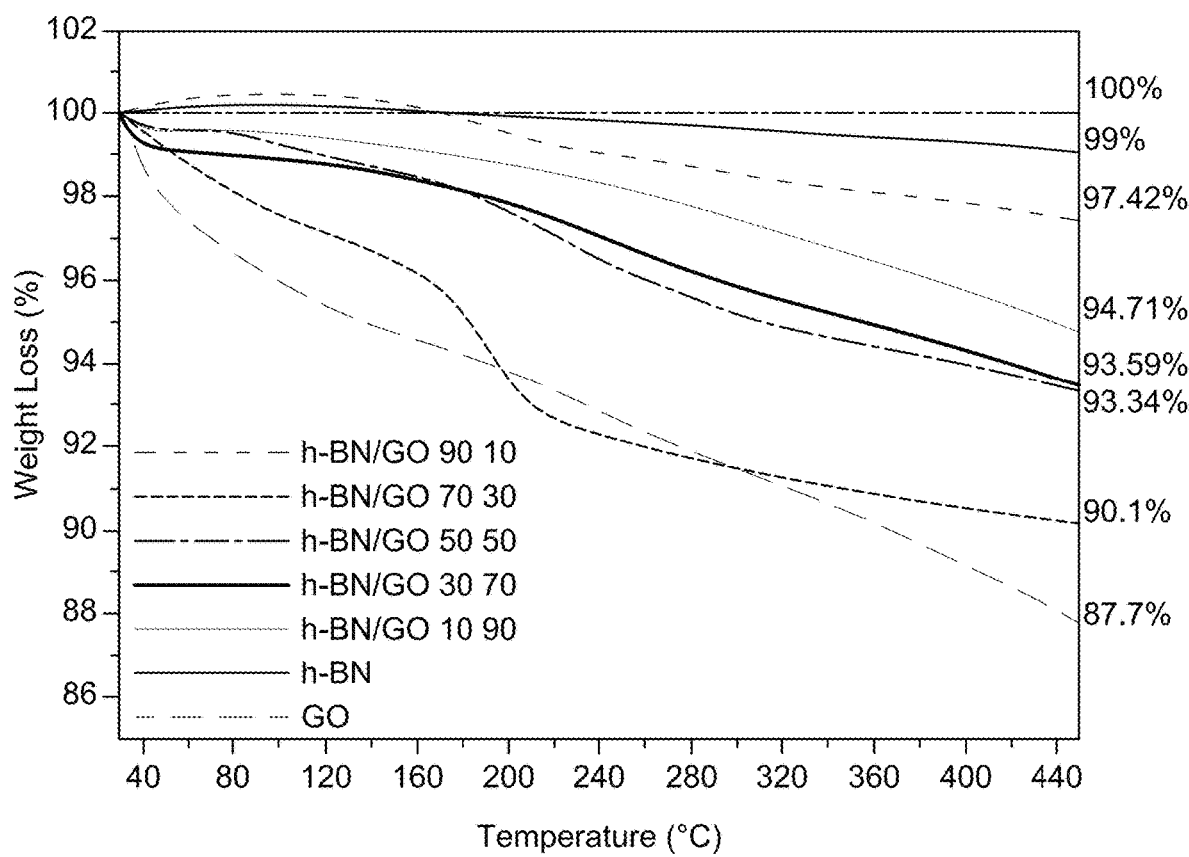
FIG. 9 is a plot of TGA curves of RGO/h-BN nanocomposites, h-BN, and GO, according to an illustrative embodiment.
Figure 22:
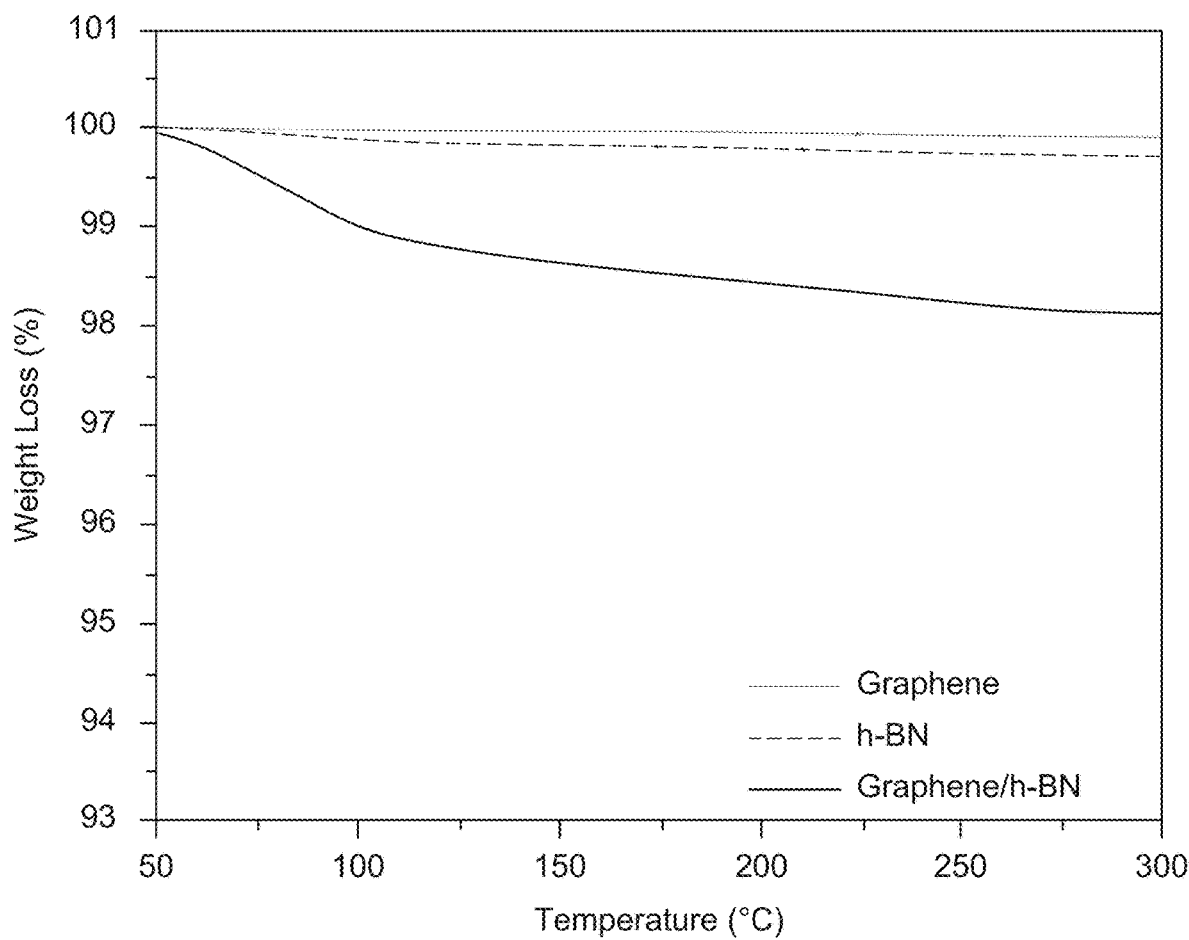
FIG. 22 is a plot of TGA curves of graphene/h-BN nanocomposites, h-BN, and GO, according to an illustrative embodiment.

Representative TGA curves for RGO/h-BN nanocomposites, h-BN, and RGO are depicted in FIGS. 8, 9, and 22. TGA analysis demonstrates a high thermal stability of h-BN, with a char residue content of about 99% at 450° C. In contrast, TGA analysis of RGO demonstrates a lower thermal stability, with weight loss first occurring at 130° C. attributed to removal of absorbed or intercalated water, followed by weight loss over the range of 130° C. to 450° C. attributed to decomposition of labile oxygen-containing functional groups and corresponding release of $CO_2$ and CO. RGO exhibits a char residue content of about 87.7% at 450° C. RGO/h-BN nanocomposites display an increased thermal stability relative to RGO alone. Without wishing to be bound by any particular theory, it is believed that increased stability of RGO/h-BN nanocomposites relative to RGO alone is due to incorporation of h-BN. Char reside contents at 450° C. for nanocomposites comprising 1:9, 3:7, 1:1, 7:3, and 9:1 RGO to h-BN were 97.4%, 90.1%, 93.3%, 93.6%, and 94.7%, respectively.

Figure 18:
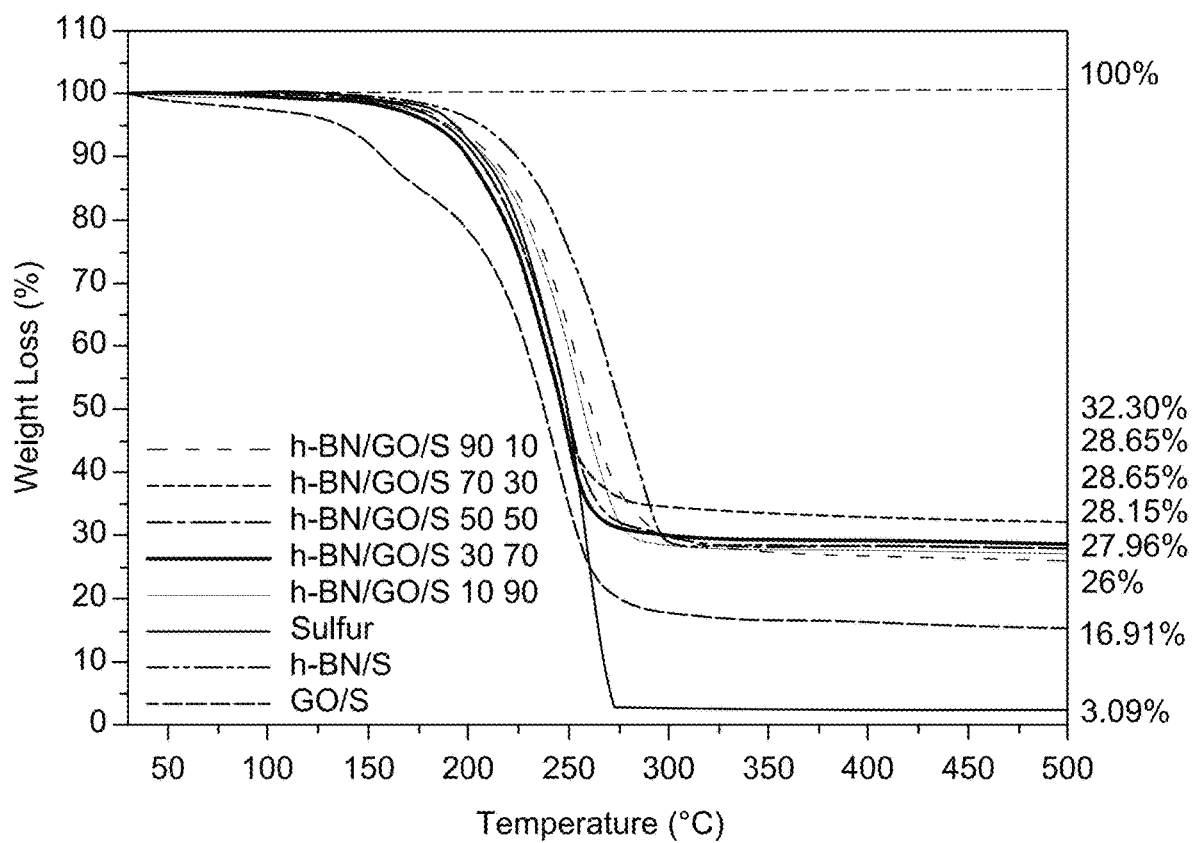
FIG. 18 is a plot of TGA curves of RGO/h-BN/S, h-BN/S, and GO/S nanocomposites, according to an illustrative embodiment.
Figure 19:
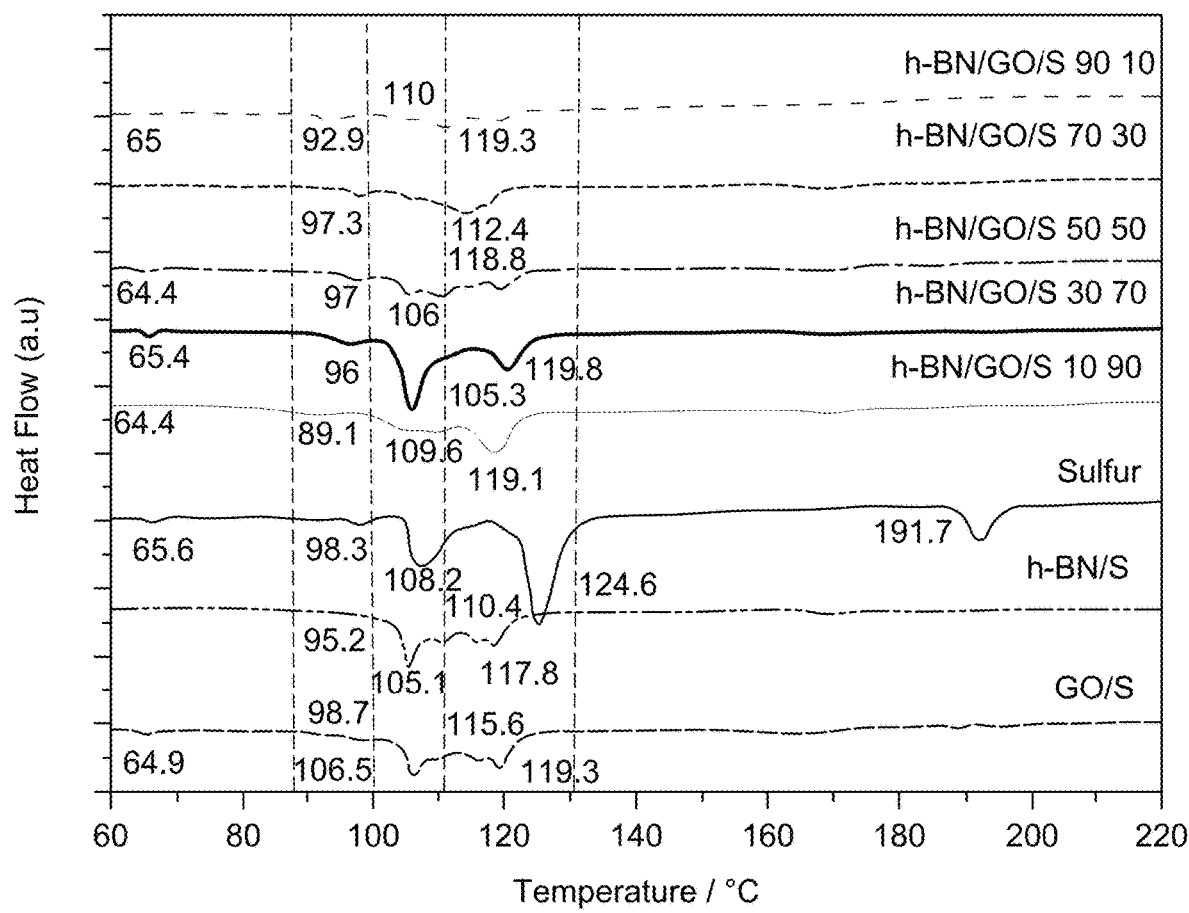
FIG. 19 is a plot of DSC curves of RGO/h-BN/S, h-BN/S, and GO/S nanocomposites, according to an illustrative embodiment.

Representative TGA curves for RGO/h-BN/S, h-BN/S, and RGO/S nanocomposites are depicted in FIG. 18. TGA analysis of sulfur exhibits weight loss at approximately 200° C., with a total loss of about 97.5% by about 270° C. Near complete or complete sublimation of sulfur was observe across all samples by approximately 270° C. A weight loss of 71.85% of h-BN/S, approximately corresponds to the sulfur content of the sample, whereas RGO/S exhibits a greater weight loss of almost 83.96% at around 270° C. Char residue content for RGO/h-BN/S nanocomposites with RGO/h-BN ratios of 1:0, 3:7, 1:1, 7:3, and 9:1 was 26%, 32.3%, 28.7%, 28.7%, and 28.0%, respectively.

Thermal stability was further probed via differential scanning calorimetry (DSC) using a differential scanning calorimeter DSC7200. Nanocomposites were cooled from room temperature to a temperature of −20° C. at a rate of 10° C./min, then heated to 500° C. at a rate of 2° C./min under a nitrogen atmosphere.

Figure 10:
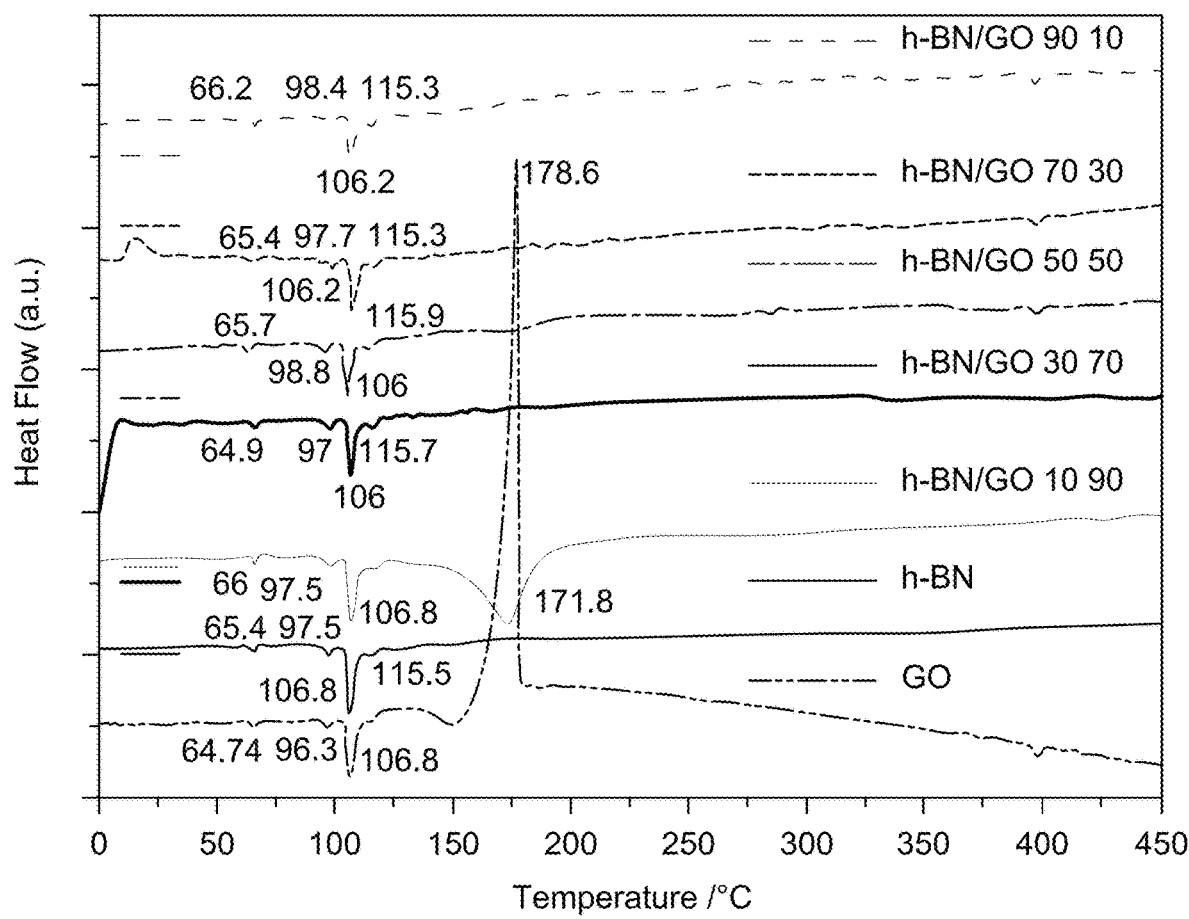
FIG. 10 is a plot of DSC curves of RGO/h-BN nanocomposites, h-BN, and GO, according to an illustrative embodiment.
Figure 23:
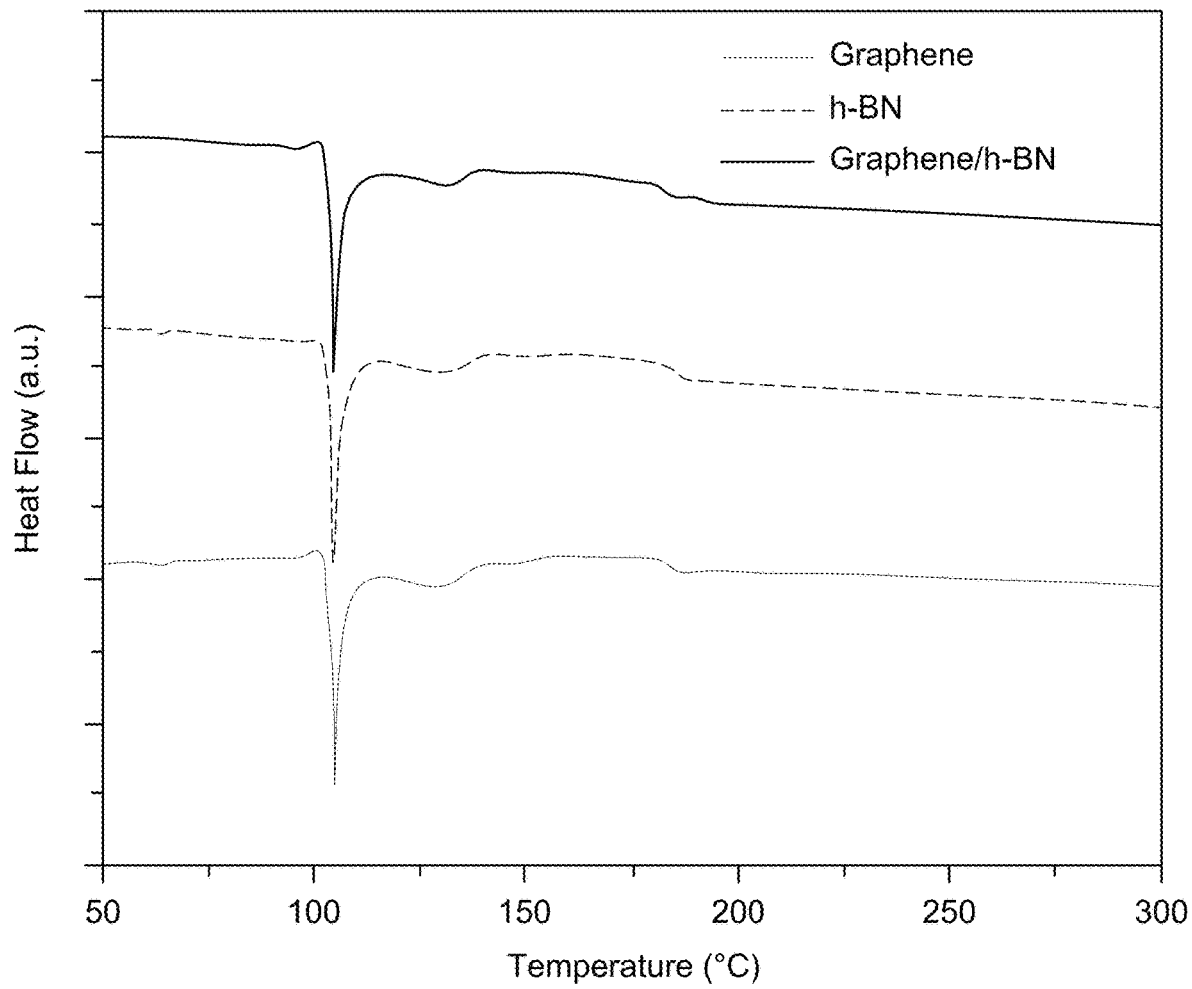
FIG. 23 is a plot of DSC curves of graphene/h-BN nanocomposites, h-BN, and GO, according to an illustrative embodiment.

Representative DSC thermograms for RGO/h-BN nanocomposites, h-BN, and RGO are depicted in FIGS. 10 and 23. The endothermic peak occurring at 106° C. in all spectra is attributed to evaporate of water. The strong exothermic peak at 178.6° C. in RGO spectra is attributed to reduction of RGO associated with decomposition of labile oxygen-containing functional groups and release of $CO_2$ and CO. Among RGO/h-BN nanocomposites, an endothermic peak is observed at 178.6° C. in the 9:1 RGO/h-BN nanocomposite, attributed to partial reduction of RGO. As h-BN content is increased, endothermic peaks decrease, for example in 3:7 and 1:1 RGO/h-BN nanocomposites only small endothermic peaks are observed between 150° C. and 180° C., and in 1:9 and 7:3 RGO/h-BN nanocomposites no endothermic peak is detected in this range.

Representative DSC thermograms for RGO/h-BN/S, h-BN/S, and RGO/S nanocomposites are depicted in FIG.

19. The representative DSC thermogram of sulfur exhibits three major endothermic peaks at approximately 108.2° C., 124.6° C., and 160° C., corresponding to the α→β transition, melting of β-sulfur, and λ-transition, respectively. The representative DSC thermogram of RGO/S exhibits a small endothermic peak at approximately 178.6° C., corresponding to the exothermic peak of RGO, and two additional endothermic peaks at approximately 106.5° C. and 115.6° C. The representative DSC thermogram of h-BN/S exhibits endothermic peaks at 105.1° C. and 117.9° C. Of the RGO/h-BN/S nanocomposites, representative spectra for a 7:1 RGO/h-BN/S nanocomposite exhibits the highest melting degree, indicating a high stability at high temperatures.

Example 3: Physical Properties of Nanocomposites

Figure 11:
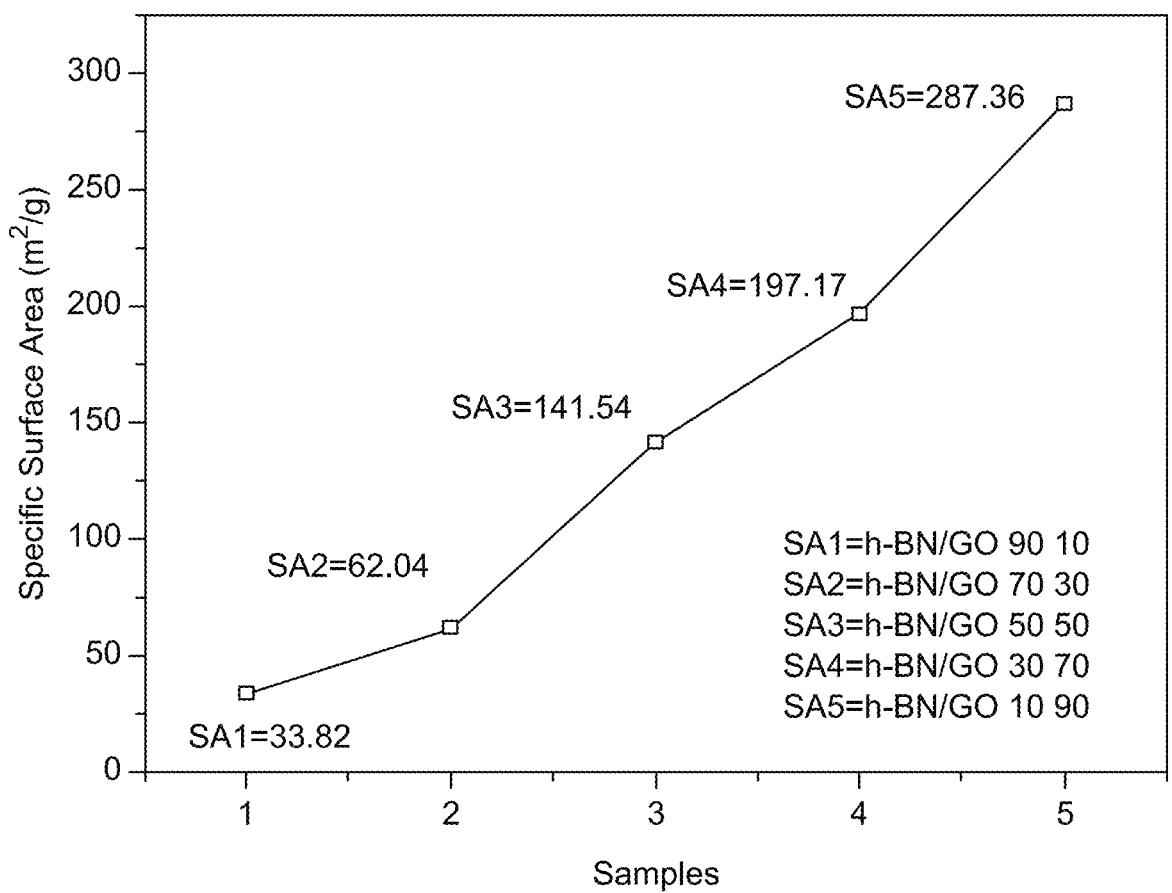
FIG. 11 is a plot of BET specific surface area of RGO/h-BN nanocomposites, according to an illustrative embodiment.

Specific surface area of the nanocomposites was measured via the Brunauer-Emmett-Teller method using a Micromeritics ASAP 2020 surface area analyzer. Specific surface area was calculated as 33.82, 62.04, 141.54, 197.17, and 287.36 m$^2$/g for 1:9, 3:7, 1:1, 7:3, and 9:1 RGO/h-BN nanocomposites, respectively. Results of the specific surface area calculations are depicted graphically in FIG. 11.

Mechanical studies were conducted via nanoindentation using a berkovich indenter to collect information such as hardness and modulus of samples.

Figure 20:
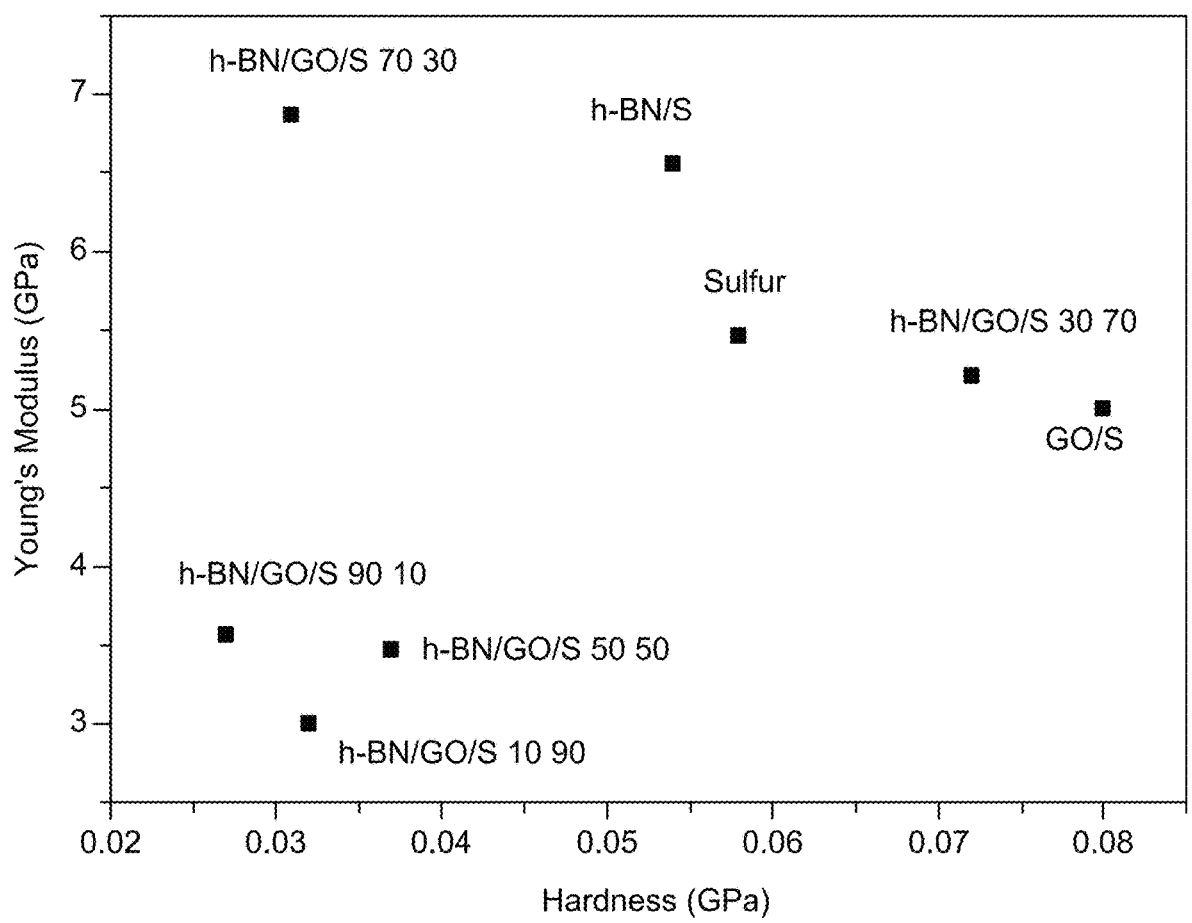
FIG. 20 is a plot of Young's modulus of RGO/h-BN/S, h-BN/S, and GO/S nanocomposites against hardness, according to an illustrative embodiment.

Hardness (H) and Young's modulus ($E_s$) were measured from the P-h profiles of RGO/h-BN/S, h-BN/S, and RGO/S nanocomposites at a 100 μN load. Such measured values are depicted graphically in FIG. 20 and summarized in Table 4. Measured values of Young's modulus and hardness show contributions from h-BN/S and RGO/S, respectively, where h-BN/S increases Young's modulus of a nanocomposite, and RGO/S increases its hardness.

TABLE 4

Physical properties of RGO/h-BN/S, h-BN/S and RGO/S nanocomposites

| Sample | Hardness (GPa) | Young's Modulus (GPa) |
| --- | --- | --- |
| 1/S | 0.027 | 3.57 |
| 2/S | 0.031 | 6.87 |
| 3/S | 0.037 | 3.47 |
| 4/S | 0.072 | 5.22 |
| 5/S | 0.032 | 3.00 |
| S | 0.058 | 5.46 |
| h-BN/S | 0.054 | 6.55 |
| GO/S | 0.08 | 5.00 |

C. Electrochemical Studies

Example 4: Fabrication of Electrode Materials

Method A: The working electrodes were fabricated by manually mixing 80 wt % active material, 10 wt % conductive agent, and 10 wt % binding agent in N-methyl-2-pyrrolidone (NMP). Homogenous slurries were obtained and spread as 100 μm films on aluminum foil substrates, which act as current collectors. The films were dried under vacuum at 80° C. for several hours. Example formulations are presented in Table 5A.

TABLE 5A

Electrode Formulations

| | Formulation 1 | Formulation 2 | Formulation 3 |
| --- | --- | --- | --- |
| Active material | RGO/h-BN | RGO/h-BN/S | RGO/h-BN |
| Conductive agent Binding agent | nanocomposite Prepared via Method 2 Super C65 polyvinylidene fluoride | nanocomposite Prepared via Method 2 Super P polyvinylidene fluoride | nanocomposite Prepared via Method 1 Super C65 polyvinylidene fluoride |

Method B: Alternatively, the working electrodes were fabricated by depositing the electrode material on a stainless steel spacer. Stainless steel spacers were soaked in HCl (1:1, v:v with distilled water) for about 20 minutes to etch the spacers, then washed with ethanol and distilled water. A mixture of active material, conductive agent, and binder in N-methyl-2-pyrrolidone (NMP), prepared as a slurry using a homogenizer for about 12 hours or a probe sonicator for about 30 minutes, were dropped on the spacers, and dried in an oven at 40° C. under vacuum for about 3 days.

Method C: A third method of preparing working electrodes was by soaking nickel foam in the electrode formulation mixture. Punched nickel foam was etched using 1 M HCl and sonicated for about 30 minutes, followed by sonication with acetone for about 10 minutes, and washing with ethanol and distilled water. The etched nickel foam was then dried at 60° C. for 10 minutes. The nickel foam was soaked in a mixture of active material, conductive agent, and binder in N-methyl-2-pyrrolidone (NMP), as described in Formulation 1, for about 24 hours, after which the surface of the electrode was scrapped and the electrode dried in an oven at a temperature of 40° C. for about 5 days. This process was repeated several times to ensure full coverage of the nickel foam with active material.

Example 4a: Preparation of RGO Negative Electrode for Asymmetric Supercapacitor Cells To prepare a negative electrode for asymmetric supercapacitor, graphene oxide was chemically reduced through addition of hydrazine hydrate (100 μL) to a graphene oxide dispersion in distilled water (2 mg/mL, 100 mL). The mixture was heated for three minutes in a microwave, in intervals of 30 seconds to avoid boiling. The solid was collected, washed with distilled water, and dried overnight.

Example 4b: Preparation of RGO/h-BN/$Co_3O_4$ Nanocomposites

RGO/h-BN/$Co_3O_4$ nanocomposites were prepared by adding cobalt acetate to RGO/h-BN nanocomposites (1, 2, and 3) to produce nanocomposites according to Table 5B. Mixtures of RGO/h-BN and cobalt acetate were heated for 1 hour in a CEM MARS 6, microwave acid digestion system to a temperature of 180° C., at a power of 900 W, and a pressure of 150 psi. Samples were filtered and the collected solid was dried at room temperature to yield RGO/h-BN/$Co_3O_4$ nanocomposites.

TABLE 5B

Composition used for preparation of RGO/h-BN/$Co_3O_4$ nanocomposites

| Sample No: | Cobalt acetate (%) | GO % | BN % |
| --- | --- | --- | --- |
| Co1 | 90% | 9% | 1% |

TABLE 5B-continued

Composition used for preparation of RGO/h-BN/Co$_3$O$_4$ nanocomposites

| Sample No: | Cobalt acetate (%) | GO % | BN % |
|---|---|---|---|
| Co2 | 90% | 7% | 3% |
| Co3 | 90% | 5% | 5% |

Example 5: Electrochemical Testing of Electrode Materials

Electrochemical tests were performed using a Gamry 3000 electrochemical workstation in a coin-cell configuration. Cyclic voltammetry (CV) and galvanostatic charge-discharge tests were recorded at a scan rate of 50 mV/s over a potential range of 0 to 1.5 V. Electrochemical impedance spectroscopy (EIS) was conducted at a scan rate of 10 mV/s over a range of 1 Hz to 100 kHz. Specific capacitance was calculated from CV (Cs, c) and charge-discharge tests (Cs, g) according to the following formulas:

$$Cs, c = \frac{\int idv}{2m\Delta VS} \quad (1)$$

$$Cs, g = \frac{\Delta I t_d}{m\Delta V} \quad (2)$$

where S is the scan rate, m is the mass of active material, AI is the discharge current, $t_d$ is the discharge time, and AV is the electrochemical window.

Study 1

Figure 24:
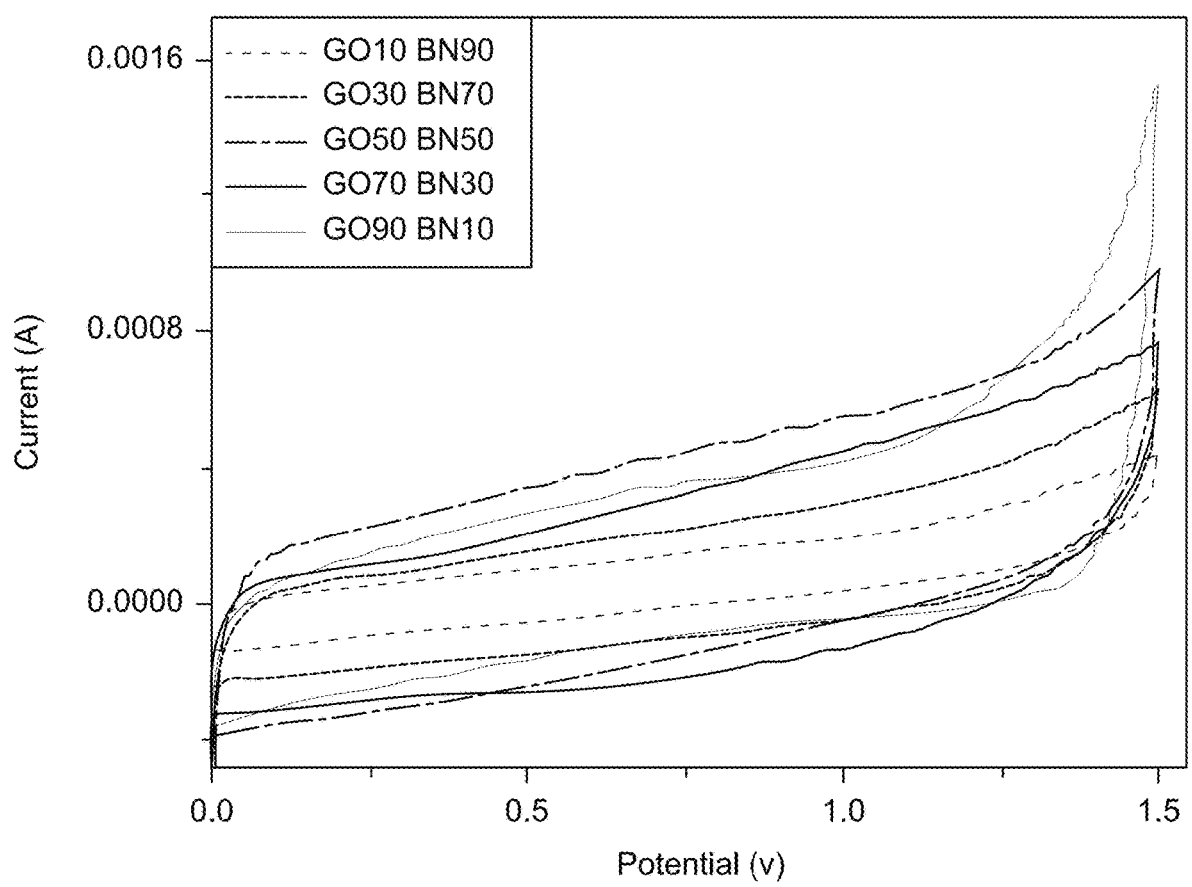
FIG. 24 is a plot of cyclic voltammograms of RGO/h-BN nanocomposites, according to an illustrative embodiment.
Figure 25:
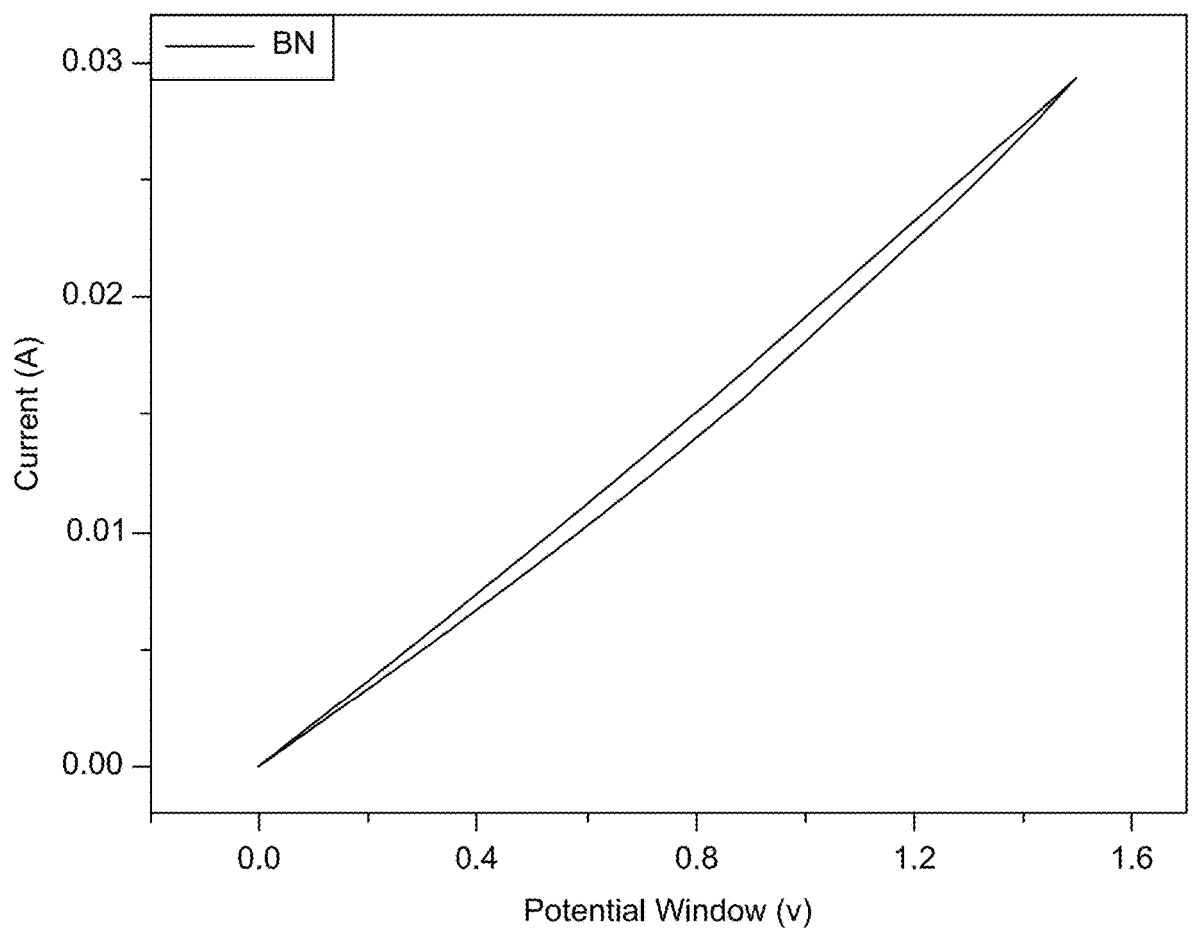
FIG. 25 is a plot of a representative cyclic voltammogram of h-BN.
Figure 26:
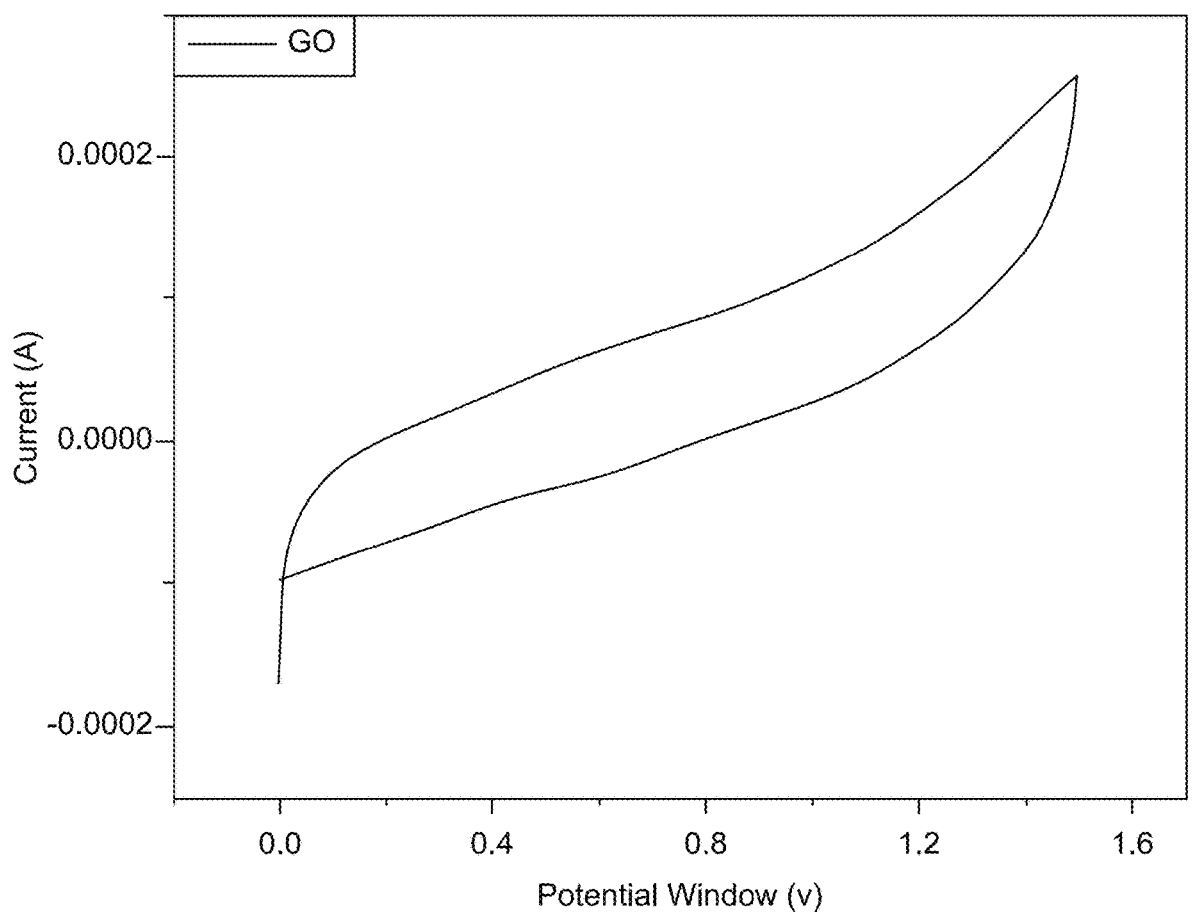
FIG. 26 is a plot of a representative cyclic voltammogram of GO.
Figure 27:
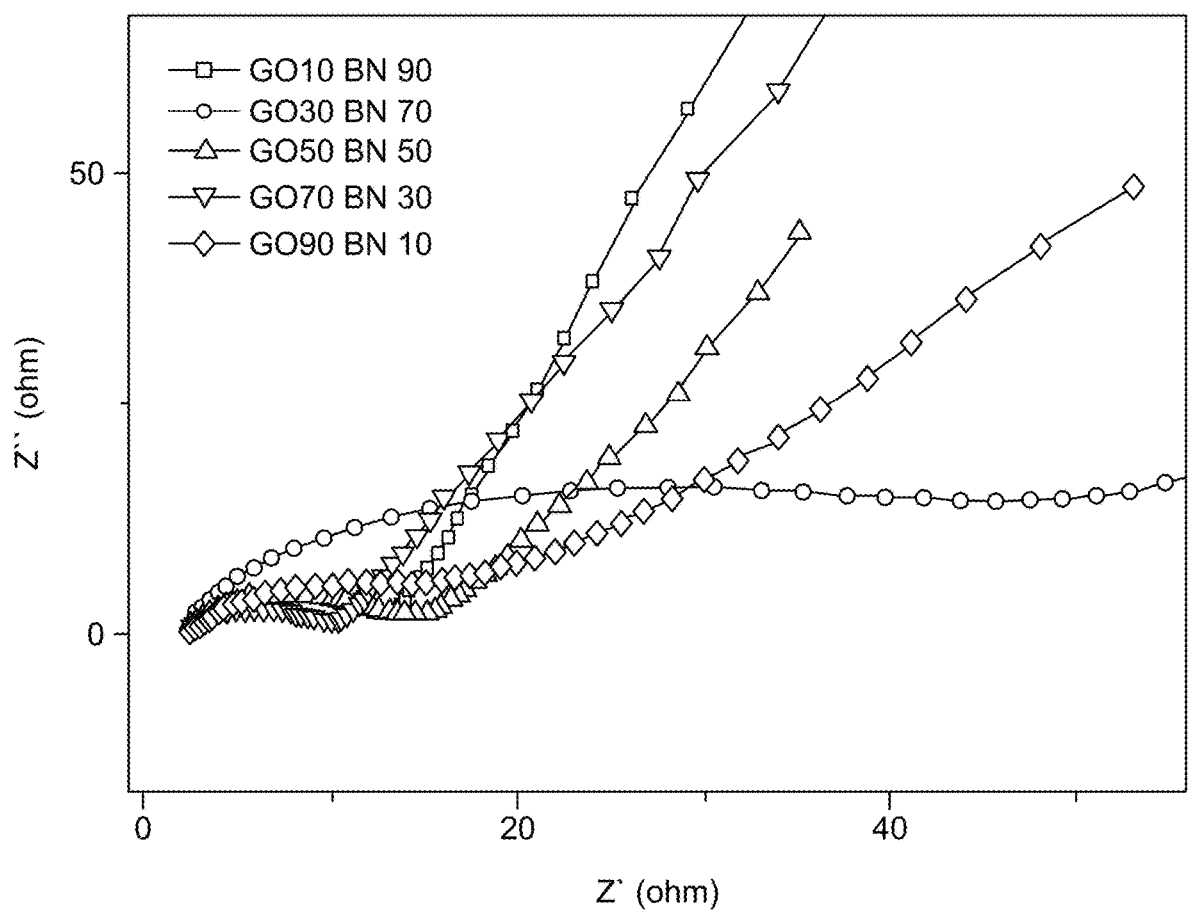
FIG. 27 is a graph depicting Nyquist plots of RGO/h-BN nanocomposites, according to an illustrative embodiment.
Figure 28:
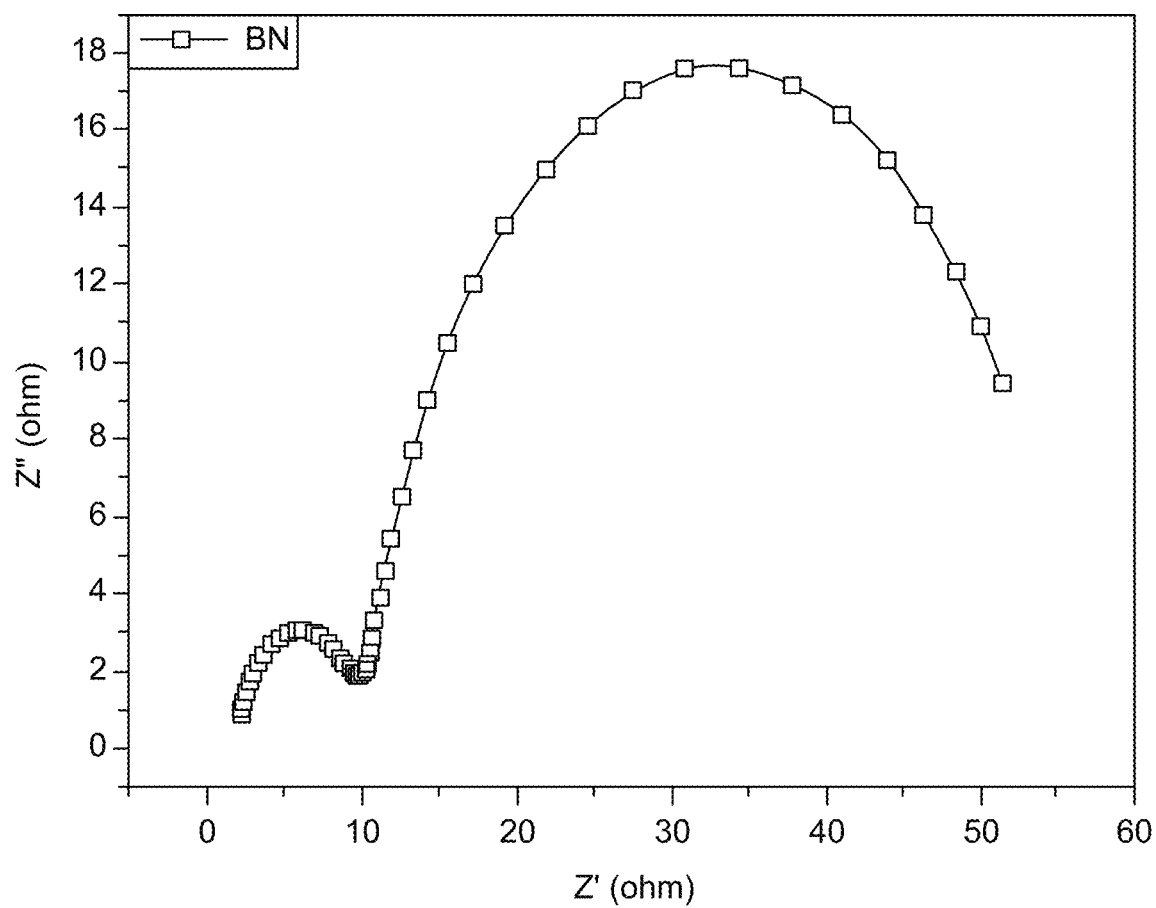
FIG. 28 is a representative Nyquist plot of h-BN.
Figure 29:
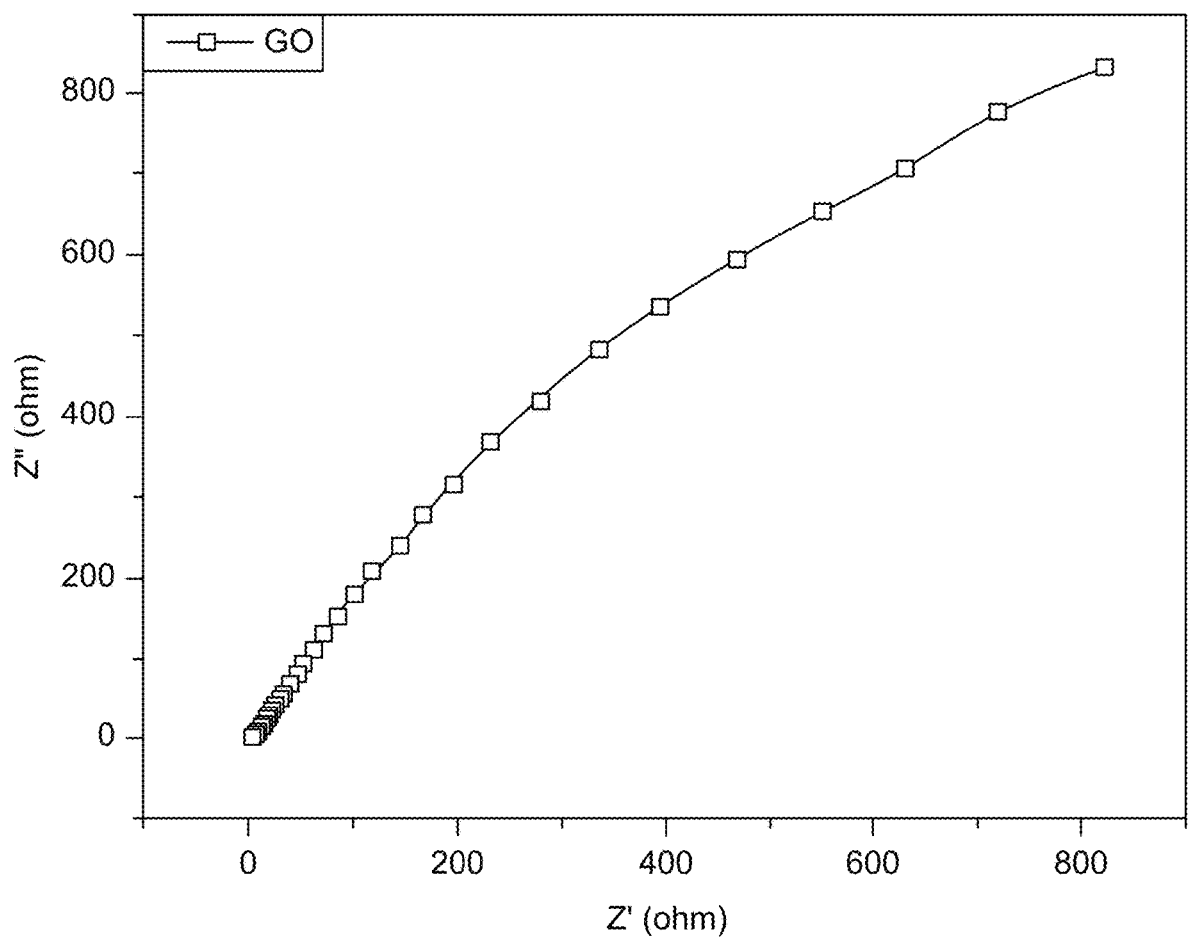
FIG. 29 is a representative Nyquist plot of GO.

A symmetric electrochemical cell was constructed using electrode Formulation 1, LiPF$_6$ as an electrolyte, a copper substrate, and Celgard separator. Cyclic voltammograms were collected at a scan rate of 30 mV/s and a current rate of 500 mA. Representative CV spectra are depicted in FIGS. 24, 25, and 26. Of note, the maximal integral area of the CV loop for RGO/h-BN nanocomposites is larger than that observed for either h-BN and RGO, indicative of synergistic effects of the hybrid with respect to specific capacitance. Specific capacitance determined and charge transfer resistance from charge-discharge tests conducted over a voltage window of 0 to 1.5 V at a current rate of 500 mA are summarized in Tables 6A and 6B, respectively. Data collected from the EIS studies of RGO/h-BN nanocomposites, h-BN, and RGO are depicted graphically in FIGS. 27 to 29. Plots of EIS data from RGO/h-BN nanocomposites are indicative of capacitive behavior.

TABLE 6A

Specific capacitance of RGO/h-BN nanocomposites in Study 1

| Sample | Specific Capacitance (F/g) |
|---|---|
| h-BN | 0 |
| 1 | 2.25 |
| 2 | 7.43 |
| 3 | 17.1 |
| 4 | 7.09 |
| 5 | 16.6 |
| GO | 11.2 |

TABLE 6B

Charge transfer resistance of RGO/h-BN nanocomposites in Study 1

| Sample | Resistance (Ω) |
|---|---|
| h-BN | 35.77 |
| 1 | 349.4 |
| 2 | 46.04 |
| 3 | 12.63 |
| 4 | 7.76 |
| 5 | 89.4 |
| GO | 807 |

Study 2

Figure 30:
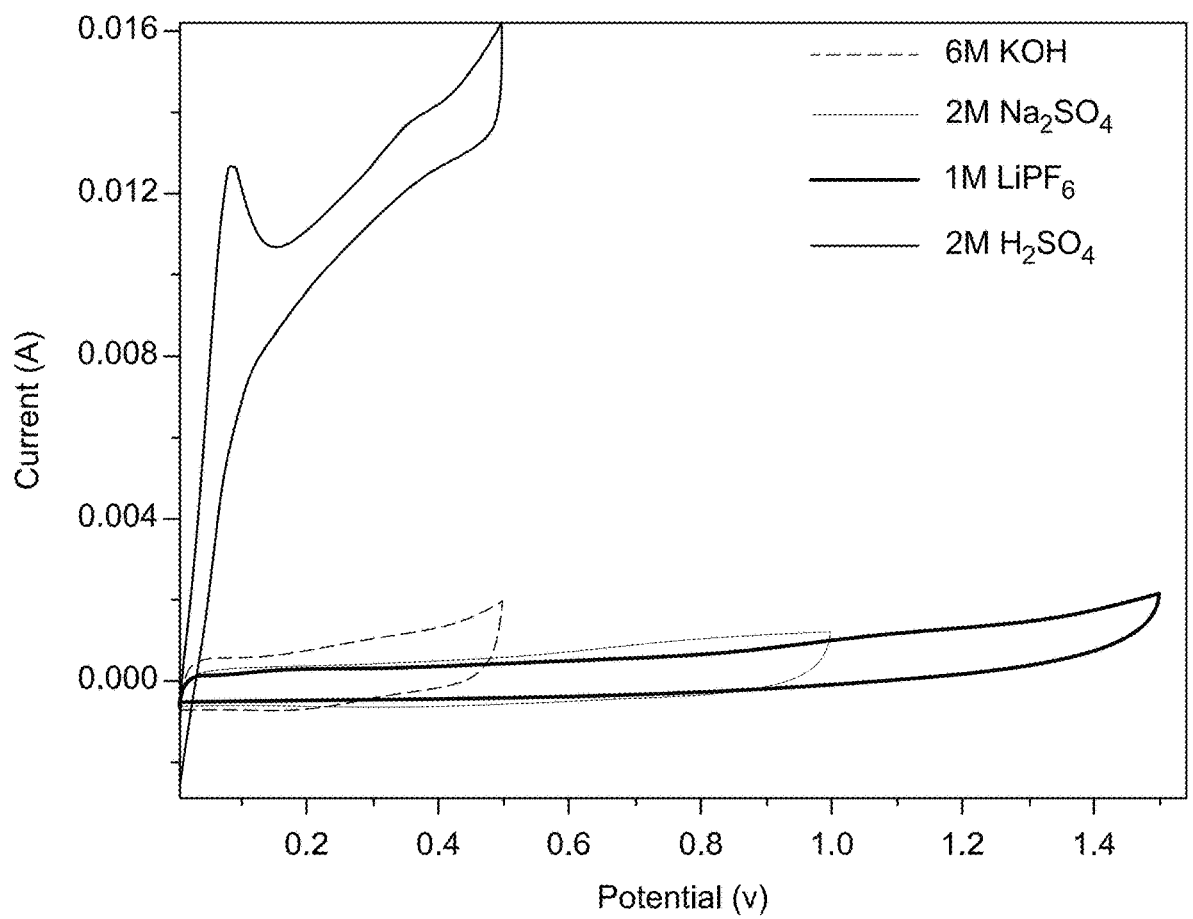
FIG. 30 is a plot of cyclic voltammograms of RGO/h-BN nanocomposites using different electrolyte solutions, according to an illustrative embodiment.
Figure 31:
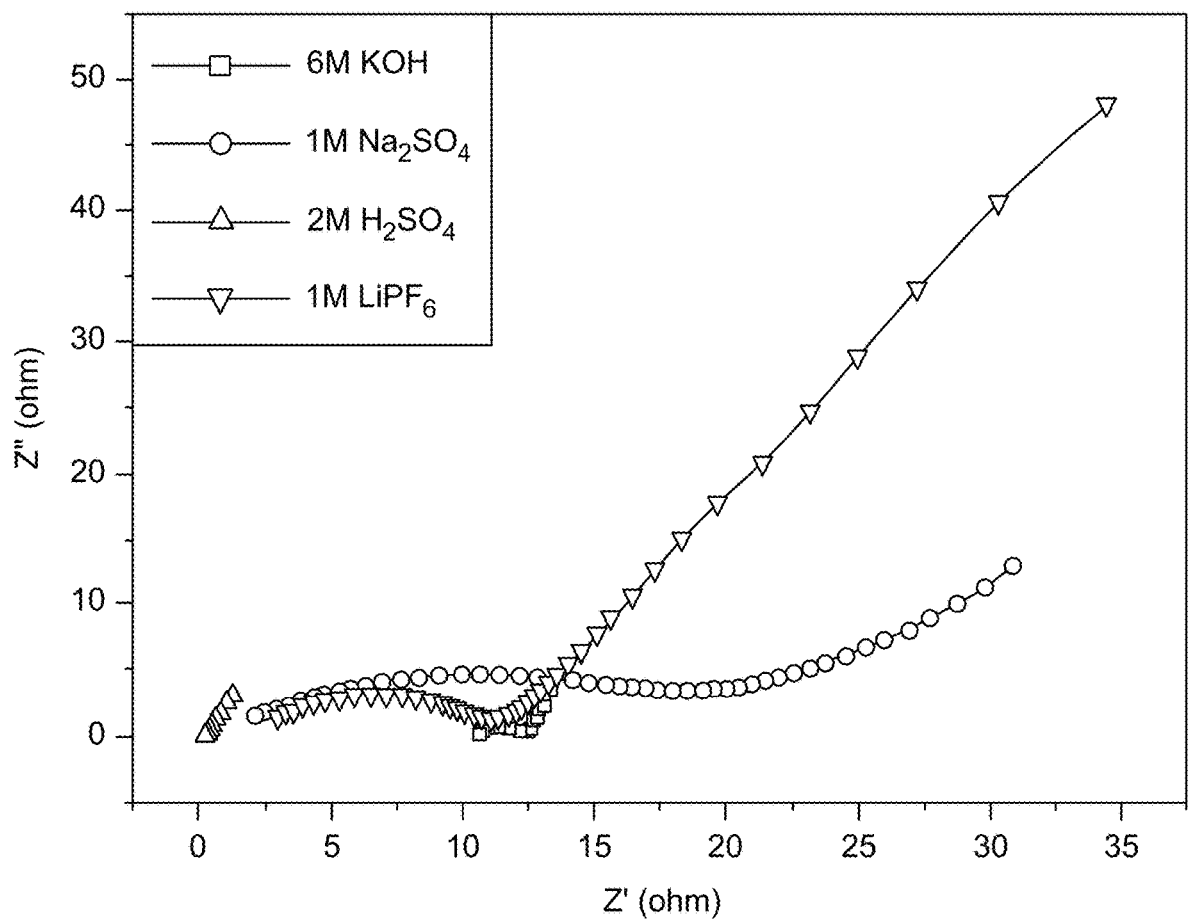
FIG. 31 is a graph depicting Nyquist plots of RGO/h-BN nanocomposites, according to an illustrative embodiment.
Figure 52:
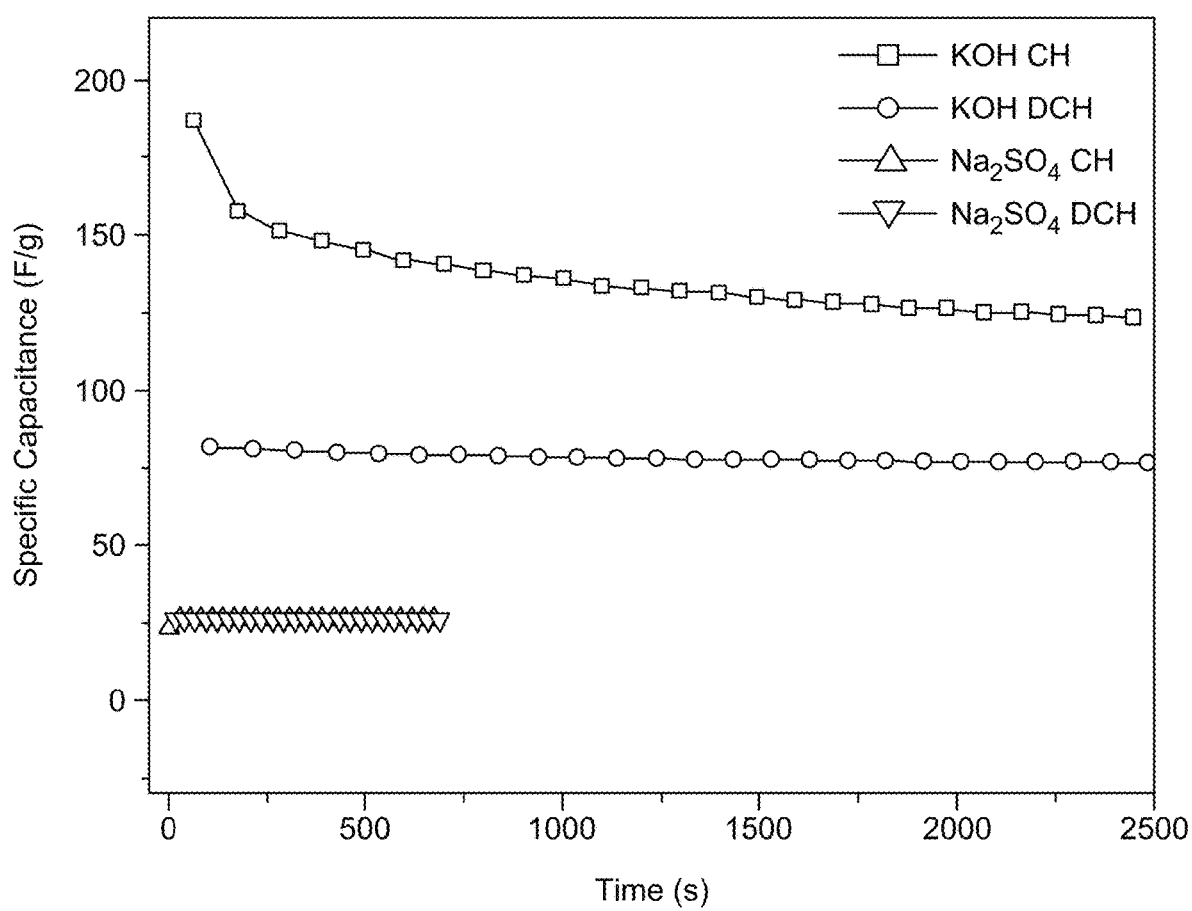
FIG. 52 is a plot of the galvanostatic charge-discharge curves of RGO/h-BN nanocomposites comprising 7:3 RGO to h-BN using 6 M KOH and 2 M NaSO$_4$ as electrolyte and a current of 1.2 mA over a potential window of 0 to 0.5 V for 25 cycles, according to an illustrative embodiment.
Figure 53:
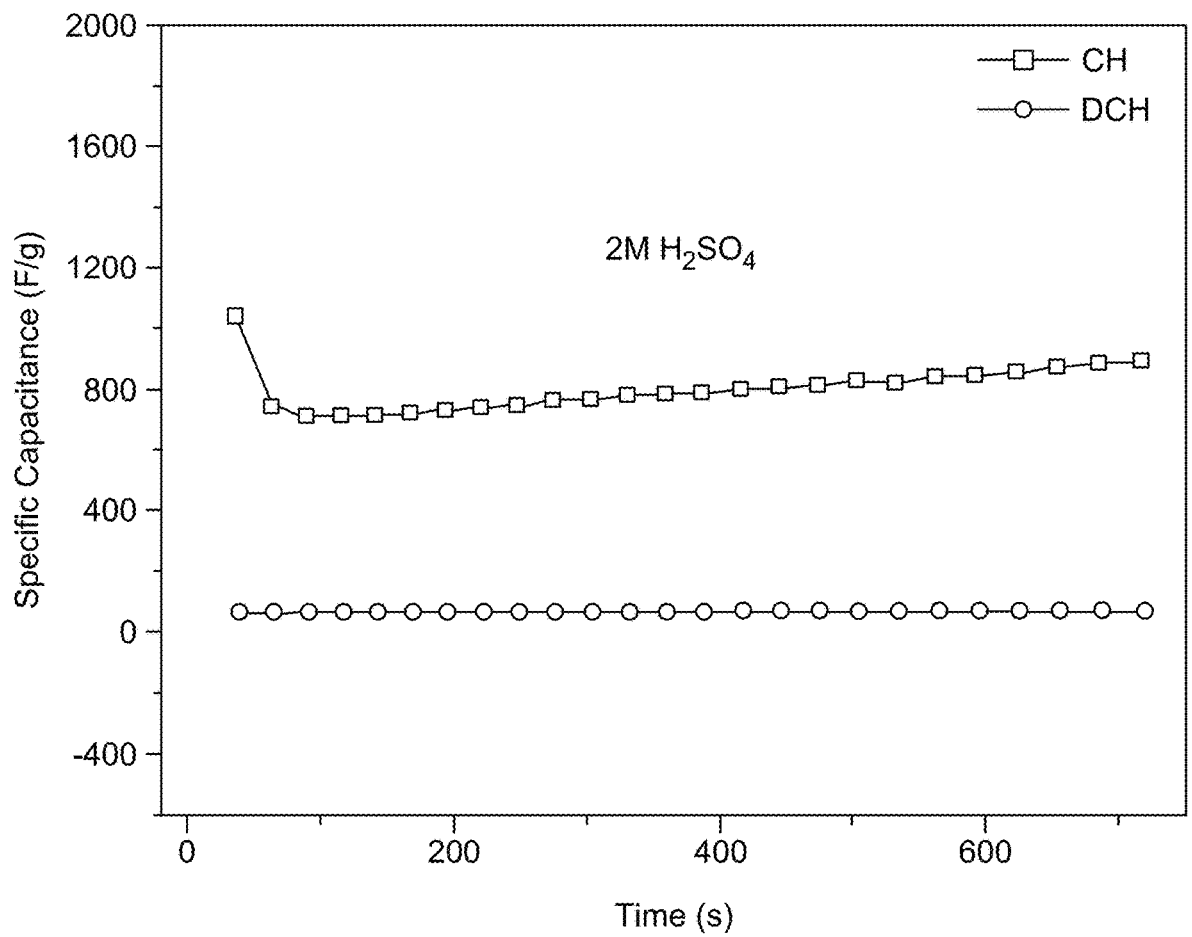
FIG. 53 is a plot of the galvanostatic charge-discharge curves for a 7:3 RGO/h-BN nanocomposite using 2 M H$_2$SO$_4$ as electrolyte and a current of 6 mA, over a potential window of 0 to 0.2 V for 25 cycles, according to an illustrative embodiment.
Figure 54:
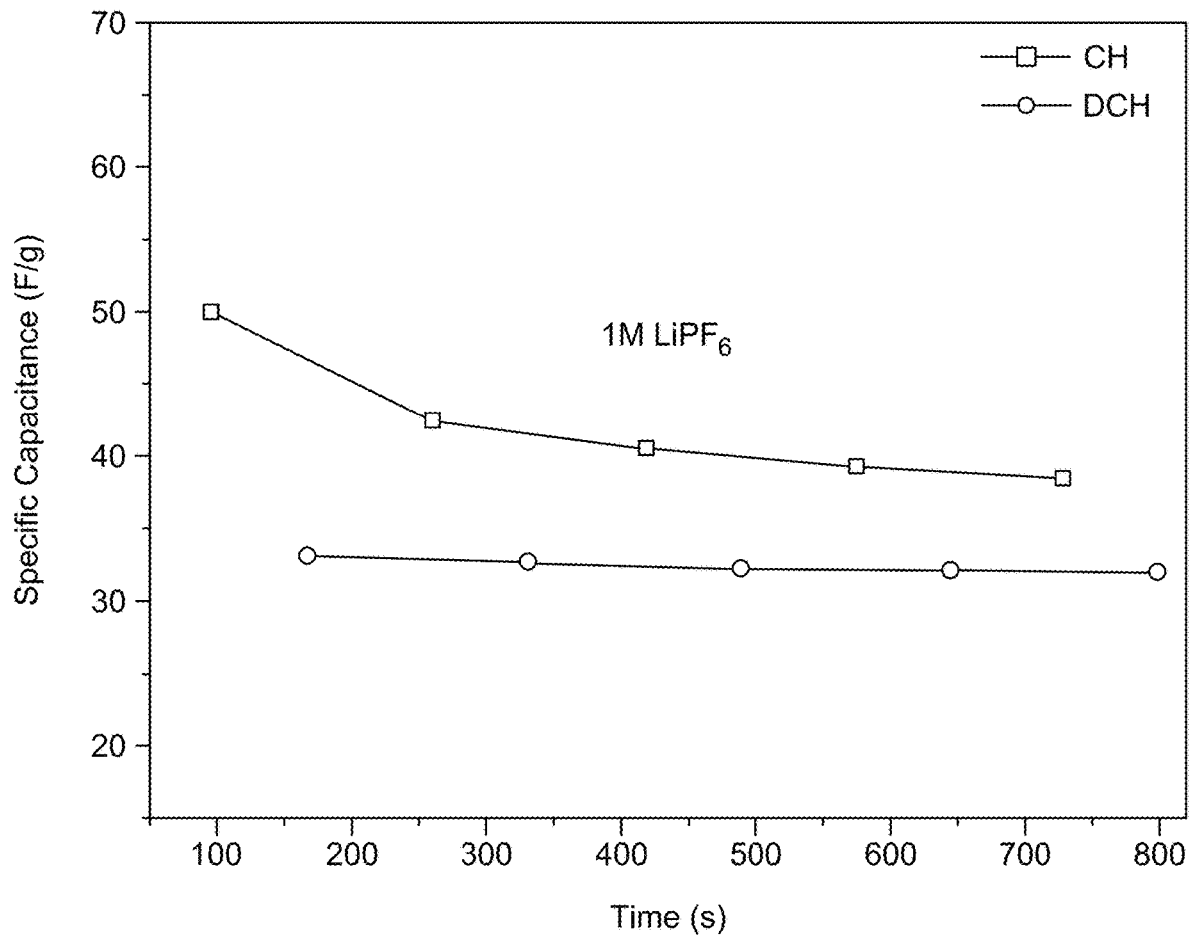
FIG. 54 is a plot of the galvanostatic charge-discharge curves for a 7:3 RGO/h-BN nanocomposite using a 1 M LiPF$_6$ electrolyte and a current of 0.5 mA, over a potential window of 0 to 1 V for 5 cycles, according to an illustrative embodiment.

A symmetric electrochemical cell was constructed using electrode Formulation 1. To study the best electrolyte for RGO/h-BN composites, a cell was constructed with a RGO/h-BN nanocomposite 2. Electrolytes tested for CV and EIS studies included: 6 M KOH, 2 M Na$_2$SO$_4$, 1 M LiPF$_6$, and 2 M H$_2$SO$_4$. Representative CV spectra are depicted in FIG. 30. For electrolytes 6 M KOH and 2 M H$_2$SO$_4$, a potential window of 0 to 0.5 V was scanned. For electrolyte 2 M Na$_2$SO$_4$, a potential window of 0 to 1 V was scanned. For electrolyte 1 M LiPF$_6$, a potential window of 0 to 1.5 V was scanned. Specific capacitance determined by CV was 61.21, 51.3, 112, and 41.59 F/g for tests using KOH, Na$_2$SO$_4$, H$_2$SO$_4$, and LiPF$_6$, respectively (see FIG. 30). EIS studies indicated sulfuric acid exhibited the lowest solution resistance (545.5×10$^{-3}$Ω), excellent electron and ion diffusivity, and charge transfer of 5.596Ω Highest solution resistance was observed with KOH, in addition to low charge transfer resistance $R_s$ and $R_{ct}$ of 6.359 and 11.8Ω, respectively. Nyquist plots of cells using LiPF$_6$ and Na$_2$SO$_4$ as electrolyte were semicircular with a straight line connecting the ends of the curve (see FIG. 31). Galvanostatic charge-discharge CD was conducted on the cells using KOH and Na$_2$SO$_4$ as electrolyte over a potential window of 0 to 0.5 V, with a current of 1.2 mA, and a current density of 280 mA/g. Charge-discharge curves revealed that relative to Na$_2$SO$_4$ as the electrolyte, the cell using KOH electrolyte exhibited a higher capacitance (FIG. 52). Specific capacitance determined from CD for Na$_2$SO$_4$ was 25.56 F/g. Galvanostatic charge-discharge was applied to a cell with 2 M H$_2$SO$_4$ and a current of 6 mA over a potential window of 0 to 0.2 V to yield a capacitance of 62.06 F/g with a high IR drop (corresponding to difference of capacitance between charge and discharge) (FIG. 53). Galvanostatic charge-discharge for a cell using LiPF$_6$ as electrolyte, a current of 0.5 mA, and a current density of 0.12 A/g exhibited a capacitance of 32.46 F/g (see FIG. 54).

Figure 55:
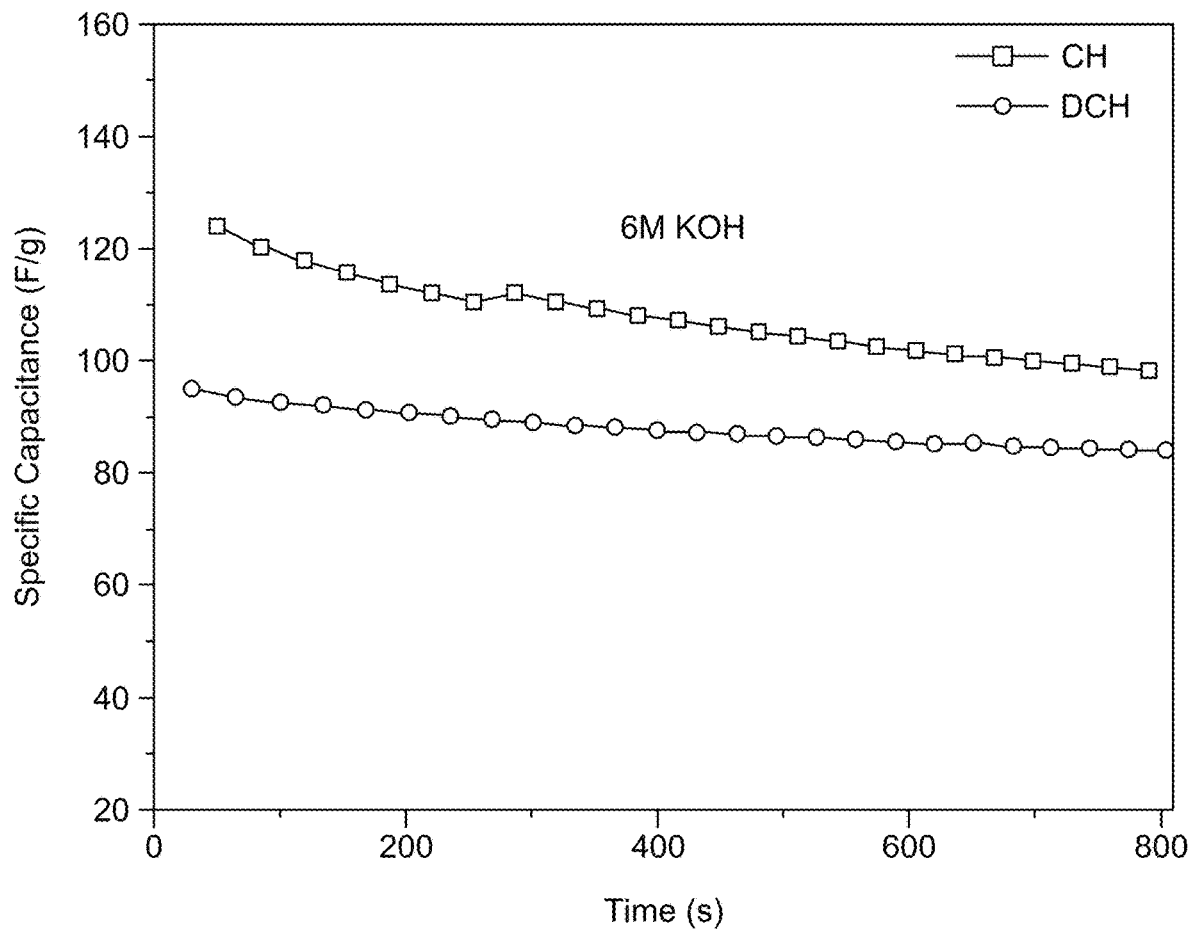
FIG. 55 is a plot of the galvanostatic charge-discharge curves for a 7:3 RGO/h-BN nanocomposite using a 6 M KOH electrolyte and a current of 4 mA, over a potential window of 0 to 0.7 V for 25 cycles, according to an illustrative embodiment.

Notably, using 6M KOH as electrolyte, a high capacitance of 80 F/g was observed at a current of 4 mA over a potential window of 0 to 0.7 V after 25 cycles (FIG. 55). For a cell constructed with a RGO/h-BN nanocomposite 3 and LiPF$_6$ as electrolyte, the lowest IR drop is observed, as well as a high specific capacitance, and a 92% retention of capacitance over 200 charge-discharge cycles over a potential window of 0 to 1 V. Parameters for electrochemical testing and measured specific capacitance are summarized in Table 7.

TABLE 7

Specific capacitance of RGO/h-BN nanocomposite 2 prepared on a Cu substrate in Study 2

| Electrolyte | Separator | Separator soaking time (in electrolyte) | Voltage window (V) | Cs, c (F/g) | Voltage window (V) | Current rate (mA) | Cycle number | EIS $R_\Omega$ | $R_{ct}$ | Cs, g (F/g) |
|---|---|---|---|---|---|---|---|---|---|---|
| 6 M KOH | Filter paper | 3-4 days | 0-0.5 0-1 | 61.21 72.2 | 0-0.7 | 4 | 25 | 11.8 | 6.359 | 80.74 |
| 1 M Na$_2$SO$_4$ | Filter paper | 2 days | 0-0.5 0-1 | 33.75 51.3 | 0-0.5 | 1.2 | 25 | 2.97 | 14.76 | 25.56 |
| 2 M H$_2$SO$_4$ | Filter paper | 2-3 days | 0-0.5 | 112 | 0-0.2 | 6 | 25 | 545.5 × 10$^{-3}$ Ω | 5.5596 | 62.06 |
| LiPF$_6$ | Celgard | 2 days | 0-1.5 | 41.97 | 0-1 | 0.5 | 5 | 2.877 | 7.76 | 32.46 |

Study 3

Figure 56:
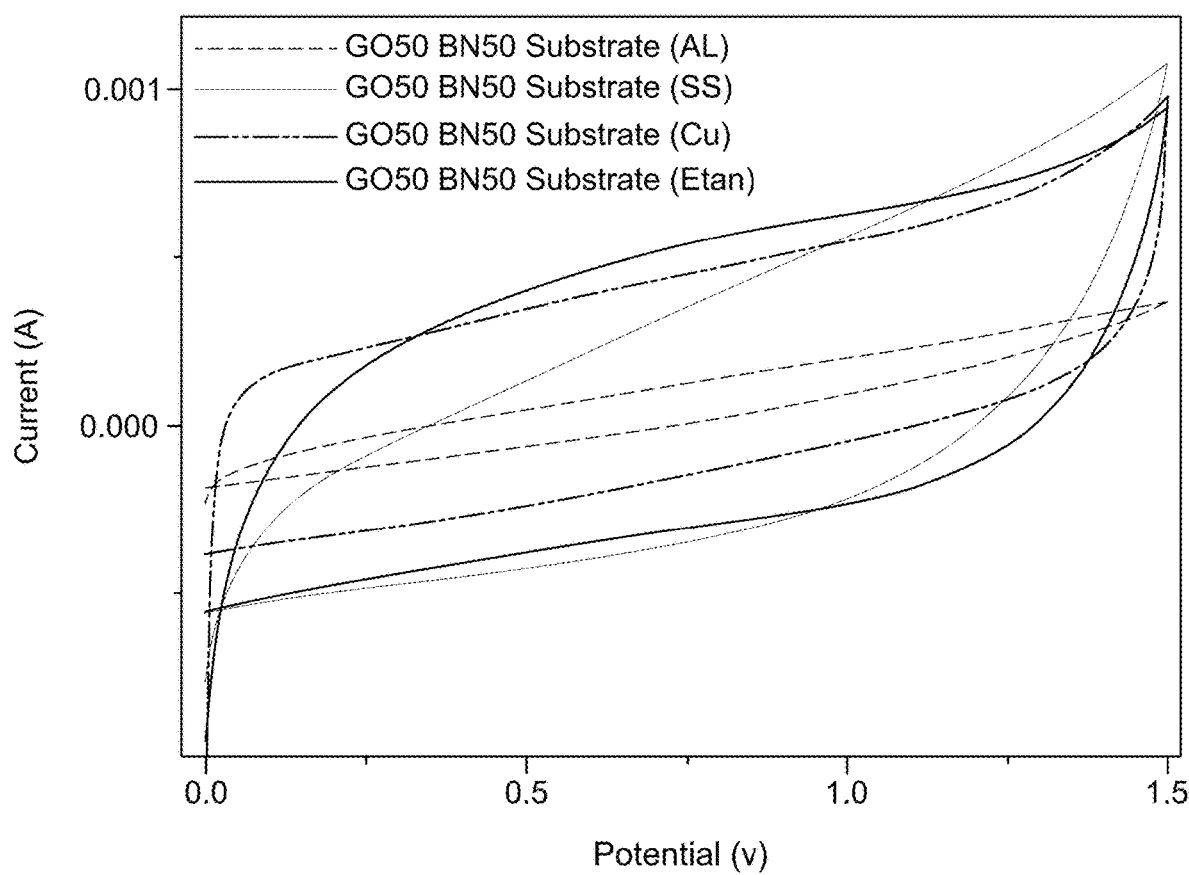
FIG. 56 is a plot of cyclic voltammograms of 1:1 RGO/h-BN nanocomposites on different substrates (Al, SS, Cu, ETAN), using a LiPF$_6$ electrolyte and a scan rate of 30 mV/s, according to an illustrative embodiment.
Figure 57:
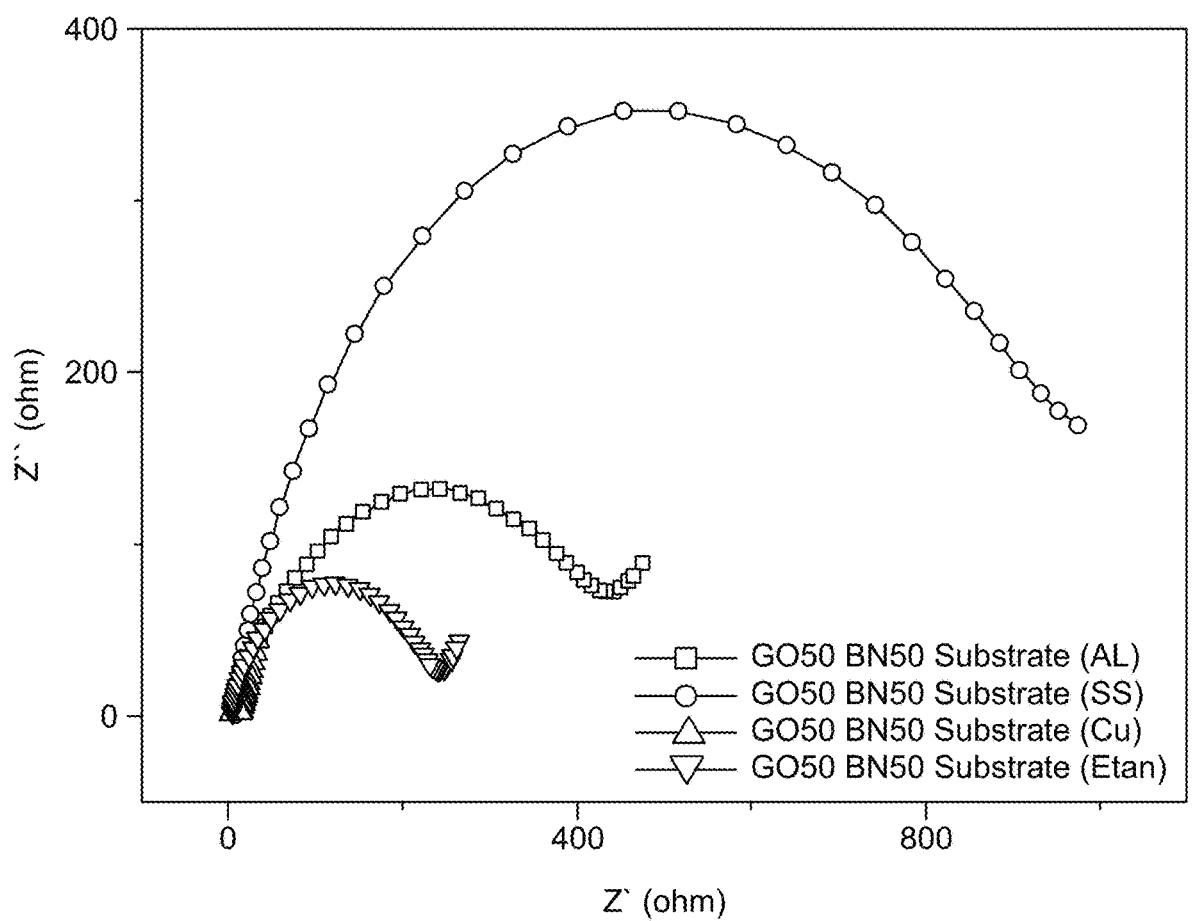
FIG. 57 is a graph depicting Nyquist plots for 1:1 RGO/h-BN nanocomposites on different substrates (Al, SS, Cu, ETAN), using a LiPF$_6$ electrolyte, according to an illustrative embodiment.
Figure 58:
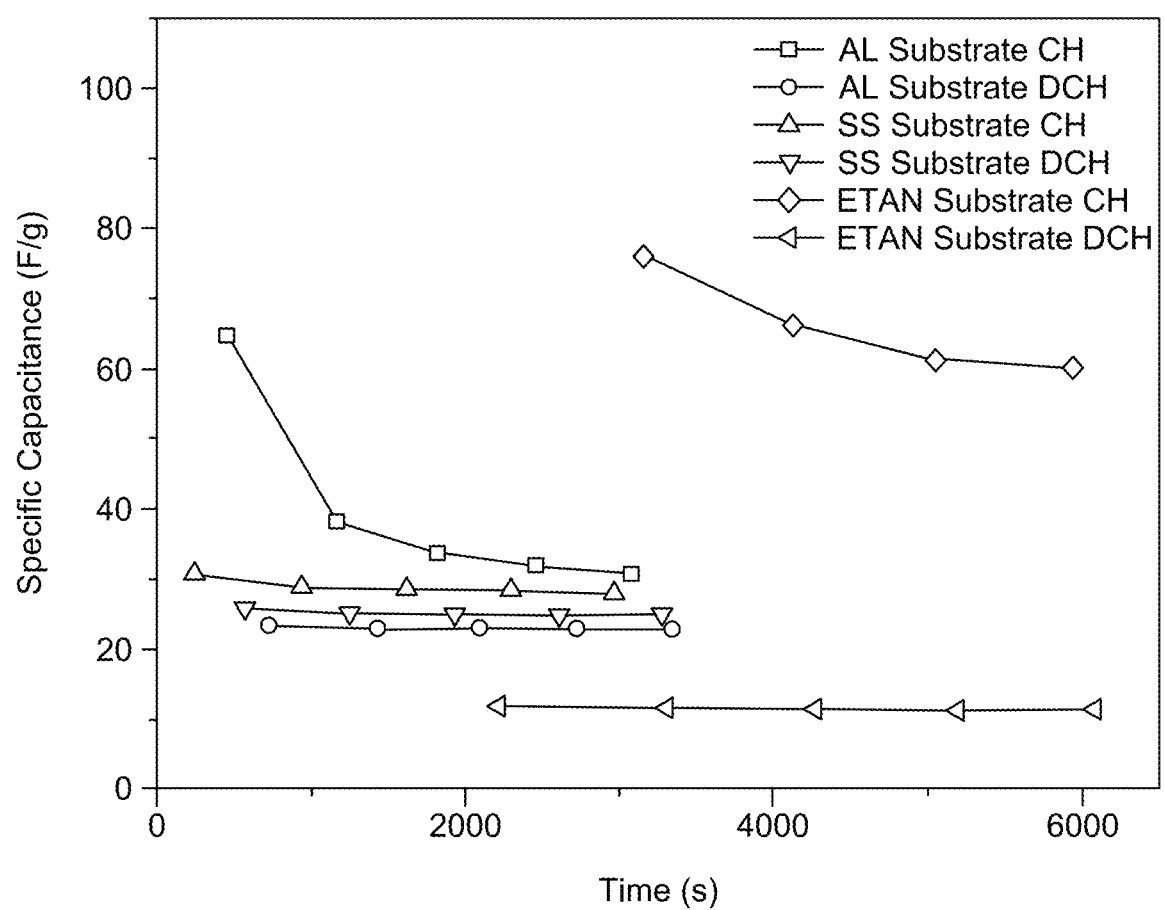
FIG. 58 is a plot of galvanostatic charge-discharge curves for 1:1 RGO/h-BN nanocomposites on different substrates (Al, SS, Cu, ETAN) at a current density of 0.019 A/g, according to an illustrative embodiment.
Figure 59:
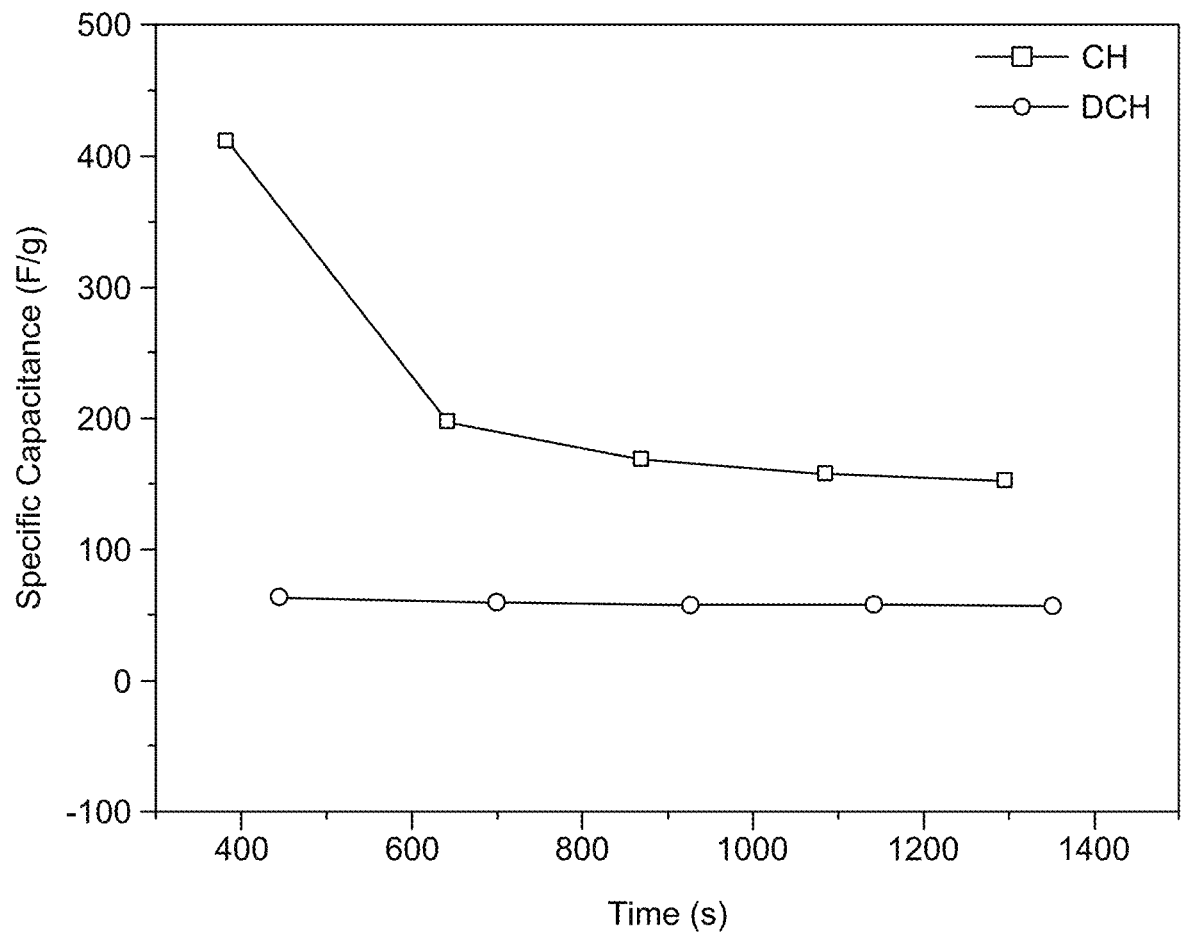
FIG. 59 is a plot of galvanostatic charge-discharge curves for a 1:1 RGO/h-BN nanocomposite on a Cu substrate at a current of 0.5 mA, according to an illustrative embodiment.

To study the effect of substrate on RGO/h-BN nanocomposites four metals (copper, Cu; aluminum, Al; stainless steel, SS; and a silver-aluminum alloy, ETAN) were tested as a substrate for an electrode comprising a RGO/h-BN nanocomposite 3. A coin cell was constructed using LiPF$_6$ electrolyte and a Celgard separator. Cyclic voltammetry data was collected over a potential window of 0 to 1.5 V at a scan rate of 30 mV/s. Good electrochemical behavior was observed with specific capacitance values of 1.15, 7.068, 9.63, 17.1 F/g for Al, SS, ETAN, and Cu substrates, respectively. CV spectra are depicted in FIG. 56. EIS was applied to each cell and charge transfer resistance measured as 755.4, 294.6, 197.3, 12.63Ω for SS, Al, ETAN, Cu substrates, respectively (FIG. 57). Galvanostatic charge-discharge was applied to each cell over a potential window of 0 to 1 V at a current density of 19 mA/g, with the exception of copper, which was tested at a current density of 240 mA/g. Specific capacitance was determined as 22, 25, 11.49, and 58 F/g for Al, SS, ETAN, and Cu, respectively (FIG. 58). The highest IR drop was observed with ETAN. Moreover ETAN, as well as Al, reacted with KOH electrolyte. The Cu substrate required higher current to operate; while it exhibited the highest specific capacitance by CV and CD, it was unstable and reacted with aqueous electrolytes, such as KOH and H$_2$SO$_4$ (FIG. 59). Use of SS substrate exhibited the lowest IR drop and a relatively high specific capacitance.

Figure 60:
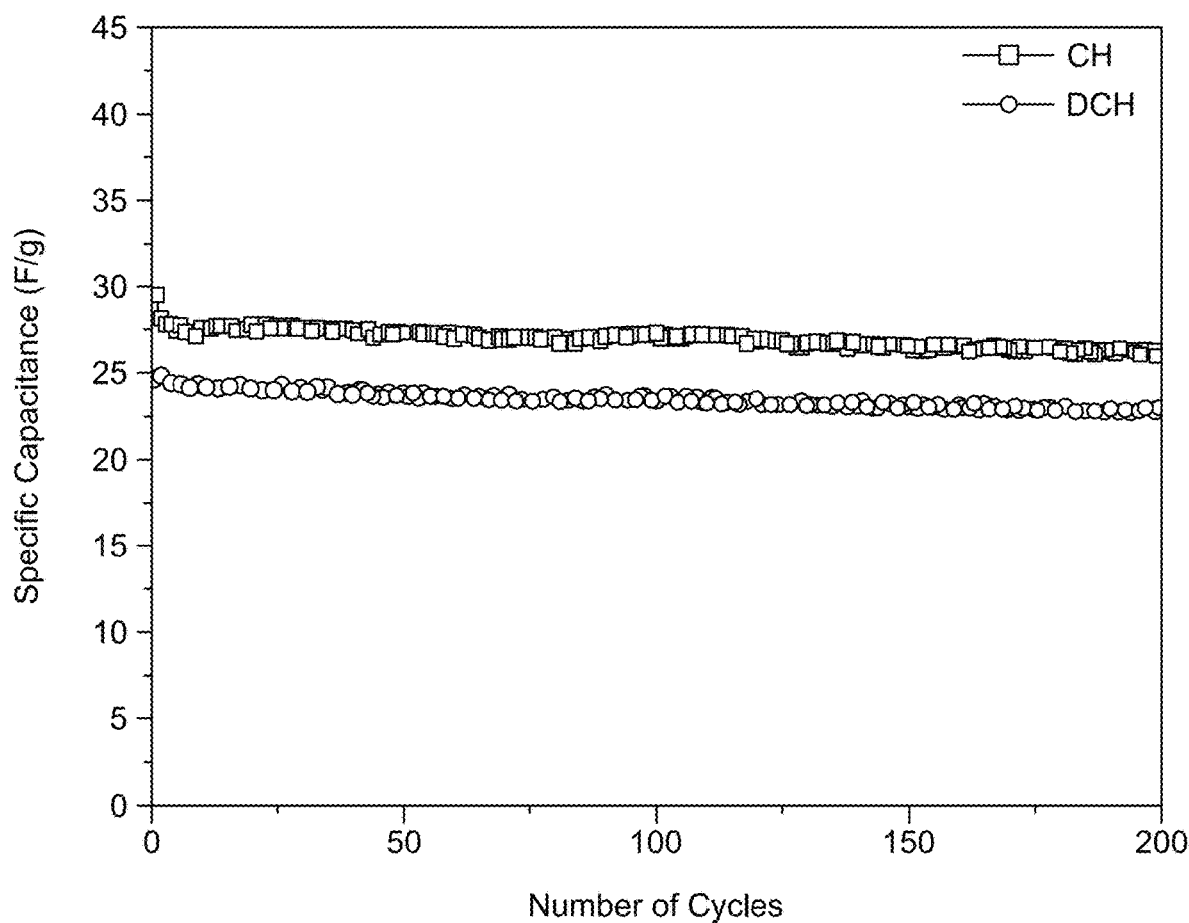
FIG. 60 is a plot of galvanostatic charge-discharge curves for a 1:1 RGO/h-BN nanocomposite on a SS substrate, using a $LiPF_6$ electrolyte, demonstrating cycling stability over 200 cycles, according to an illustrative embodiment.

To study the stability of the RGO/h-BN nanocomposite on a stainless steel substrate, a cell was subjected to 200 charge-discharge cycles over a 0 to 1 V potential window using LiPF$_6$ as electrolyte. Capacity retention of 92% suggested the stainless steel substrate yielded best performance and highest stability as an electrode substrate for RGO/h-BN nanocomposites (FIG. 60). Results of Study 3 are summarized in Table 8.

Asymmetric hybrid supercapacitors (ASCs) combine Faradaic and non-Faradaic processes by coupling an EDLC electrode with a pseudocapacitor electrode. ASCs deliver higher power density as compared to batteries, fuel cells, and symmetric supercapacitors. RGO/h-BN nanocomposites were tested in an asymmetric supercapacitor cell. Nanocomposite material was dropped on stainless steel spacers (used as a substrate) and tested with two different aqueous electrolytes (2 M H$_2$SO$_4$ and 6 M KOH), using a filter paper separator. Samples were soaked in electrolyte for 2-3 days prior to testing.

An asymmetric electrochemical cell was constructed using an electrode of Formulation 1 against an electrode of RGO on stainless steel substrates. A filter paper separator was prepared by soaking in electrolyte for two days. A RGO/h-BN nanocomposite with a 1:1 RGO to h-BN ratio was used for CV and EIS studies over a voltage window of 0 to 1 V. Representative CV and EIS spectra are depicted in FIGS. 32 to 35. Parameters for electrochemical testing and measured specific capacitance are summarized in Table 9.

Four cells were constructed for use with 2 M H$_2$SO$_4$: (1) a symmetric supercapacitor with nanocomposite 3 electrodes; (2) an asymmetric supercapacitor with a nanocomposite 3 as a positive electrode, and RGO as a negative electrode; (3) an asymmetric supercapacitor with a nanocomposite 3 as a positive electrode, and RGO as a negative electrode with a RGO/h-BN:RGO mass ratio of 2:1; and (4) an asymmetric supercapacitor with a nanocomposite 3 as a positive electrode, and RGO as a negative electrode with a RGO/h-BN:RGO mass ratio of 1:2.

Cyclic voltammetry of symmetric and asymmetric cells (1)-(4) exhibited stable electrochemical behavior using a SS substrate (unstable behavior was observed where copper was used as a substrate). Specific capacitance was measured as 56, 84.4, 82.3, and 71 F/g of samples (1) symmetric cell, (2)

TABLE 8

Summary of parameters and results for Study 3

| Electrolyte | Separator | Substrate | CV potential window | Specific capacitance from CV (F/g) | Charge-discharge | Current | Current Density | Cycle number | EIS $R_\Omega$ | $R_{ct}$ | Specific capacitance from CD (F/g) |
|---|---|---|---|---|---|---|---|---|---|---|---|
| LiPF$_6$ | Celgard | Al | 0-1.5 V | 1.15 F/g | 0-1 V | 0.0001 | 0.019 A/g | 5 | 5.028 | 294.6 | 22 |
| | | SS | | 7.068 | | 0.000099 | | | 8.743 | 755.4 | 25.022 |
| | | ETAN | | 9.629 F/g | | 0.000091 | | | 5.673 | 197.3 | 11.49 |
| | | Cu | | 17.1 F/g | | 0.0005 A | | | 2.649 | 12.63 | 58 |

Study 4

Figure 32:
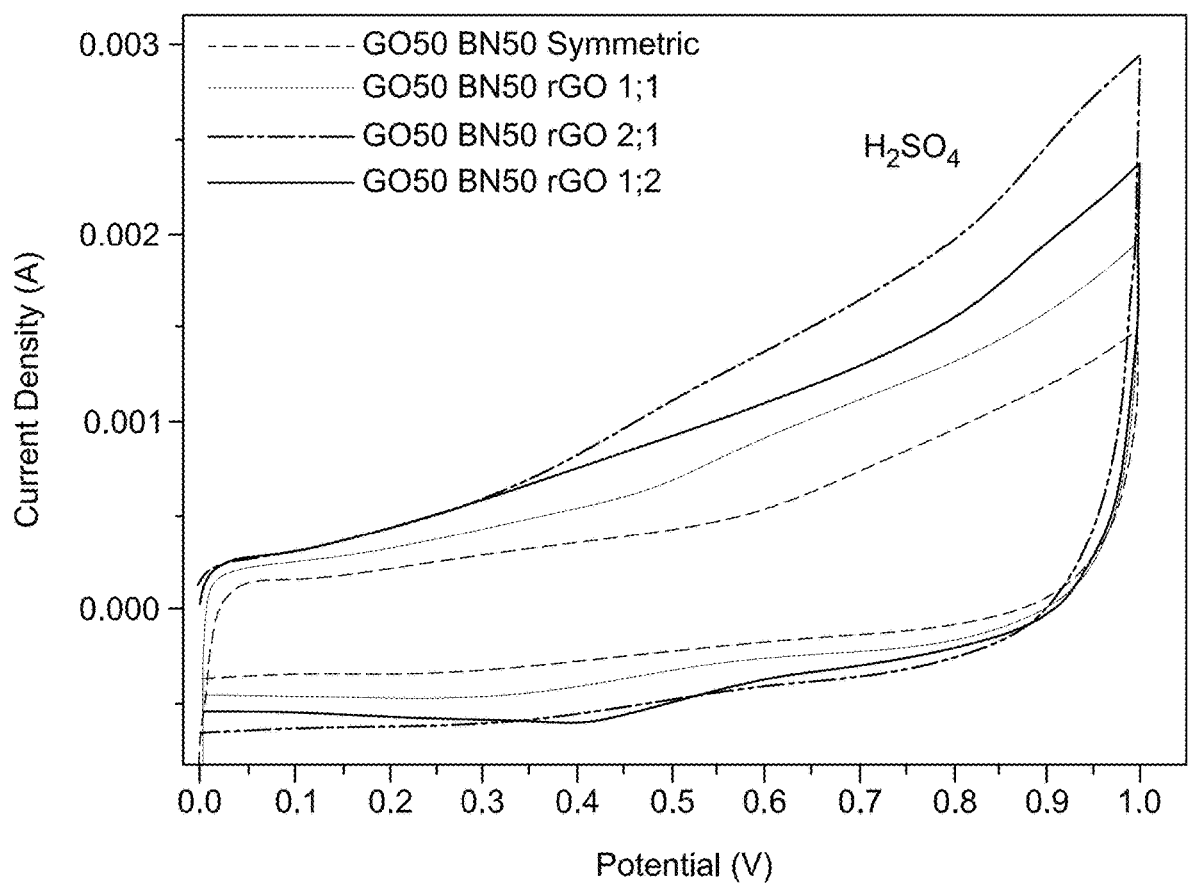
FIG. 32 is a plot of cyclic voltammograms of RGO/h-BN nanocomposites versus RGO with different mass ratios using an $H_2SO_4$ electrolyte solution, according to an illustrative embodiment.
Figure 33:
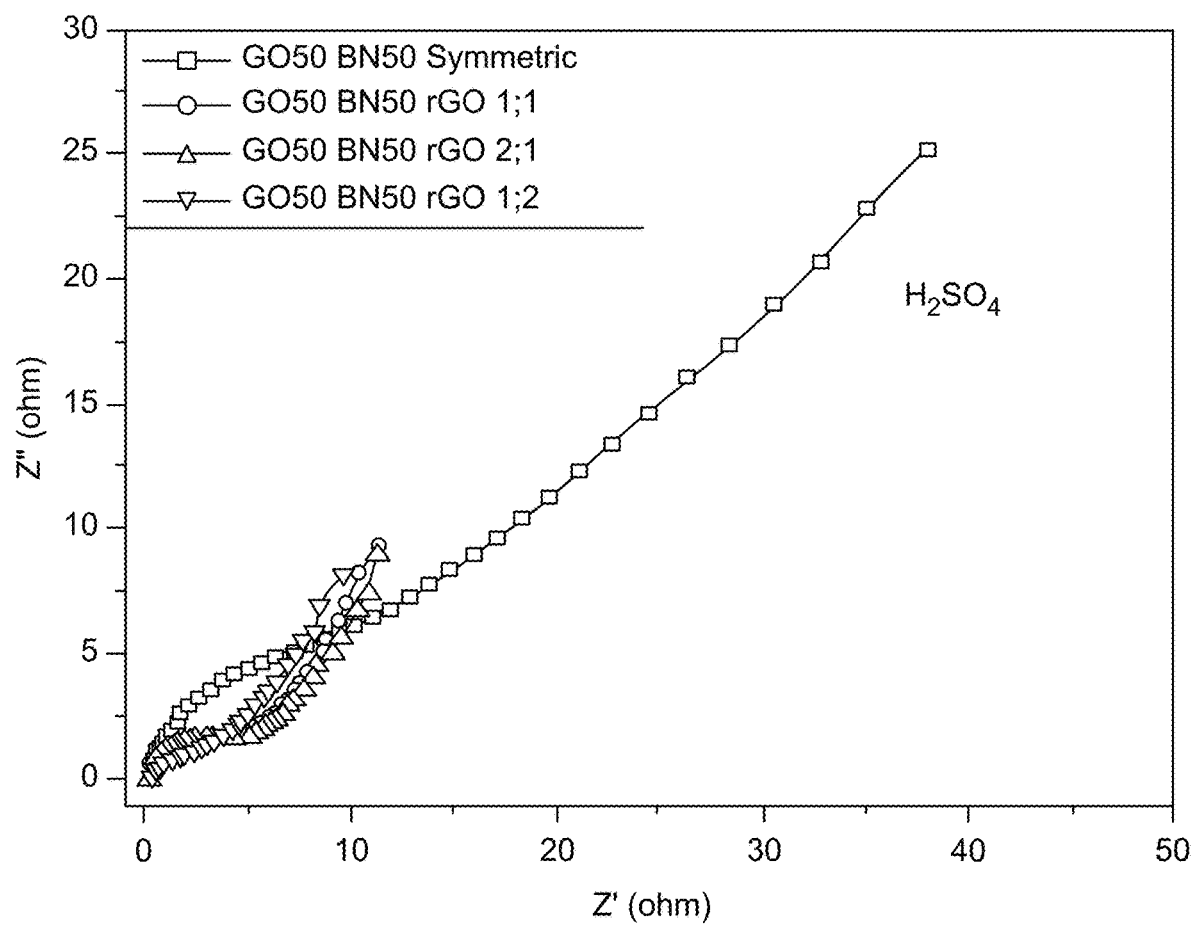
FIG. 33 is a graph depicting Nyquist plots of RGO/h-BN nanocomposites versus RGO with different mass ratios using an $H_2SO_4$ electrolyte solution, according to an illustrative embodiment.
Figure 34:
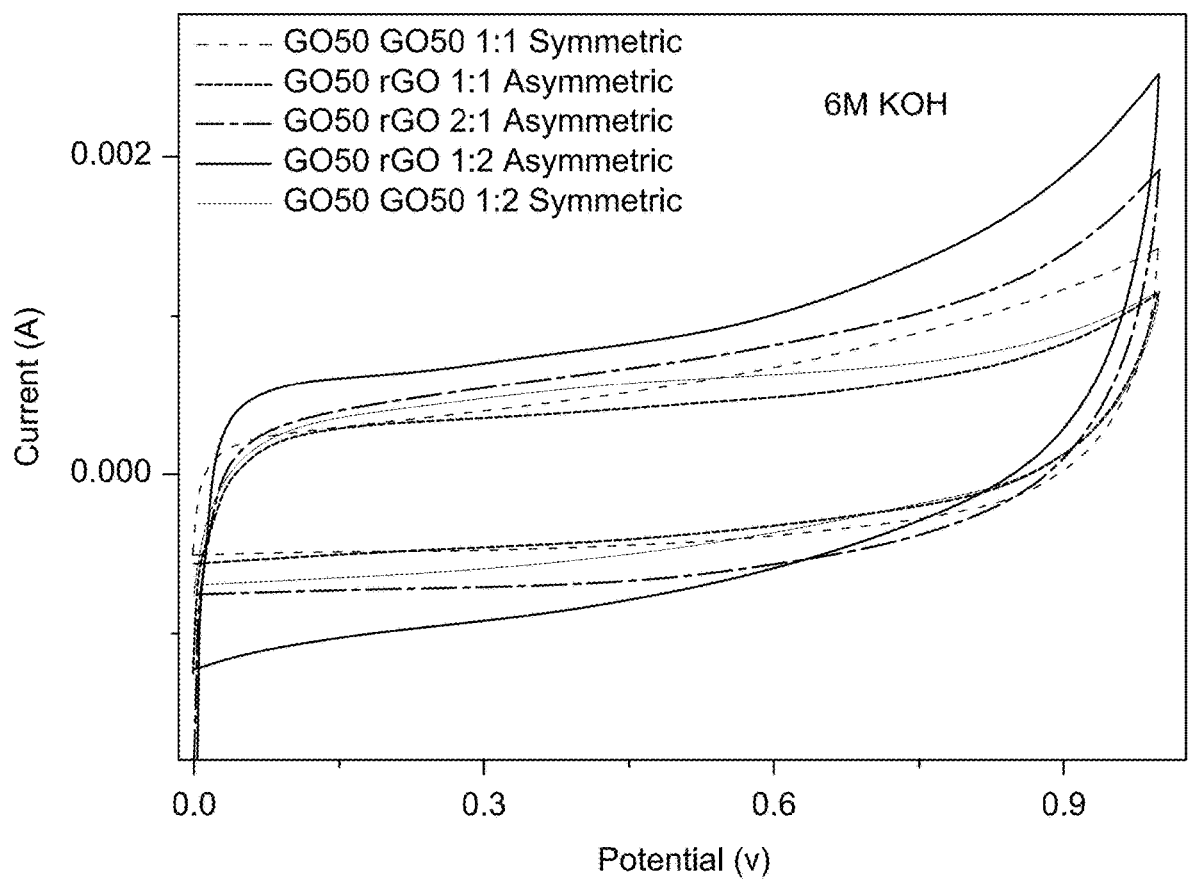
FIG. 34 is a plot of cyclic voltammograms of RGO/h-BN nanocomposites versus RGO with different mass ratios using a 6 M KOH electrolyte solution, according to an illustrative embodiment.
Figure 61:
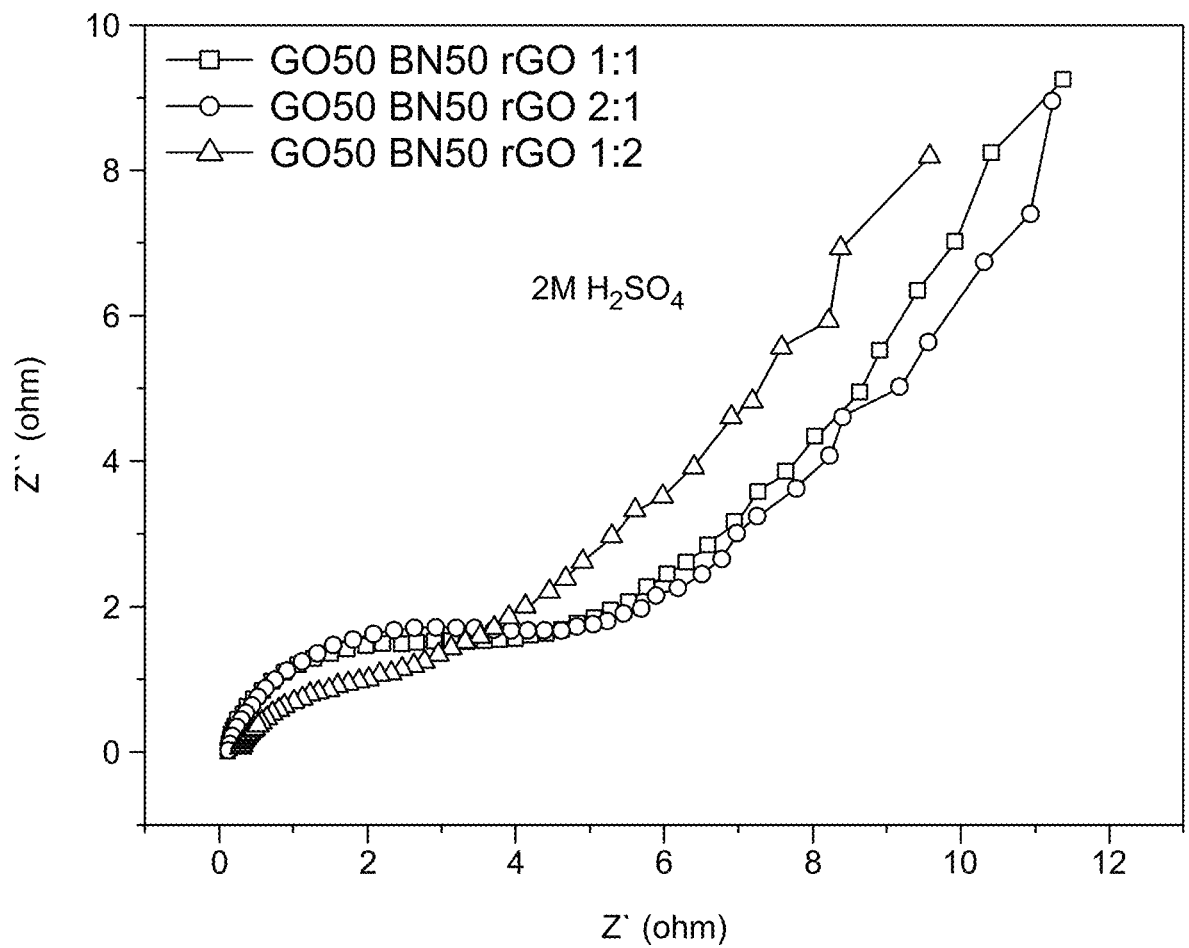
FIG. 61 is a graph depicting Nyquist plots of asymmetric supercapacitors comprising 1:1 RGO/h-BN nanocomposites as positive electrode and RGO as negative electrode with varying mass ratio of electrodes and 2 M $H_2SO_4$ as electrolyte, according to an illustrative embodiment.
Figure 62:
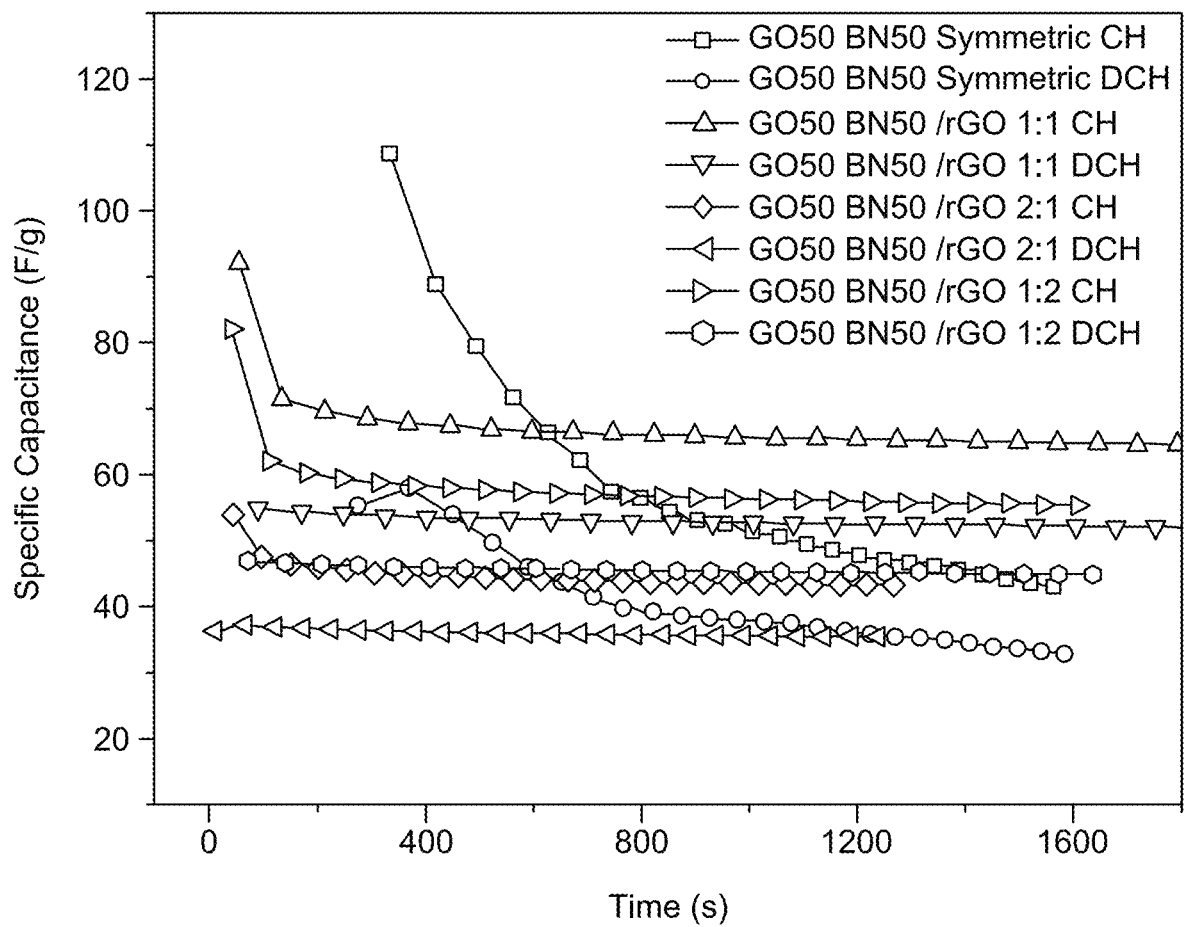
FIG. 62 is a plot of galvanostatic charge-discharge curves at a current density of 390 mA/g for asymmetric and symmetric supercapacitors comprising RGO/h-BN nanocomposites as electrodes and 2 M $H_2SO_4$ as electrolyte, according to an illustrative embodiment.

1:1 ratio of RGO/h-BN:RGO, (3) 2:1 ratio of RGO/h-BN:RGO, and (4) 1:2 ratio of RGO/h-BN:RGO, respectively (FIG. 32). Increases in specific capacitance in the asymmetric configuration is attributed to different charges of the electrodes and differing amounts of positive and negative electrodes. Electrochemical impedance spectroscopy was applied to cells (1) and (2), and a decrease in charge transfer resistance was observed from the symmetric to asymmetric supercapacitor configuration (12.9 and 4.35Ω, respectively), suggesting a faster electron transport in the interface between electrode and electrolyte (FIG. 33). Solution resistance of the cells was approximately the same. EIS testing of asymmetric samples with varying mass ratios (2), (3), and (4) delivered charge transfer resistance of 4.35, 4.74, 2.9Ω, respectively (FIG. 61). Decrease in charge transfer resistance in the sample with a RGO/h-BN:RGO mass ratio of 1:2 is consistent with a higher charge in a negative electrode expected due to mass ratio. Galvanostatic charge-discharge was applied to each of the cells at a current density of 390 mA/g. All cells were cycled 25 times over a potential window of 0 to 1 V. All cells exhibited good stability at this relatively high current. Specific capacitance measured by CD was 57.7, 54.2, 37.1, and 46.5 F/g of samples (1) symmetric cell, (2) 1:1 ratio of RGO/h-BN:RGO, (3) 2:1 ratio of RGO/h-BN:RGO, and (4) 1:2 ratio of RGO/h-BN:RGO, respectively (FIG. 62).

Five cells were constructed for use with 6 M KOH: (1) a symmetric supercapacitor with nanocomposite 3 electrodes; (2) an asymmetric supercapacitor with a nanocomposite 3 as a positive electrode, and RGO as a negative electrode; (3) an asymmetric supercapacitor with a nanocomposite 3 as a positive electrode, and RGO as a negative electrode with a RGO/h-BN:RGO mass ratio of 2:1; (4) an asymmetric supercapacitor with a nanocomposite 3 as a positive electrode, and RGO as a negative electrode with a RGO/h-BN:RGO mass ratio of 1:2; and (5) a symmetric supercapacitor with a nanocomposite 3, with a 1:2 mass ratio of the two electrodes.

Figure 35:
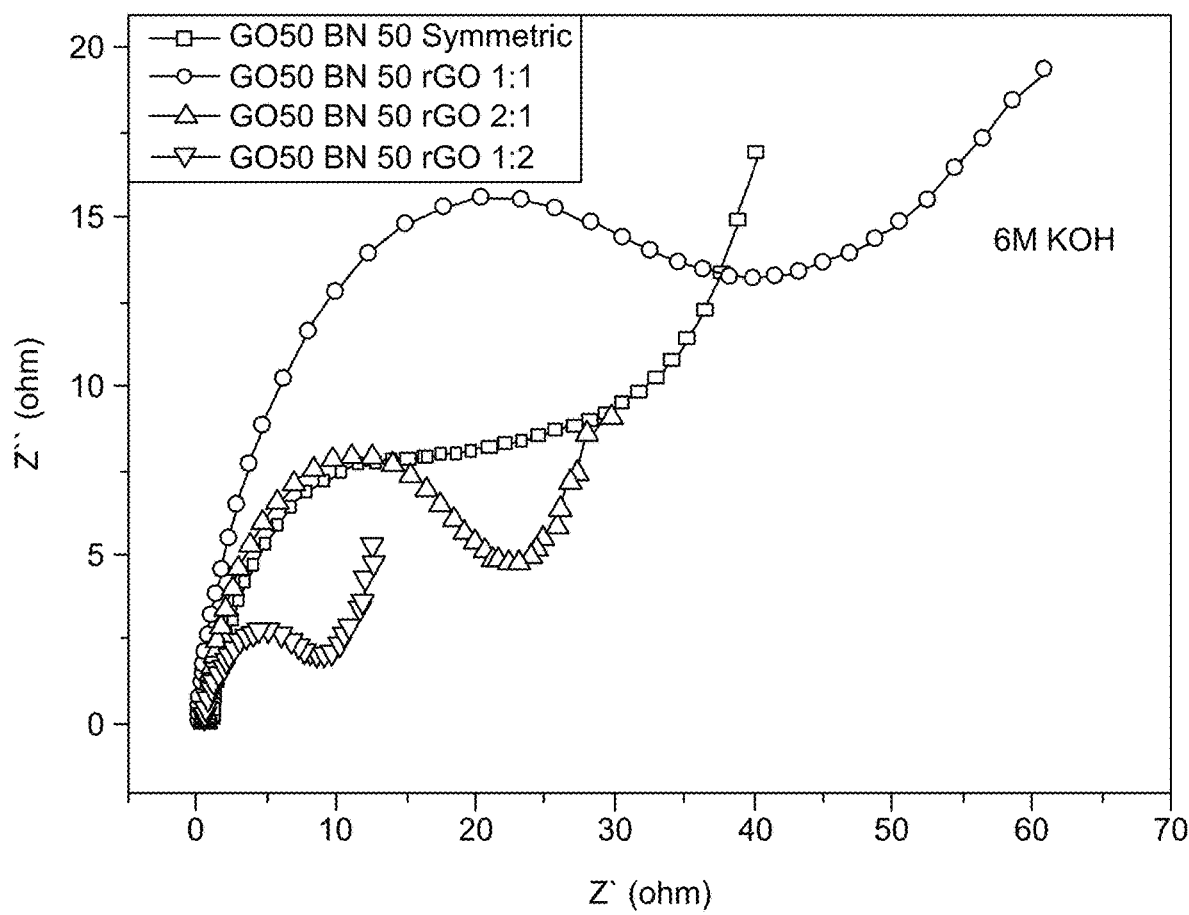
FIG. 35 is a graph depicting Nyquist plots of RGO/h-BN nanocomposites versus RGO with different mass ratios using a 6 M KOH electrolyte solution, according to an illustrative embodiment.

Cyclic voltammetry of the cells exhibited excellent electrochemical behavior over a potential window of 0 to 1 V. Specific capacitance was measured as 74, 57.8, 63.5, 80.7, and 47.6 F/g for cells (1)-(5), respectively (see FIG. 34). Across asymmetric samples, an increase in capacitance is observed with increase in asymmetric in accumulated charge on the electrodes. Using a negative electrode with twice as much RGO increases electric double-layer capacitor (EDLC) behavior. An enhancement of capacitance is attributed to adsorption-desorption charge accumulation. EIS testing was applied to cells (1) and (2), and an increase in charge transfer resistance was observed from 18.8 to 38.1Ω (FIG. 35). EIS testing of asymmetric samples with varying mass ratios (2), (3), and (4) delivered decreasing charge transfer resistance corresponding to increasing difference in charge accumulated in the electrodes; charge transfer resistance of samples (2), (3), and (4) was 38.1, 20, and 7.6Ω, respectively (see FIG. 35). Increasing RGO mass increases electron mobility through an electrode-electrolyte interface.

Figure 63:
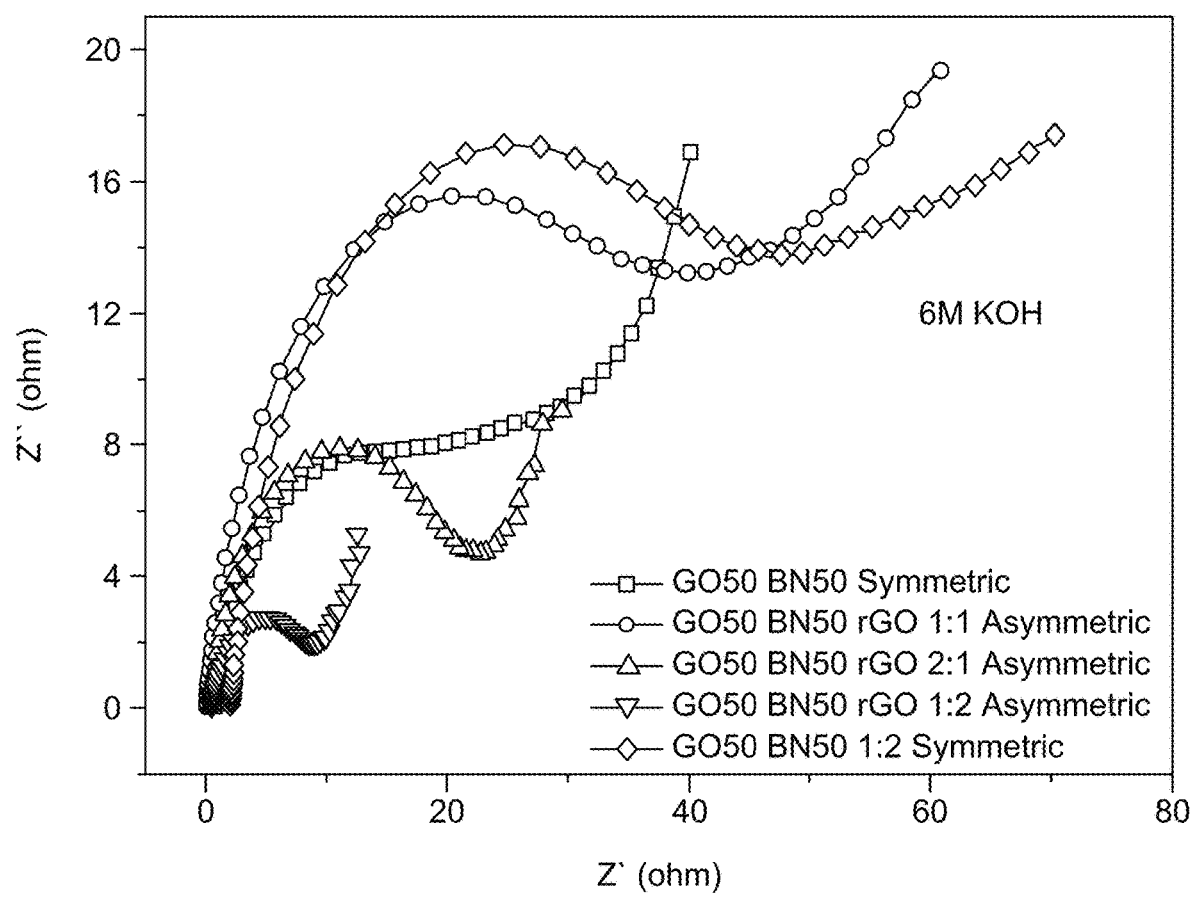
FIG. 63 is a graph depicting Nyquist plots of asymmetric and symmetric supercapacitors comprising RGO/h-BN nanocomposites, using a 6 M KOH electrolyte solution, according to an illustrative embodiment.
Figure 64:
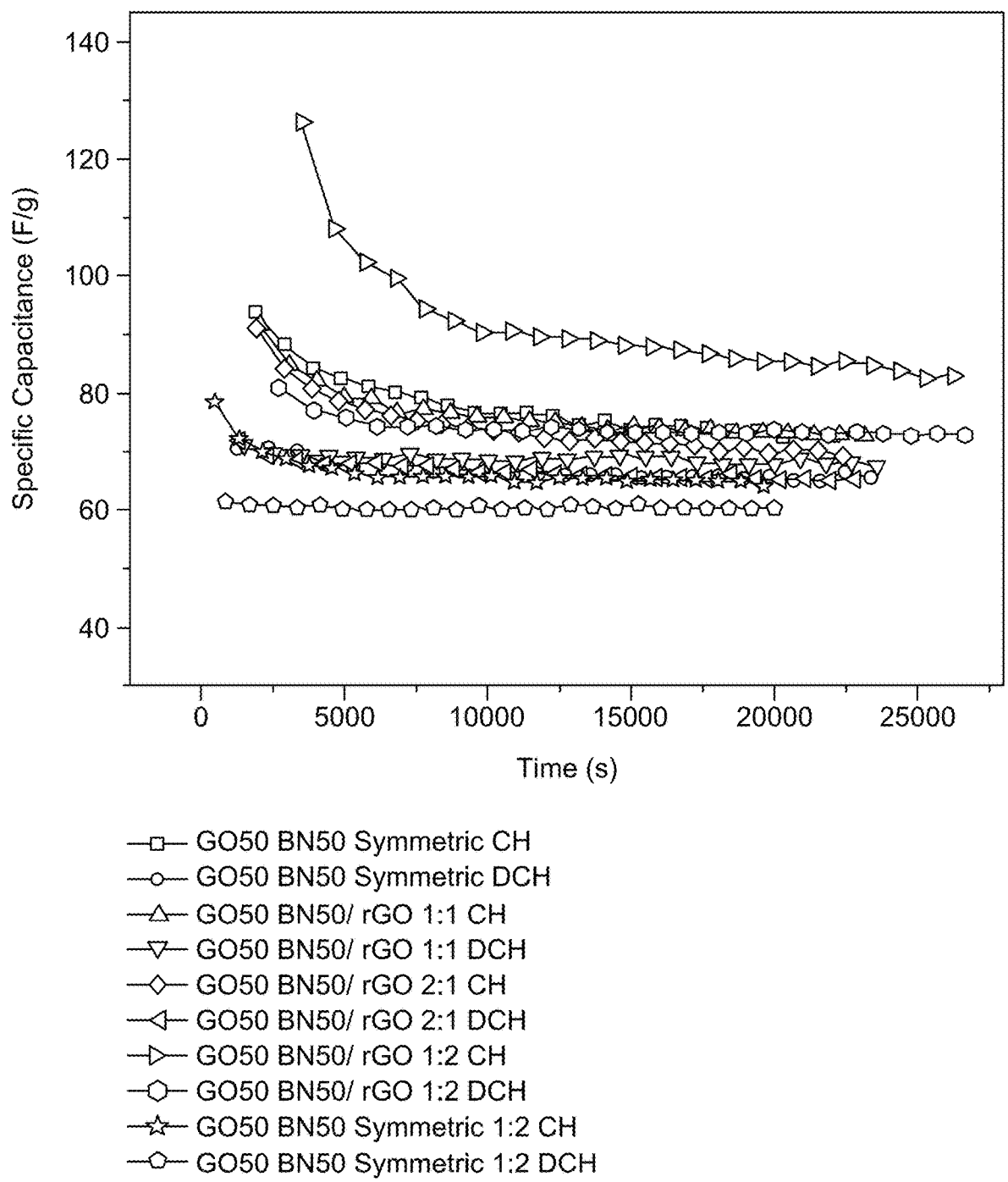
FIG. 64 is a plot of galvanostatic charge-discharge curves for asymmetric and symmetric supercapacitors comprising RGO/h-BN nanocomposites as electrode(s), using a 6 M KOH electrolyte at a current density of 39 mA/g, according to an illustrative embodiment.

Comparison of an asymmetric supercapacitor to a symmetric supercapacitor was afforded by analyzing a symmetric supercapacitor with a 1:2 mass ratio of electrodes with respect to the asymmetric configurations. EIS plots of a 1:2 mass ratio symmetric supercapacitor exhibit less charge transfer than a symmetric supercapacitor with a 1:1 mass ratio, indicating that difference in mass ratio has a different impact in symmetric supercapacitors as compared to asymmetric supercapacitors (FIG. 63). Galvanostatic charge-discharge data was collected for all cells (1)-(5); good stability was observed over 25 cycles in all cells at a current density of 39 mA/g over a potential window of 0 to 1 V. Specific capacitance was measured as 69.3, 68.6, 68.9, 82.9, 60.6 F/g of samples (1) symmetric cell with 1:1 mass ratio, (2) 1:1 ratio of RGO/h-BN:RGO, (3) 2:1 ratio of RGO/h-BN:RGO, (4) 1:2 ratio of RGO/h-BN:RGO, and (5) symmetric cell with 1:2 mass ratio, respectively (FIG. 64).

Figure 65:
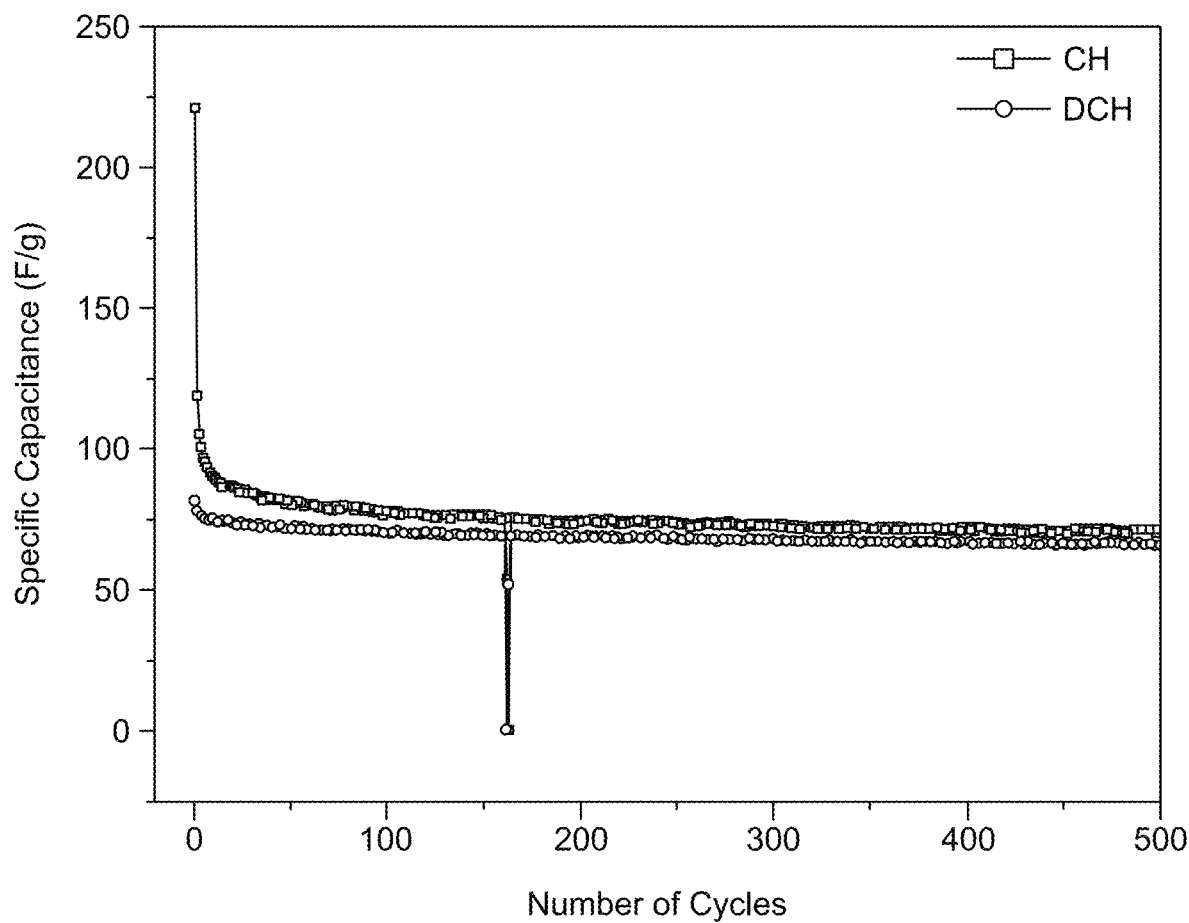
FIG. 65 is a plot of galvanostatic charge-discharge curves for an asymmetric super capacitor comprising a RGO/h-BN nanocomposite as a positive electrode and a 6 M KOH electrolyte over 500 cycles, according to an illustrative embodiment.
Figure 66:
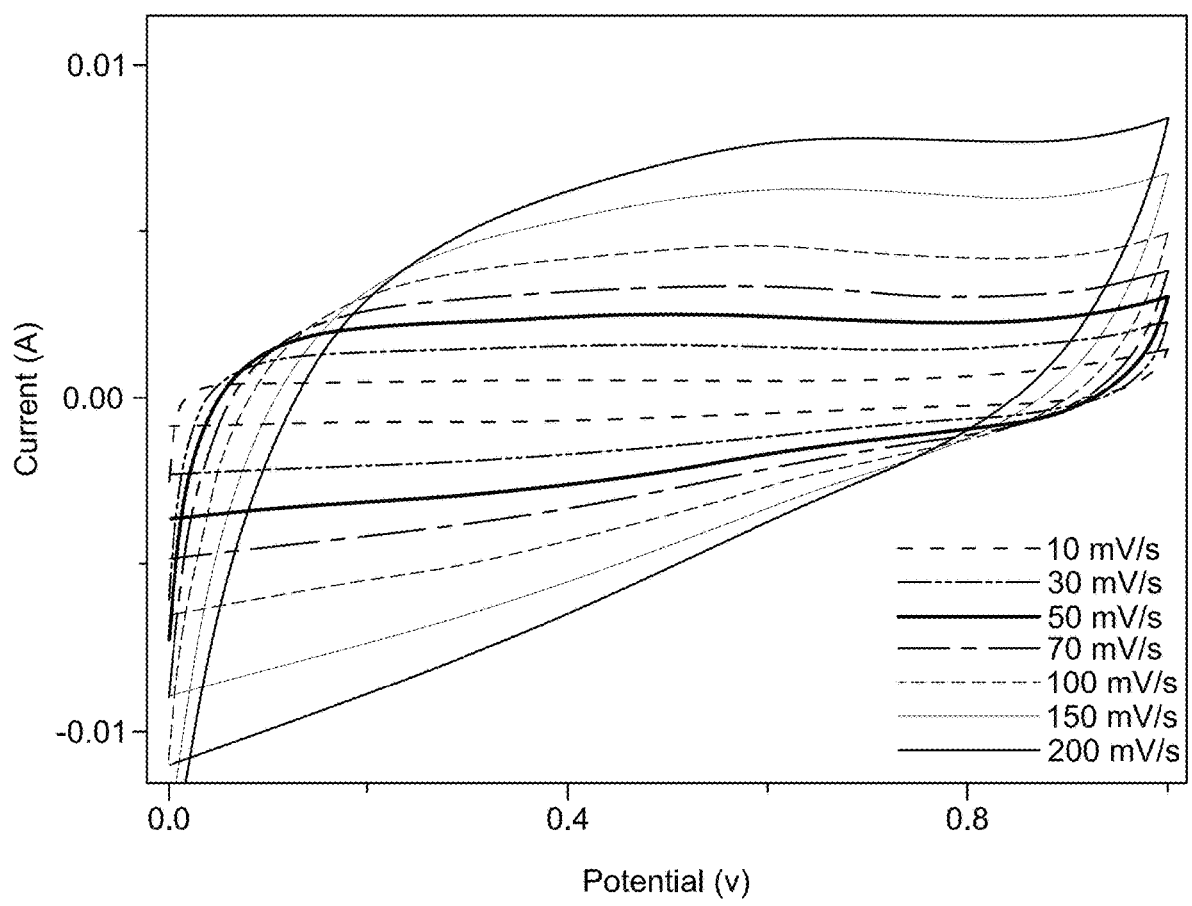
FIG. 66 is a plot of cyclic voltammograms of an asymmetric supercapacitor with a 1:1 RGO/h-BN nanocomposite positive electrode and RGO negative electrode, with a 1:2 mass ratio of the two electrodes, a 6 M KOH electrolyte, and scan rates from 10 to 200 mV/s, according to an illustrative embodiment.
Figure 67:
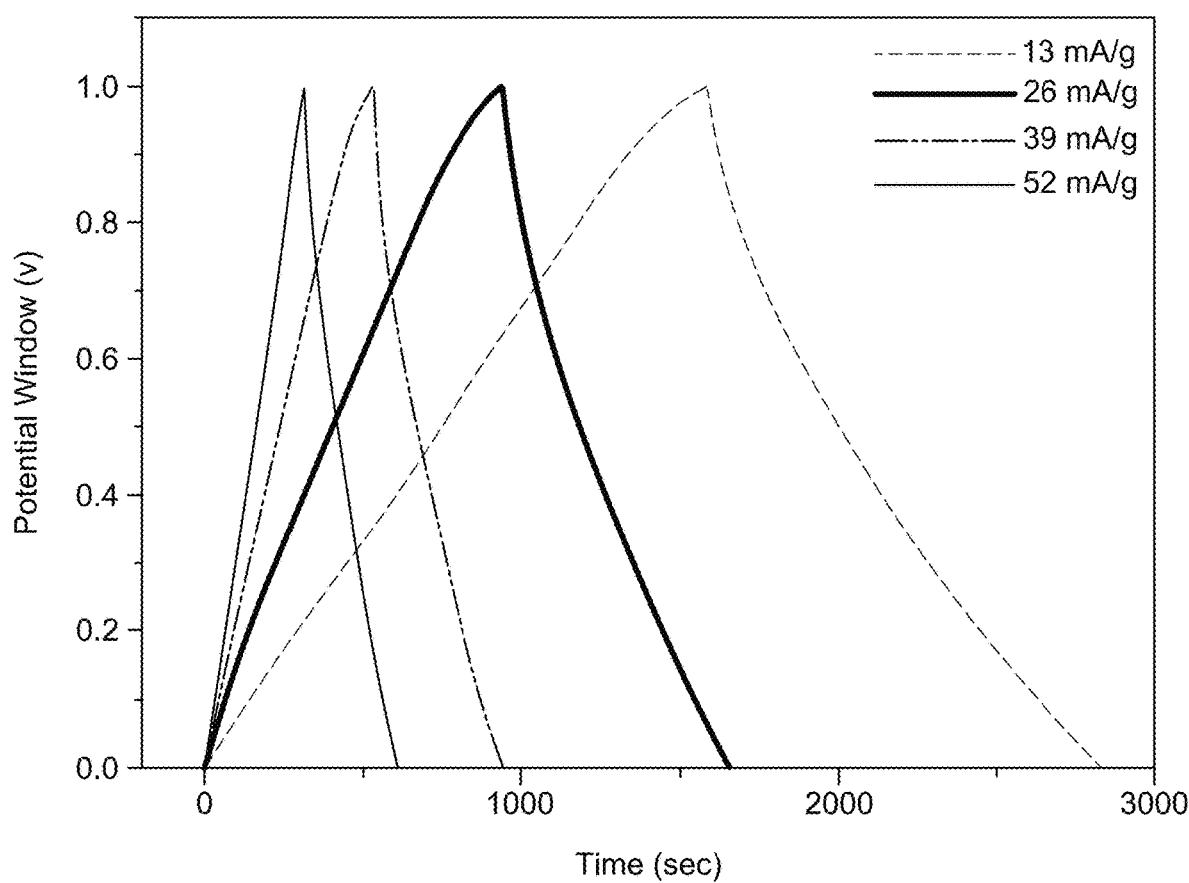
FIG. 67 is a plot of a charge/discharge cycle of an asymmetric supercapacitor with a 1:1 RGO/h-BN nanocomposite positive electrode and RGO negative electrode, with a 1:2 mass ratio of the two electrodes, a 6 M KOH electrolyte, and current densities from 13 to 52 mA/g, according to an illustrative embodiment.

For an asymmetric cell comprising a ratio of nanocomposite:RGO (as opposing negative electrode) of 2:1, high capacitance of 82.9 F/g was observed, good charge transfer as observed by EIS, as well as high stability over 500 cycles, with 81% retention of capacitance (FIG. 65). With this asymmetric configuration, use of KOH as an electrolyte resulted in the most stable substrate, and properties useful for fabrication of a commercially viable supercapacitor. Cyclic voltammetry (CV) of such a sample exhibited good behavior, with symmetric curves and peak current increasing progressively with increasing scan rate of CV (scan rates 10-200 mV/s) (FIG. 66). Galvanostatic charge-discharge of an asymmetric cell with a 1:2 ratio of RGO/h-BN:RGO, using 6 M KOH electrolyte at current densities of 13, 26, 39, and 52 mA/g over the potential window of 0 to 1 V did not exhibit a measurable IR drop. A plot comparing the $25^{th}$ cycle of each of these tests is depicted in FIG. 67. Results of Study 4 are summarized in Table 9.

TABLE 9

Summary of parameters and results for Study 4

| Material used | Electrolyte | Separator | Substrate | Soaking duration | CV potential window | Specific capacitance from CV (F/g) | Charge-discharge | Current | Current Density | Cycle number | EIS $R_\Omega$ | EIS $R_{ct}$ | Specific capacitance from CD (F/g) |
|---|---|---|---|---|---|---|---|---|---|---|---|---|---|
| 3 | 2M $H_2SO_4$ | Filter paper | Stainless steel | 3 days | 0-1 v | 56.01 F/g | 0-1 v | 0.001 A | 0.39 A/g | 25 | 280.9e$^{-3}$ | 12.9 | 57.7 F/g |
| 3:RGO 1; 1 | | | | | | 84.37 F/g | | | | | 148.4e$^{-3}$ | 4.353 | 54.17 F/g |
| 3:RGO 2; 1 | | | | | | 82.29 F/g | | 0.0015 A | | | 160.3e$^{-3}$ | 4.744 | 37.07 F/g |
| 3:RGO 1; 2 | | | | | | 71 F/g | | | | | 365.6e$^{-3}$ | 2.9 | 46.46 F/g |
| 3 | 6 M KOH | | | | | 74.06 F/g | | 0.0001 A | 0.039 A/g | 25 | 207.8e$^{-3}$ | 18.78 | 69.35 F/g |
| 3:RGO 1; 1 | | | | | | 57.78 F/g | | | | | 162.6e$^{-3}$ | 38.1 | 68.69 F/g |
| 3:RGO 2; 1 | | | | | | 63.54 F/g | | 0.00015 A | 0.039 A/g | | 604.3e$^{-3}$ | 20.01 | 68.94 F/g |
| 3:RGO | | Filter | Stain- | 3 days | 0-1 v | 80.73 F/g | 0-1 v | | | | 560.9e$^{-3}$ | 7.579 | 82.94 F/g |

TABLE 9-continued

Summary of parameters and results for Study 4

| Material used | Electrolyte | Separator | Substrate | Soaking duration | CV potential window | Specific capacitance from CV (F/g) | Charge-discharge | Current | Current Density | Cycle number | EIS $R_\Omega$ | $R_{ct}$ | Specific capacitance from CD (F/g) |
|---|---|---|---|---|---|---|---|---|---|---|---|---|---|
| 1; 2 3:RGO 1; 2 | | paper | less steel | | | 47.64 F/g | | | | 25 | 2.259 | 44.28 | 60.6 F/g |

Study 5

An electrochemical cell was constructed using an electrode of Formulation 2. Results of electrochemical testing are depicted in FIGS. 36 to 40 and summarized in Table 10.

Figure 36:
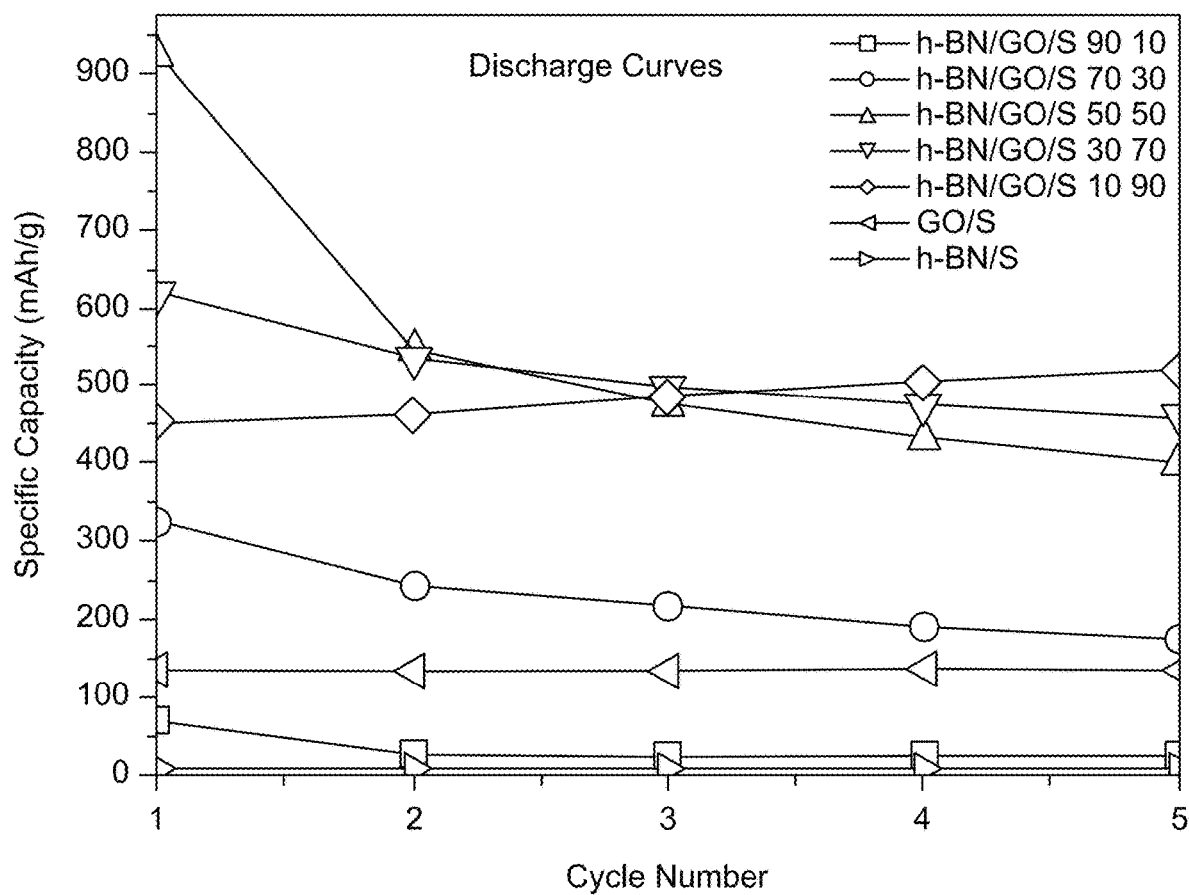
FIG. 36 is a plot of the discharge capacity of RGO/h-BN/S, h-BN/S, and GO/S nanocomposites over 5 cycles at a current of 600 mA and a voltage window of 1.6 to 2.8 V, according to an illustrative embodiment.

FIG. 36 depicts the discharge capacity of RGO/h-BN/S, h-BN/S, and RGO/S nanocomposites at a current of 600 mA over a voltage range of 1.6 to 2.8 V for five cycles. Discharge capacity of h-BN/S is nearly zero, while RGO/S exhibits a discharge capacity of 130 mAh/g. As amount of RGO in a nanocomposite increases, discharge capacity increases. For example, a RGO/h-BN/S nanocomposite exhibited a 900 mAh/g discharge capacity in the first cycle with a 1:1 RGO/h-BN ratio, a 620 mAh/g discharge capacity with a 7:3 ratio, and a 450 mAh/g discharge capacity with a 9:1 ratio. Without wishing being bound by any particular theory, it is believed that enhanced electrochemical performance of RGO/h-BN/S nanocomposites, relative to h-BN/S and RGO/S nanocomposites, is due to increase in surface area, enabling higher sulfur utilization and improved dispersion of sulfur particles.

Figure 37:
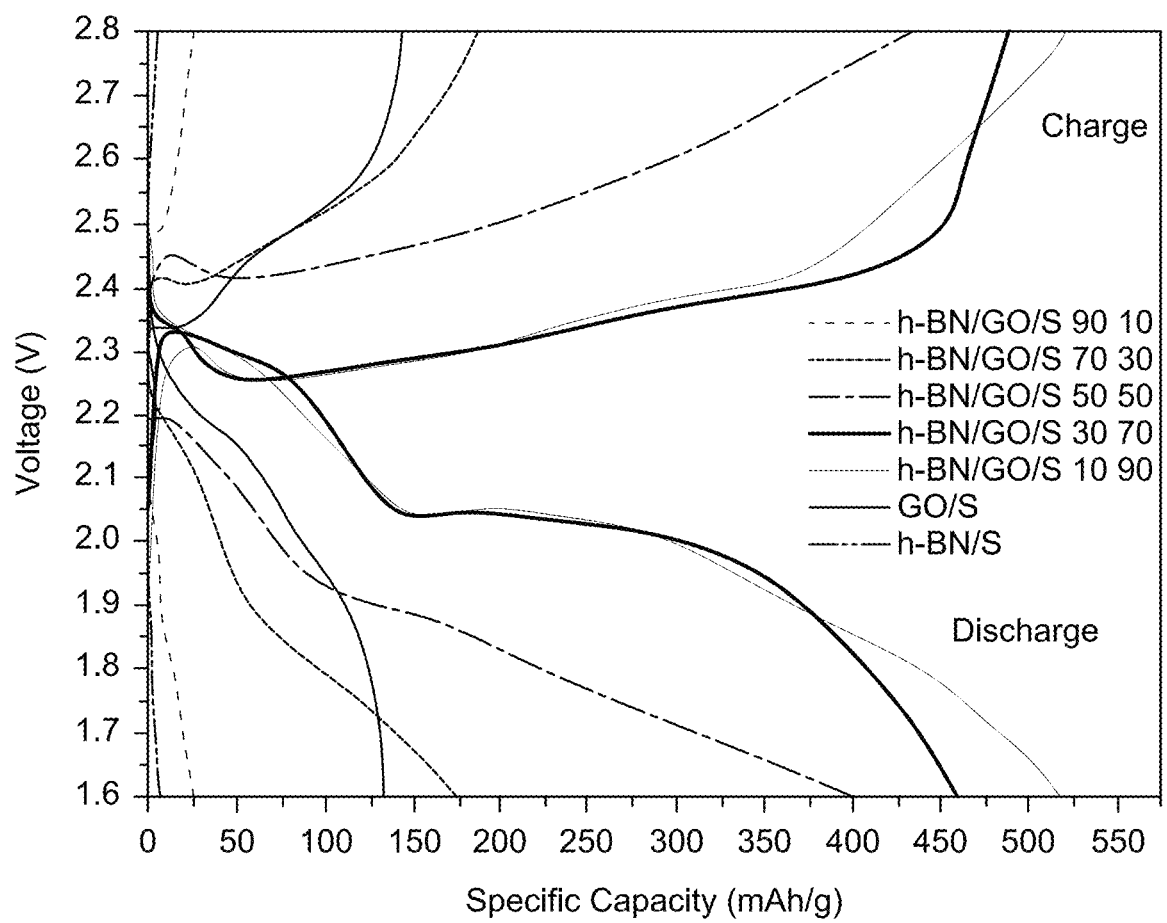
FIG. 37 is a plot of the charge and discharge curves for the $5^{th}$ cycle of RGO/h-BN/S, h-BN/S, and GO/S nanocomposites at a current of 600 mA and a voltage window of 1.6 to 2.8 V, according to an illustrative embodiment.

FIG. 37 depicts the charge and discharge profiles of RGO/h-BN/S, h-BN/S, and GO/S nanocomposites after five cycles. Discharge plateaus for RGO/h-BN/S nanocomposites are greater for nanocomposites including a larger proportion of RGO. For example, RGO/h-BN/S nanocomposites with RGO:h-BN ratios of 9:1 and 7:3 exhibit higher discharge plateaus than for composites with less RGO.

Figure 38:
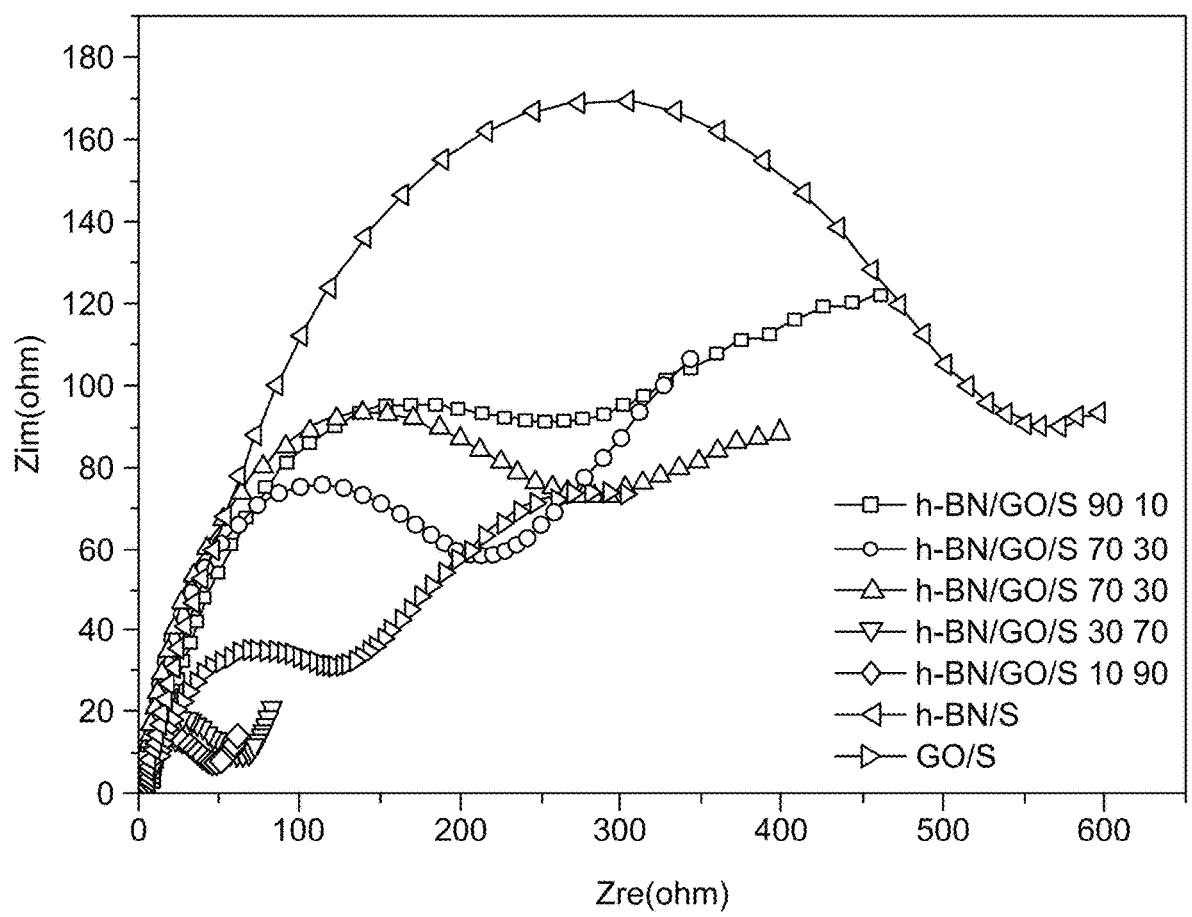
FIG. 38 is a graph depicting Nyquist plots for the $5^{th}$ cycle of RGO/h-BN/S, h-BN/S, and GO/S nanocomposites, according to an illustrative embodiment.

FIG. 38 depicts Nyquist plots of RGO/h-BN/S, h-BN/S, and RGO/S nanocomposites. Spectra display a broad arc in the medium frequency region, with without wishing to be bound to any particular theory, is attributed to resistance of $Li^+$ charge-transfer resistance (Rct) at the electrode-electrolyte interface. An inclined line at low frequency is attributed to Warburg resistance (W). As RGO of a nanocomposite increases, a narrowing of the arc in the medium frequency region is observed. Without wishing to be bound to any particular theory, it is believed that high resistance in h-BN/S is due to precipitation of insoluble lithium sulfides accumulating over time.

TABLE 10

Electrochemical results of Study 5

| Sample | Specific charge capacity (mAh/g) | Specific discharge capacity (mAh/g) | Resistance (Ω) | |
|---|---|---|---|---|
| 1/S | 23 | 24 | $R_1$ = 7.71 | $R_{ct}$ = 306.8 |
| 2/S | 188 | 17 | $R_1$ = 2.02 | $R_{ct}$ = 205 |
| 3/S | 435 | 399 | $R_1$ = 2.45 | $R_{ct}$ = 258.8 |
| 4/S | 487 | 457 | $R_1$ = 3.67 | $R_{ct}$ = 455.06 |
| 5/S | 521 | 518 | $R_1$ = 1.51 | $R_{ct}$ = 43.63 |
| h-BN/S | 5 | 6 | $R_1$ = 3.07 | $R_{ct}$ = 551 |
| RGO/S | 143 | 133 | $R_1$ = 3.98 | $R_{ct}$ = 158 |

Figure 39:
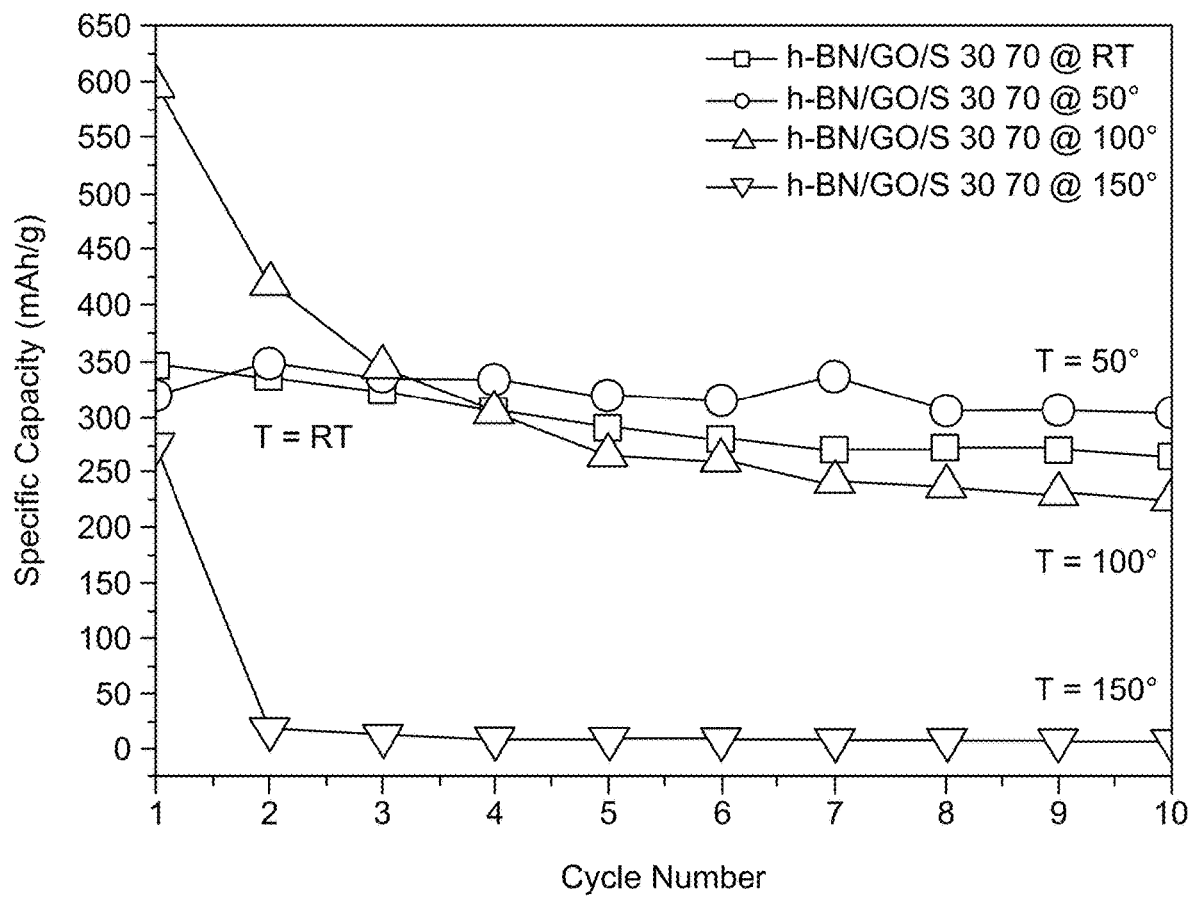
FIG. 39 is a plot of the discharge capacity of RGO/h-BN/S, h-BN/S, and GO/S nanocomposites at temperatures ranging from room temperature to 150° C., over a voltage window of 1.6 to 2.8 V (10 cycles), according to an illustrative embodiment.
Figure 40:
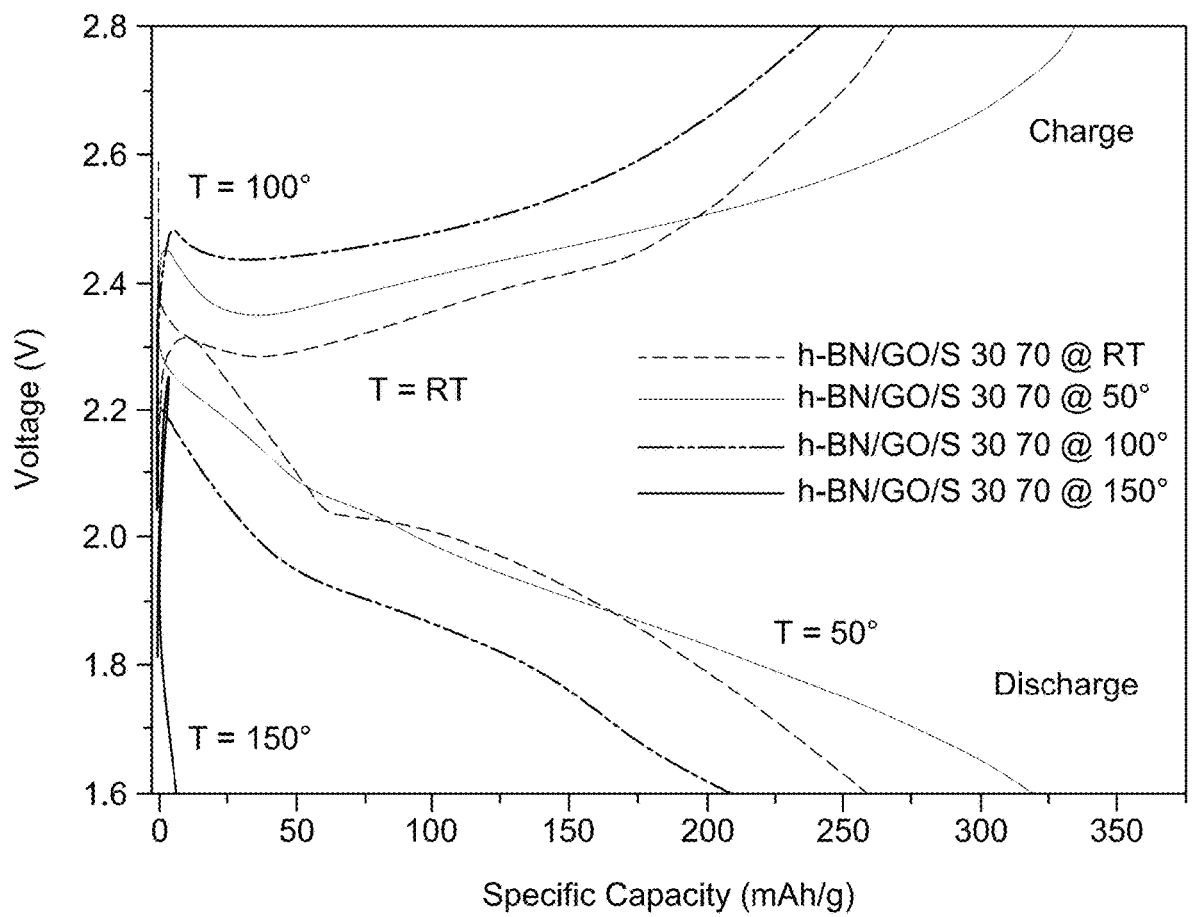
FIG. 40 is a plot of the charge and discharge curves for the $11^{th}$ cycle of RGO/h-BN/S, h-BN/S, and GO/S nanocomposites at temperatures ranging from room temperature to 150° C., over a voltage window of 1.6 to 2.8 V, according to an illustrative embodiment.

Nanocomposites with an RGO/h-BN ratio of 7:3 were selected for testing at different temperatures (i.e. room temperature, 50° C., 100° C., and 150° C.) over 10 cycles. FIG. 39 depicts the results of these studies. Discharge capacity after 10 cycles at room temperature was 259 mAh/g. With an increase in cycling temperature to 50° C., discharge capacity after 10 cycles increased to 319 mAh/g, with a capacity retention of 86.9% from the second cycle. Further increases in temperature to 100° C. or 150° C. do not exhibit further increases in the discharge capacity. However, a battery operated at 100° C. maintains a discharge capacity of 207 mAh/g after 10 cycles. Charge and discharge profiles of the $10^{th}$ cycle of these RGO/h-BN/S nanocomposites are depicted in FIG. 40. Results of these electrochemical studies suggest a battery comprising the nanocomposites presented here can operate well at high temperature.

Figure 47:
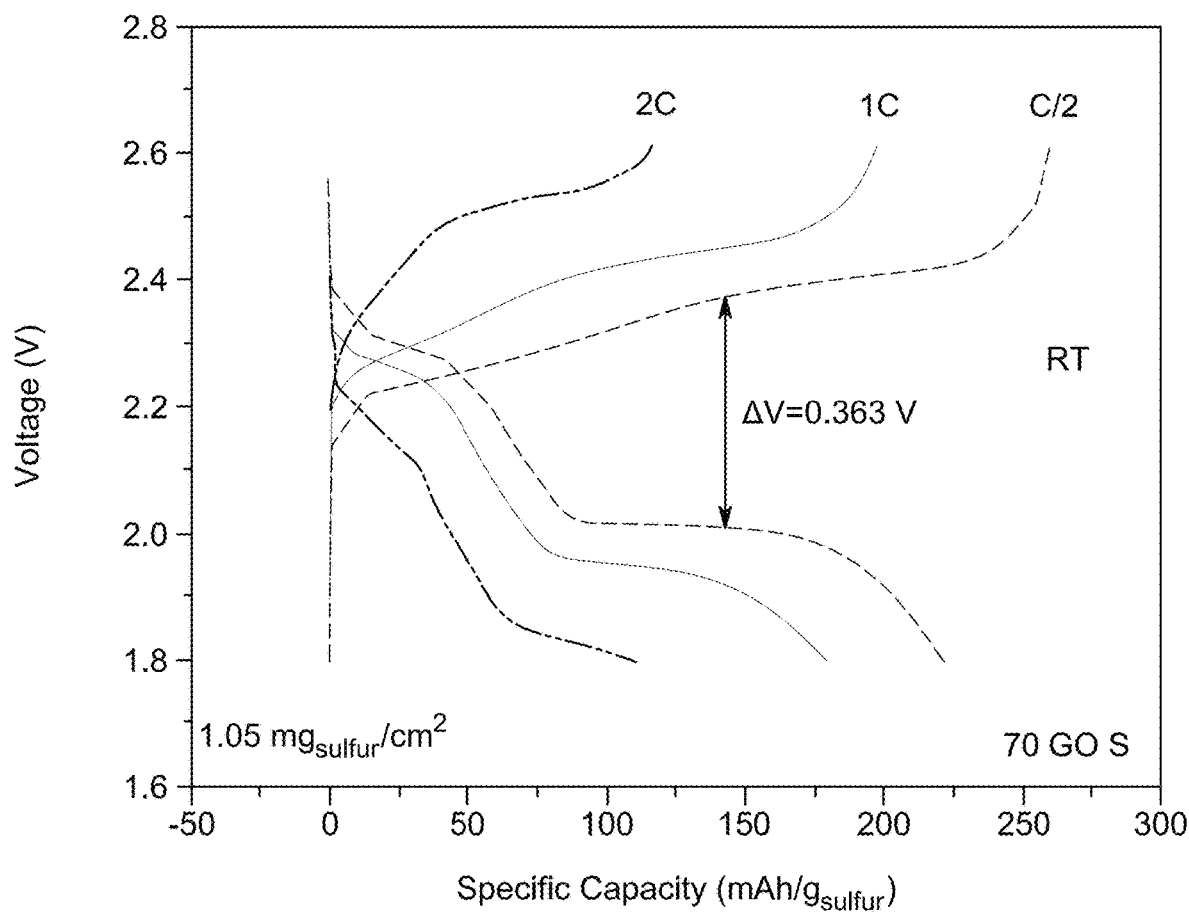
FIG. 47 is a plot of galvanostatic charge-discharge curves for a RGO/h-BN/S nanocomposite comprising 70 wt % RGO and a sulfur loading of 1.05 mg/cm$^2$ at different current rates, according to an illustrative embodiment.
Figure 48:
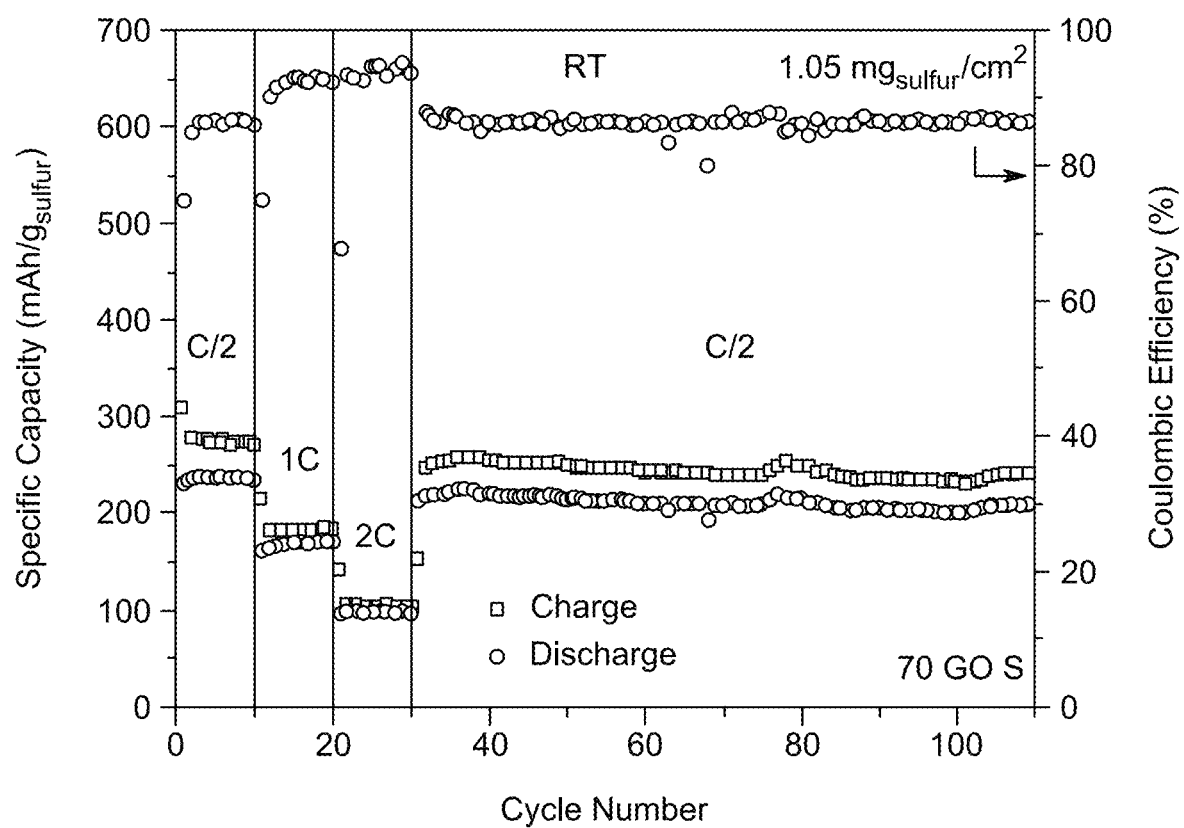
FIG. 48 is a plot of rate capabilities for a RGO/h-BN/S nanocomposite comprising 70 wt % RGO and a sulfur loading of 1.05 mg/cm$^2$, according to an illustrative embodiment.
Figure 49:
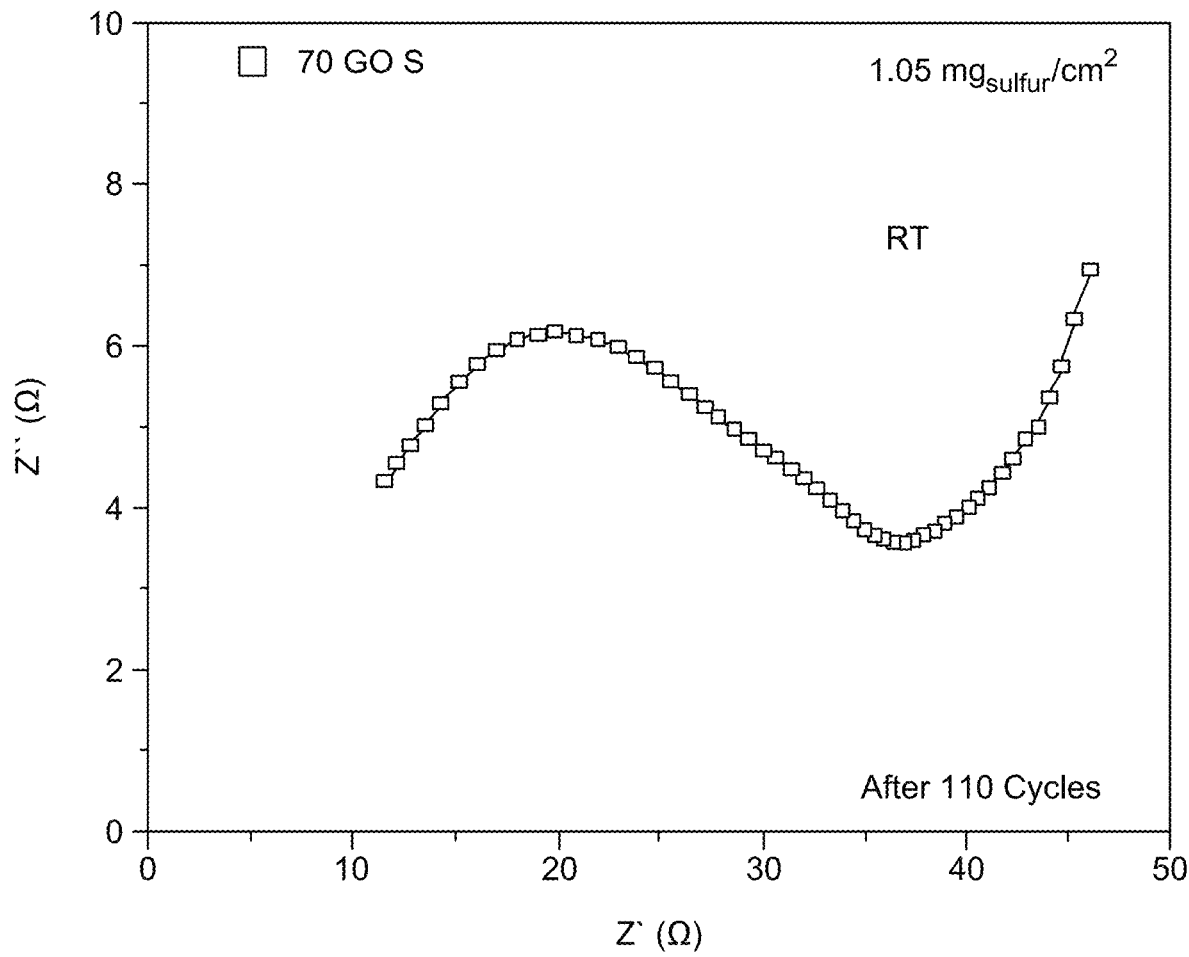
FIG. 49 is a graph depicting a Nyquist plot for a RGO/h-BN/S nanocomposite comprising 70 wt % RGO and a sulfur loading of 1.05 mg/cm$^2$, according to an illustrative embodiment.

Rate capabilities of a cell using a RGO/h-BN/S nanocomposite with 70 wt % RGO and a sulfur loading of 1.05 mg/cm$^2$ are illustrated in FIG. 47. Galvanostatic charge-discharge curves of a cell using a RGO/h-BN/S nanocomposite with 70 wt % RGO are depicted with current rates ranging from C/2 to 2 C. Reversible discharge capacities of 231.31 mAh/g, 170.45 mAh/g, and 95.78 mAh/g were observed at current rates of C/2, 1C and 2 C, respectively. After 110 cycles, reversible discharge capacity of 209.96 mAh/g was observed with a coulombic efficiency of 86.61% (FIG. 48). Nyquist plots reveal a semicircle observed at medium frequencies, attributed to charge transfer resistance; after 110 cycles a low charge transfer resistance of 41.46Ω was observed (FIG. 49).

Figure 50:
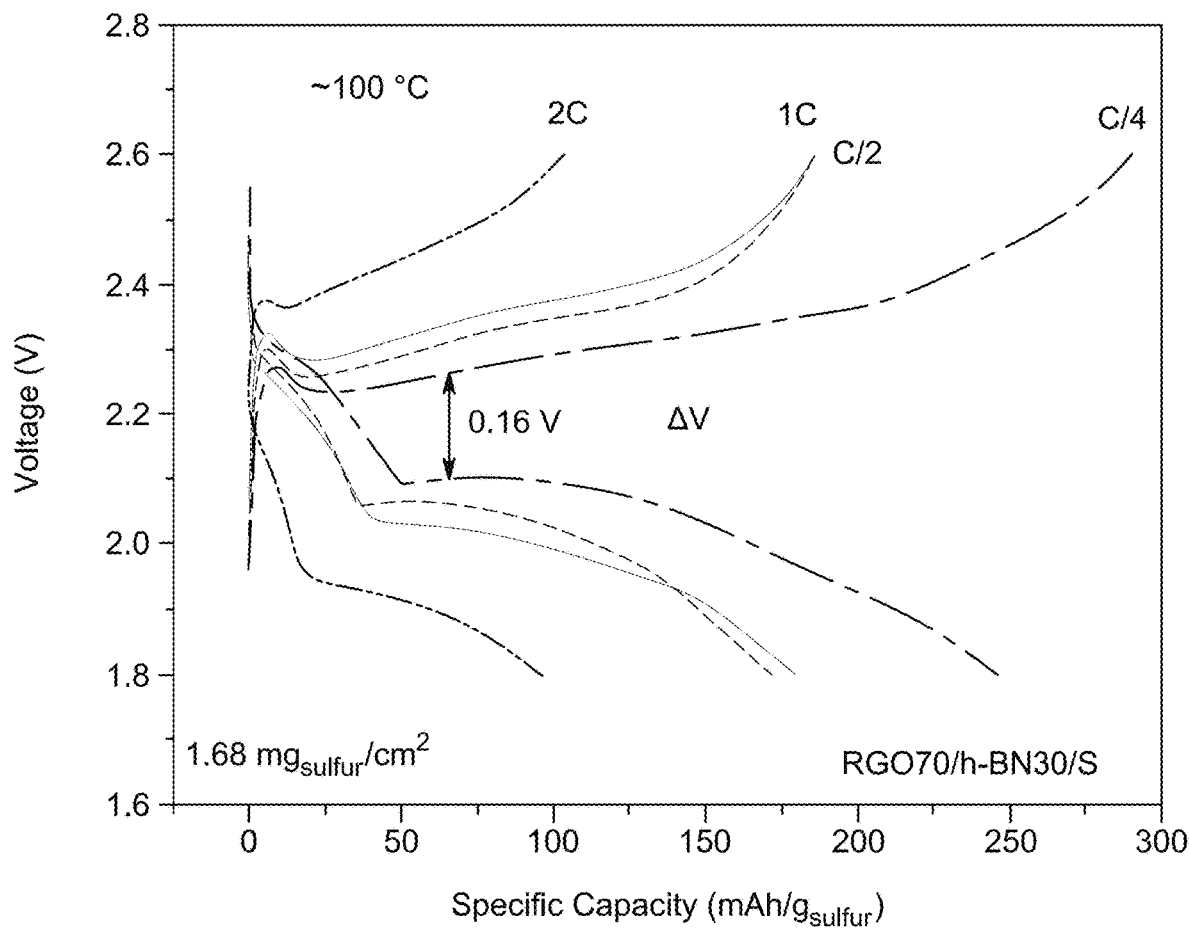
FIG. 50 is a plot of the galvanostatic charge-discharge curves for a RGO/h-BN/S nanocomposite comprising 70 wt % RGO at 100° C. and varying current rates, according to an illustrative embodiment.
Figure 51:
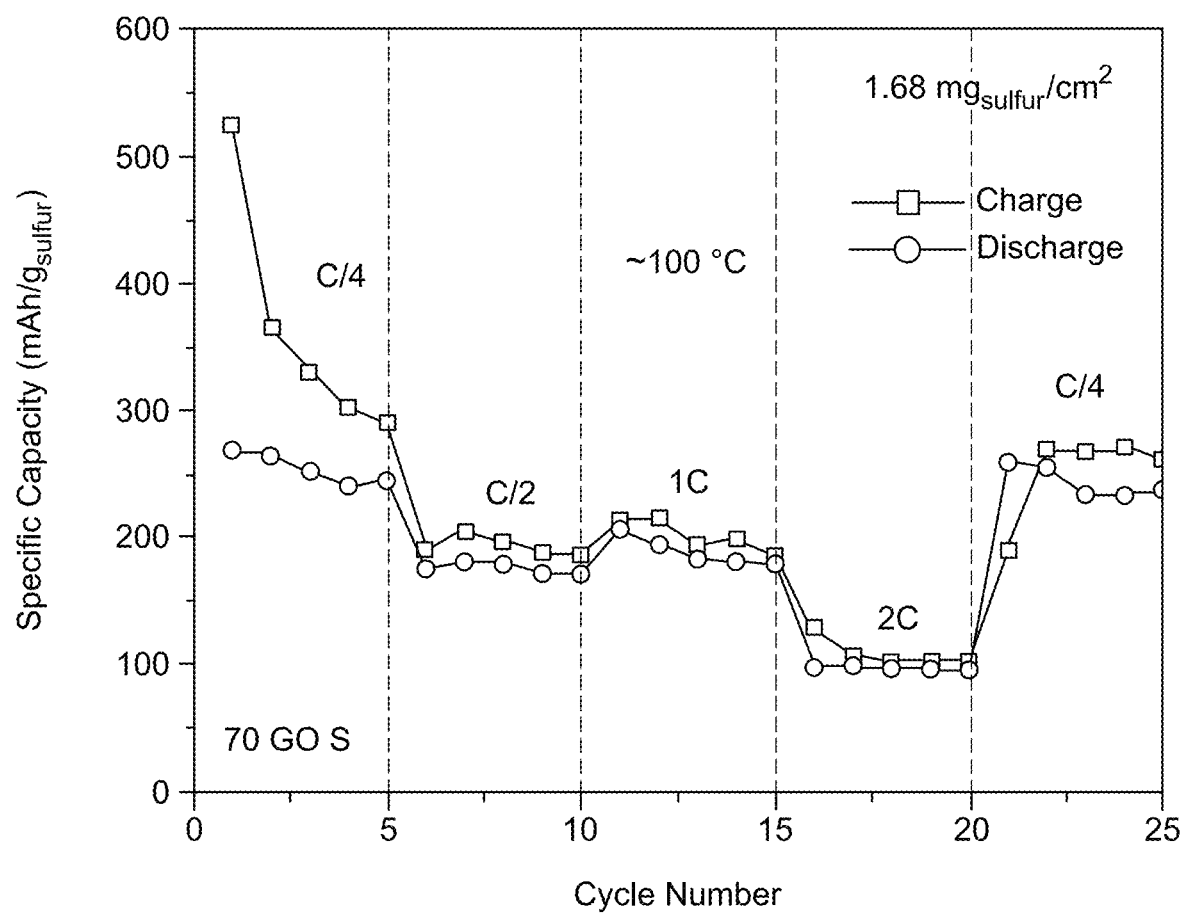
FIG. 51 is a plot of the rate capability for a RGO/h-BN/S nanocomposite comprising 70 wt % RGO at 100° C. and varying current rates, according to an illustrative embodiment.

Further electrochemical studies probed the performance of a RGO/h-BN/S nanocomposite with 70 wt % RGO at elevated temperature under different current rates. Formation cycles were performed by cycling at a current rate of C/4 at 100° C., after which a battery comprising the nanocomposite as its cathode was cycled at current densities ranging from C/4 to 2 C at 100° C. Discharge capacity of 245.11, 171.50, 179.08, and 95.75 mAh/g was measured for C-rates of C/4, C/2, 1C, and 2 C, respectively (FIG. 50). Voltage gap increased with increasing current rate, attributed to increased resistance; voltage gaps of 0.16, 0.23, 0.29, and 0.55 V were observed at C-rates of C/4, C/2, 1C, and 2 C respectively. Typical plateau shape of charge-discharge curves are observed even with high current rates, demonstrating excellent rate performance. The plot of specific capacity of these batteries over C-rates ranging from C/4 to 2 C displays high capacity retention of 90% after 25 cycles (FIG. 51).

Study 6

Figure 68:
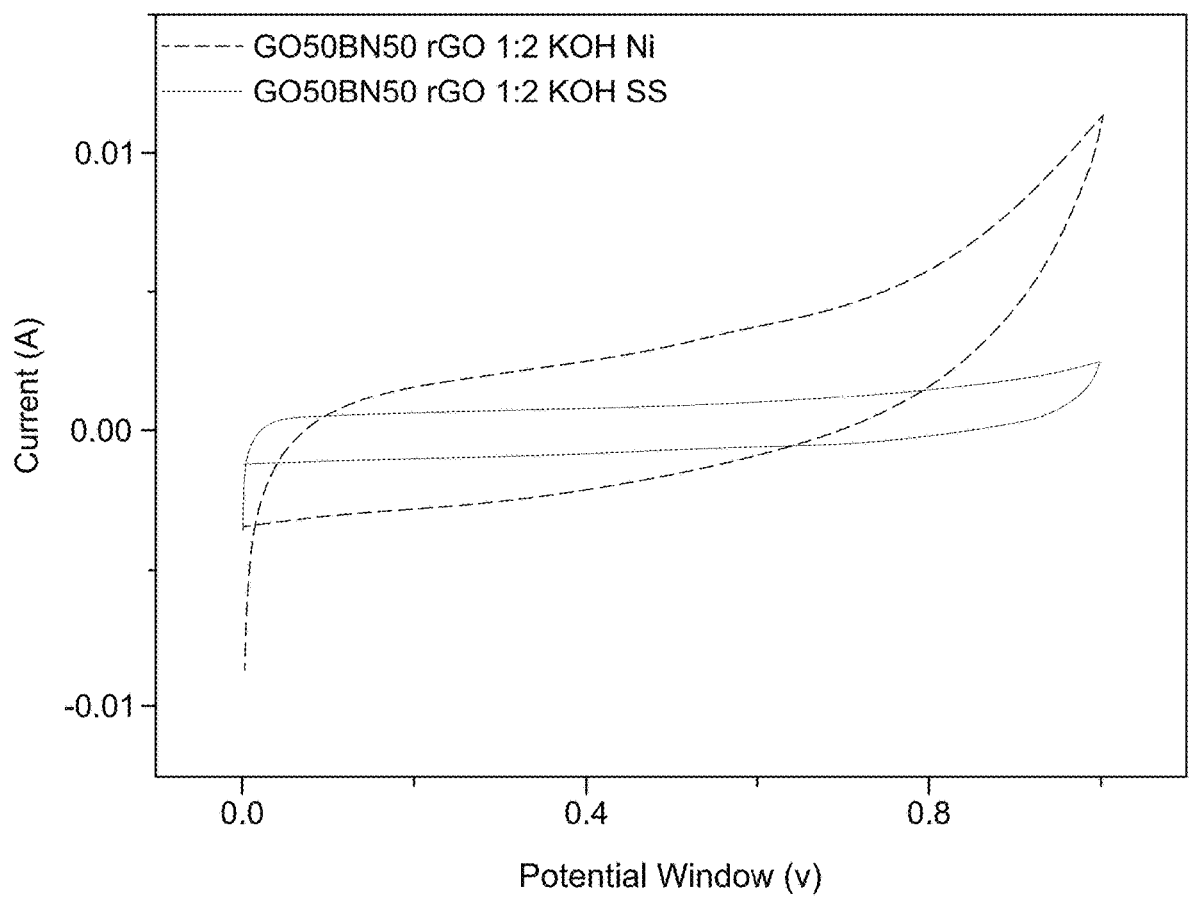
FIG. 68 is a plot of cyclic voltammograms of asymmetric supercapacitors with a 1:1 RGO/h-BN nanocomposite positive electrode prepared on a Ni or SS substrate and RGO negative electrode, with a 1:2 mass ratio of the two electrodes, a 6 M KOH electrolyte, according to an illustrative embodiment.
Figure 69:
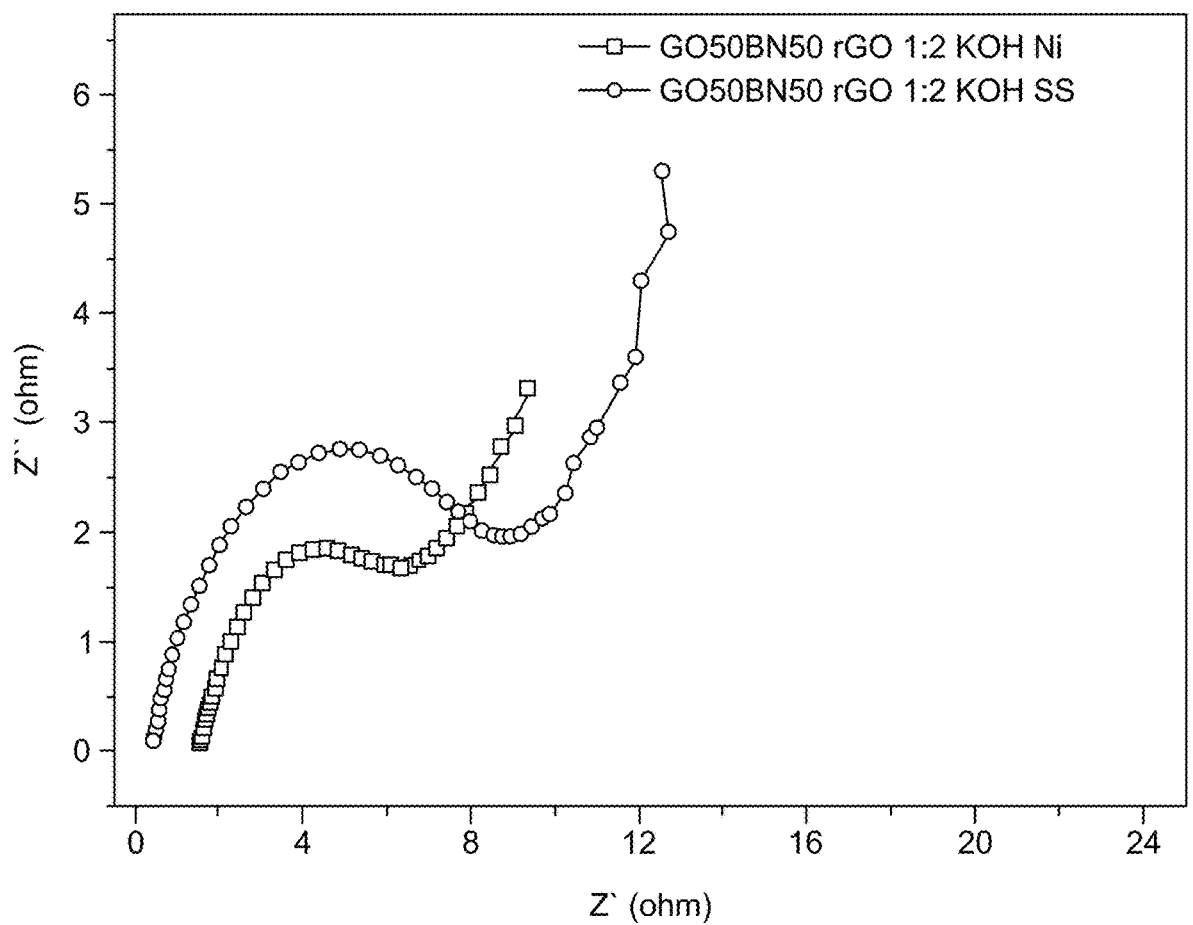
FIG. 69 is a graph depicting Nyquist plots of an asymmetric supercapacitor with a 1:1 RGO/h-BN nanocomposite positive electrode on a Ni or SS substrate and RGO negative electrode, with a 1:2 mass ratio of the two electrodes, a 6 M KOH electrolyte, according to an illustrative embodiment.

To evaluate the effect of nickel foam as a substrate for an asymmetric supercapacitor, nickel foam with 97% porosity and 350-20 g/m$^2$ areal density was used as a current collector. An asymmetric supercapacitor was constructed using a RGO/h-BN nanocomposite 3 as a positive electrode, and RGO was as a negative electrode, with a 1:2 mass ratio between the two electrodes. Measurements were collected after 2 days of soaking in electrolyte (6 M KOH). Cyclic voltammetry was collected using both nickel foam and stainless steel as electrode substrates (FIG. 68). Specific capacitance for the Ni and SS substrates was measured as 35 and 80.7, respectively. EIS measurements yielded a decrease in solution resistance from Ni to SS as substrate, 1.7 and 0.56Ω, respectively; however an increase in charge transfer resistance from Ni to SS was observed, 5.1 and 7.6Ω, respectively, attributed to increased conductivity of Ni (FIG. 69).

Figure 70:
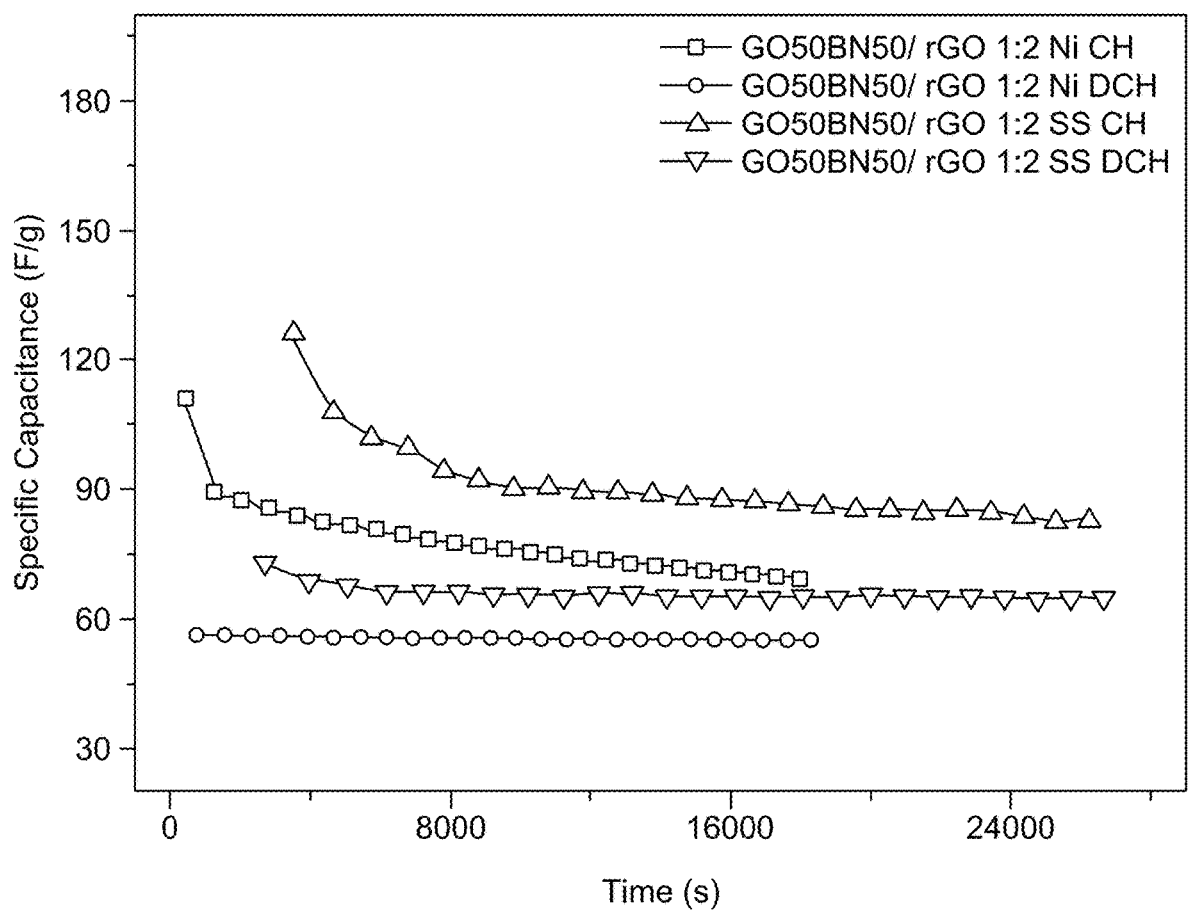
FIG. 70 is a plot of galvanostatic charge-discharge curves for an asymmetric supercapacitor with a 1:1 RGO/h-BN nanocomposite positive electrode on a Ni or SS substrate and RGO negative electrode, with a 1:2 mass ratio of the two electrodes and a 6 M KOH electrolyte, according to an illustrative embodiment.
Figure 71:
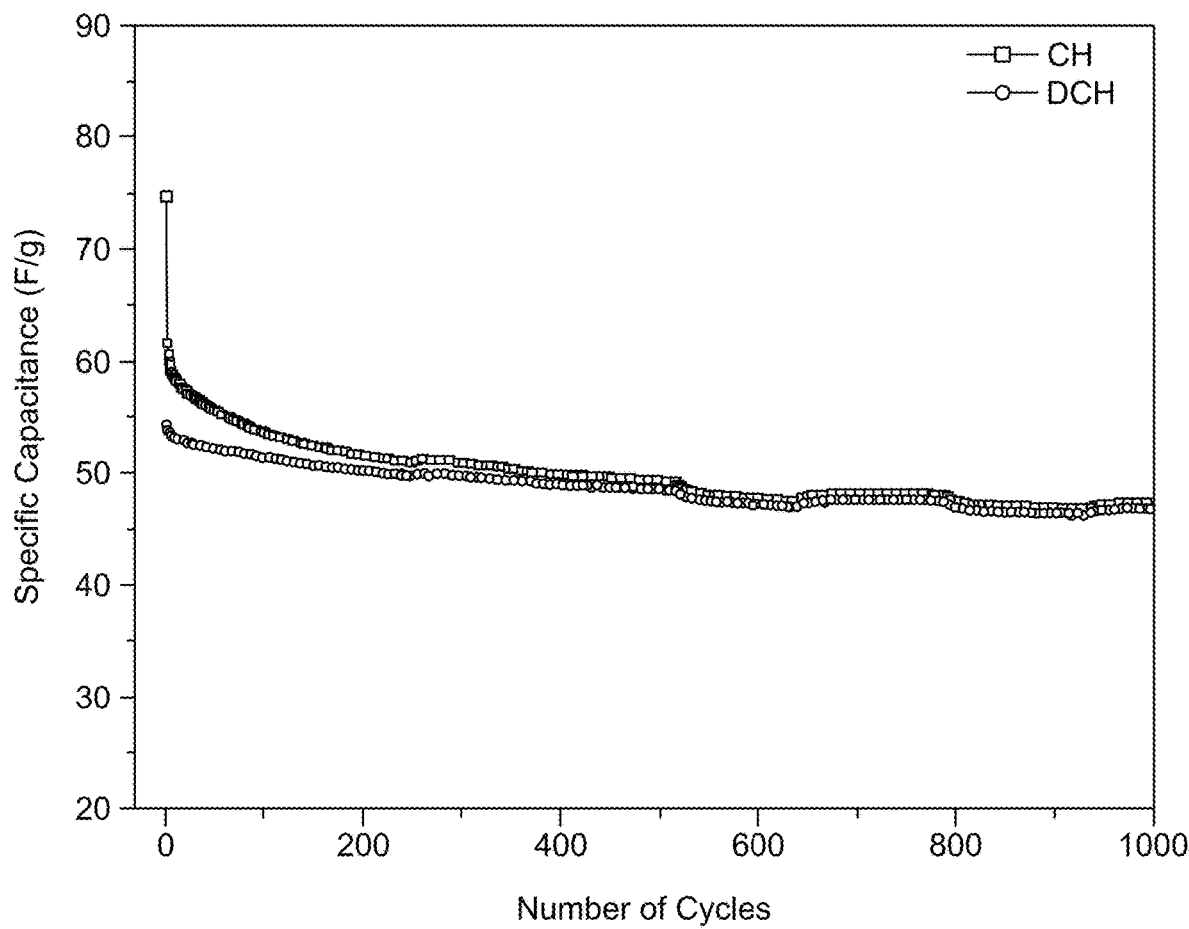
FIG. 71 is a plot of galvanostatic charge-discharge curves for an asymmetric supercapacitor with a 1:1 RGO/h-BN nanocomposite positive electrode and RGO negative electrode, with a 1:2 mass ratio of the two electrodes, at a current of 0.0017 A over 1000 cycles, according to an illustrative embodiment.

Galvanostatic charge discharge was applied to the asymmetric cells at a current density of 0.039 A/g. Good cycling stability over 25 cycles was observed with high capacitance of 70 and 82.9 F/g for Ni and SS substrates, respectively (FIG. 70). Decreased specific capacitance of the Ni substrate relative to that of the SS substrate is attributed to high mass loading on nickel foam due to its porous structure. CD of the cell with nickel foam as a substrate exhibited good stability at a high current of 0.0017 A and 86% retention of capacitance after 1000 cycles (FIG. 71), indicating stability of nickel foam as a substrate. Results of these studies are summarized in Table 11.

TABLE 11

Summary of parameters and results for Study 6

| | | |
|---|---|---|
| Material used | | 3:RGO 1:2 |
| Electrolyte | | 6 M KOH |
| Separator | | Filter paper |
| Substrate | | Ni foam |
| Soaking duration | | 2 days |
| CV potential window | | 0-1 V |
| Specific capacitance from CV (F/g) | | 35 |
| Charge-discharge | | 0-1 V |
| Current | | 0.001 A |
| Current Density | | 0.039 A/g |
| Cycle Number | | 25 |
| EIS | $R_\Omega$ | 1.717 |
| | $R_{ct}$ | 5.108 |
| Specific capacitance from CD (F/g) | | 70 | ing of: (1) 90% $Co_3O_4$ and 10% RGO/h-BN nanocomposite 1 (9:1 RGO to h-BN), (2) 90% $Co_3O_4$ and 10% RGO/h-BN nanocomposite 2 (7:3 RGO to h-BN), (3) 90% $Co_3O_4$ and 10% RGO/h-BN nanocomposite 3 (1:1 RGO to h-BN), and (4) 100% $Co_3O_4$.

Figure 41:
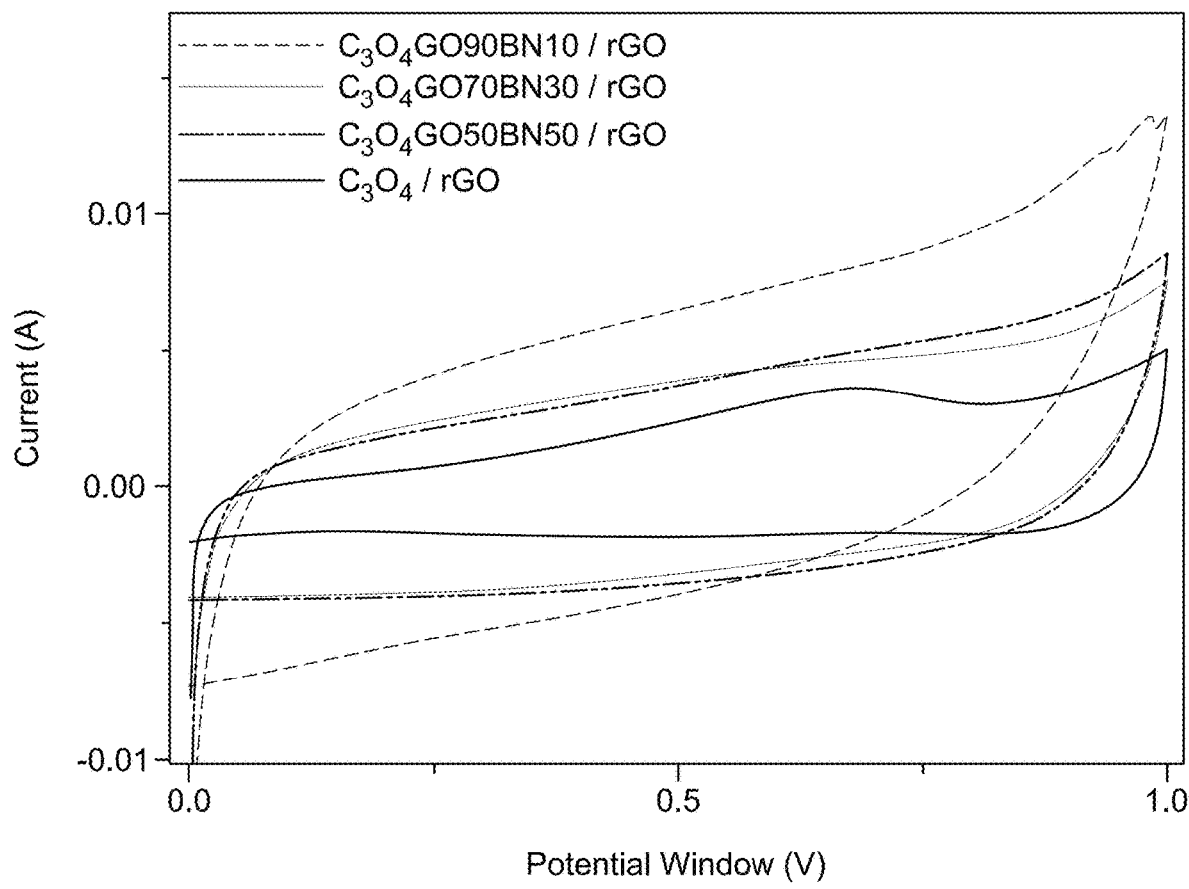
FIG. 41 is a plot of cyclic voltammograms of asymmetric supercapacitor cells with electrodes comprising $Co_3O_4$ and $Co_3O_4$/RGO/h-BN nanocomposites, according to an illustrative embodiment.
Figure 42:
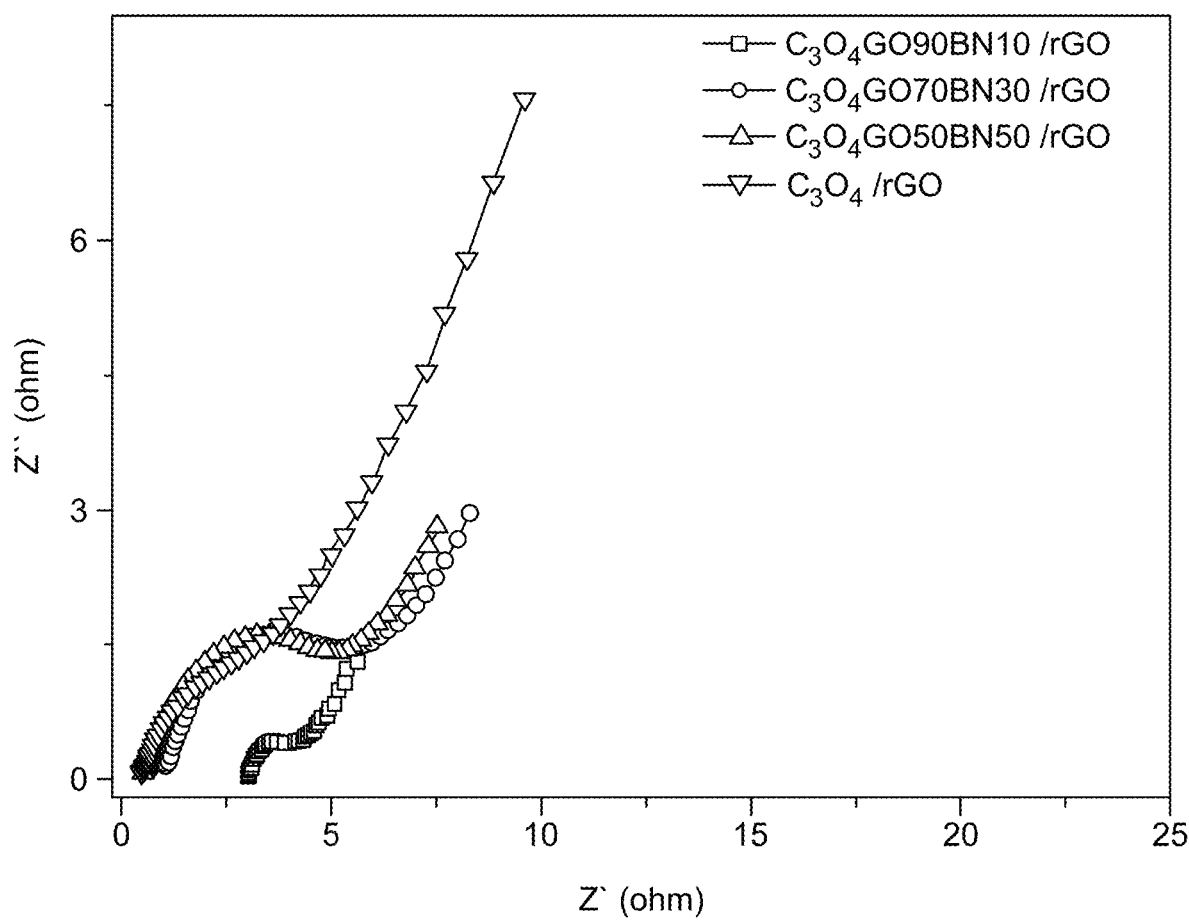
FIG. 42 is a graph depicting Nyquist plots of asymmetric supercapacitor cells with electrodes comprising $Co_3O_4$ and $Co_3O_4$/RGO/h-BN nanocomposites, according to an illustrative embodiment.
Figure 72:
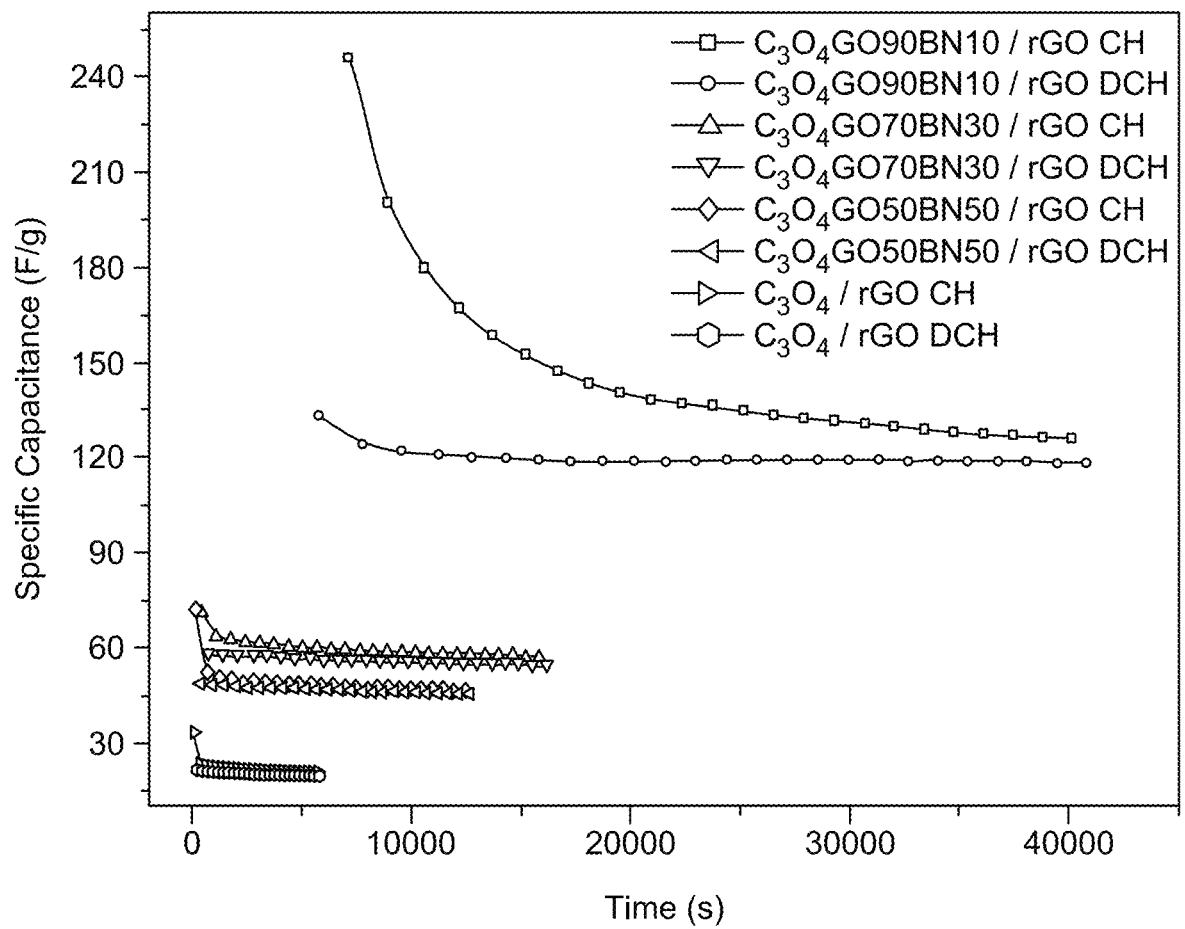
FIG. 72 is a plot of galvanostatic charge-discharge curves for an asymmetric supercapacitor with a $Co_3O_4$ or $Co_3O_4$/RGO/h-BN nanocomposite positive electrode and RGO negative electrode at a current density of 45 mA/g, according to an illustrative embodiment.
Figure 73:
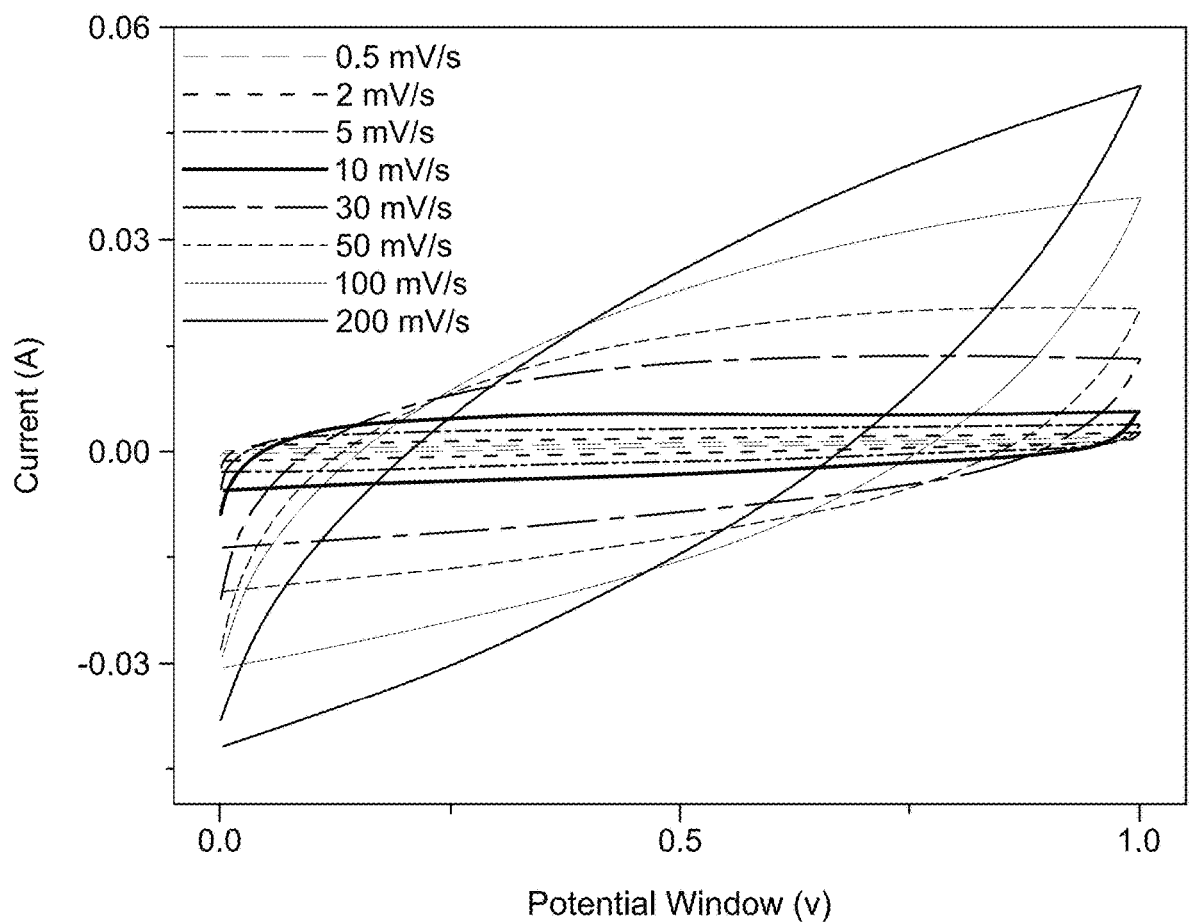
FIG. 73 is a plot of cyclic voltammograms of an asymmetric supercapacitor cell comprising a $Co_3O_4$/RGO/h-BN nanocomposite, according to an illustrative embodiment.
Figure 74:
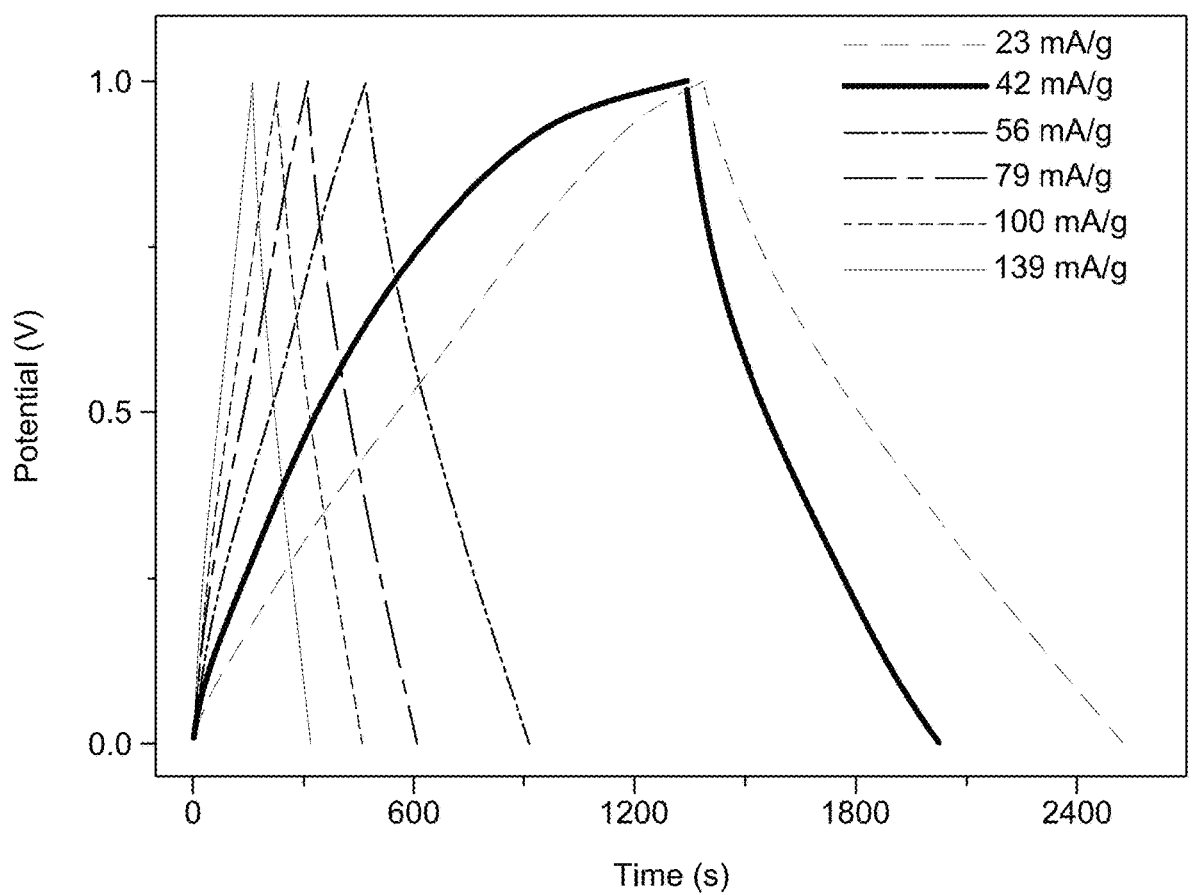
FIG. 74 is a plot of a charge/discharge cycle of an asymmetric supercapacitor cell comprising a $Co_3O_4$/RGO/h-BN nanocomposite positive electrode and RGO negative electrode, according to an illustrative embodiment.
Figure 75:
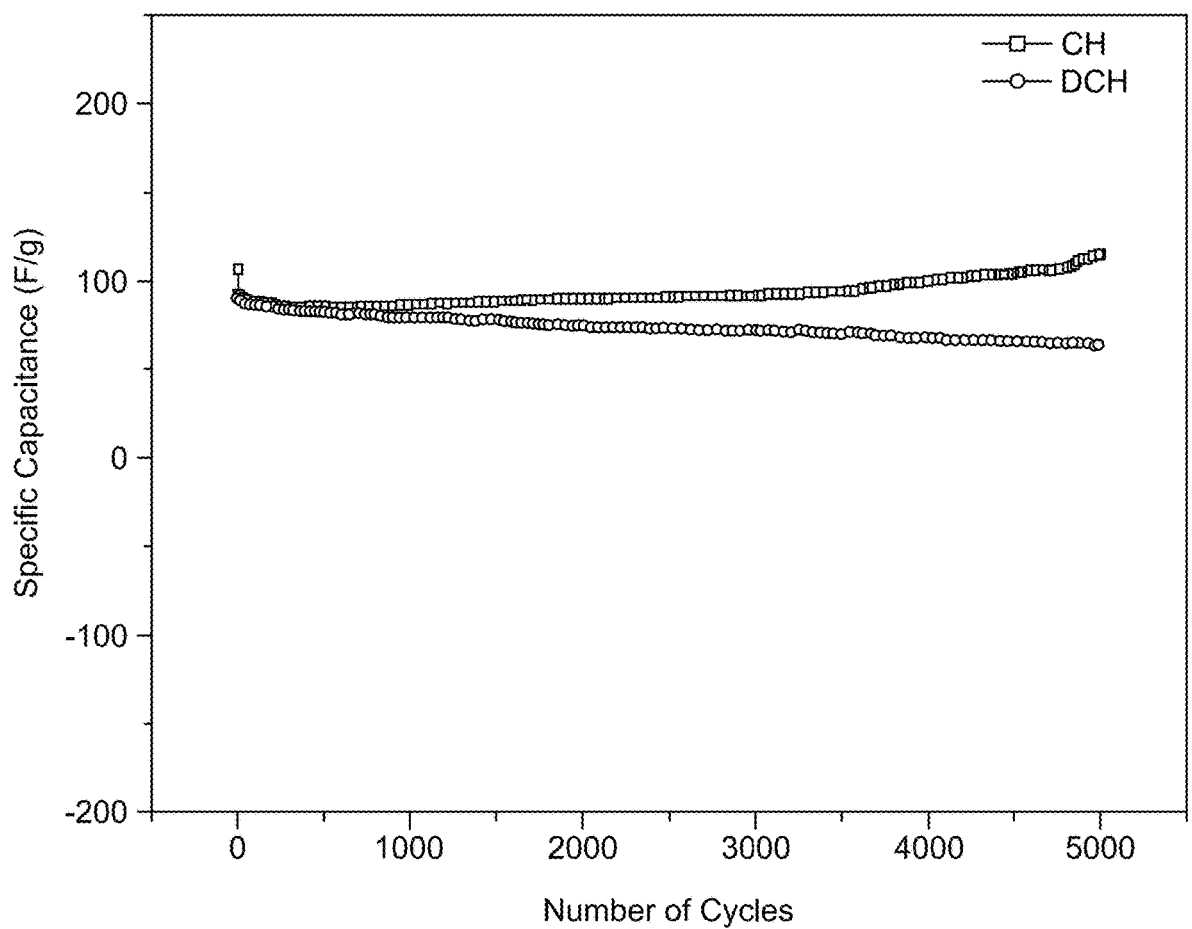
FIG. 75 is a plot of galvanostatic charge-discharge curves for an asymmetric supercapacitor with a $Co_3O_4$/RGO/h-BN nanocomposite positive electrode and a current density of 139 mA/g for 5000 cycles, according to an illustrative embodiment.

Cells were constructed with a filter paper separator and 6 M KOH as electrolyte. Measurements were collected after two days of soaking in electrolyte. All samples exhibited good electrochemical behavior by cyclic voltammetry over a potential window of 0 to 1 V. Specific capacitance was measured from CV as 80.74, 48.22, 40, and 22.7 for cells (1)-(4), respectively (FIG. 41). Increase in specific capacitance was observed with increasing RGO content. EIS measurements of the cells indicated good compatibility with electrolyte with the exception of sample (1), which exhibited a higher solution resistance of about 3.2Ω (FIG. 42). Charge transfer resistance was measured as 1.5, 4.5, 4.2, 3.6Ω for cells (1)-(4), respectively, where cell 1 exhibits the lowest charge transfer. Galvanostatic charge-discharge was applied to cells at a current density of 45 mA/g for 25 cycle. Specific capacitance was measured from CD as 132, 58.7, 48.7, and 21.3 F/g for cells (1)-(4), respectively (FIG. 72). Increase in specific capacitance was observed with increasing RGO content. Notably, the best specific capacitance and lowest charge transfer resistance was observed for the asymmetric cell comprising 9:1 RGO/h-BN in the positive electrode. Good electrochemical behavior of the asymmetric cell (1) was seen over scan rates spanning 0.5 to 200 mV/s, with increasing peak current corresponding to increasing scan rate. Symmetric curve shape across all scan rates, indicates electrochemical reversibility even at higher scan rates (FIG. 73). Galvanostatic charge-discharge was applied with current densities of 23, 42, 56, 79, 100, and 139 mA/g over a potential window of 0 to 1 V (FIG. 74). No IR drop was observed. To probe the stability of the asymmetric cell, galvanostatic charge-discharge was applied with a current density of 139 mA/g for 5000 cycles (FIG. 75). A long cycling life was indicated by the 71% capacity retention after 5000 cycles. Results of these studies are summarized in Table 12.

TABLE 12

Summary of parameters and results for Study 7

| Material Used | (9:1 $Co_3O_4$:1):RGO 1:2 | (9:1 $Co_3O_4$:2):RGO 1:2 | (9:1 $Co_3O_4$:3):RGO 1:2 | $Co_3O_4$:RGO 1:2 |
|---|---|---|---|---|
| Electrolyte | | 2 M KOH | | |
| Separator | | Filter paper | | |
| Substrate | | Nickel foam | | |
| Soaking Duration | | 2 days | | |
| CV potential | | 0-1 V | | |
| Specific capacitance from CV (F/g) | 80.74 F/g | 48.22 F/g | 40 F/g | 22.7 F/g |
| Charge-discharge | | 0-1 V | | |
| Current | 0.000972 A | 0.0011 | 0.0014 | 0.0014 |
| Current density | | 0.045 A/g | | |
| Cycle number | | 25 | | |
| EIS $R_\Omega$ | 3.189 | 1.18 | 0.6468 | 0.6126 |
| $R_{ct}$ | 1.521 | 4.55 | 4.29 | 3.625 |
| Specific capacitance from CD (F/g) | 132 F/g | 58.7 F/g | 48.75 F/g | 21.3 F/g |

Study 7

To study the effect of RGO/h-BN nanocomposites on a $Co_3O_4$ supercapacitor, four asymmetric supercapacitor cells were constructed with RGO as a negative electrode and a positive electrode deposited on a Ni foam substrate consist-

What is claimed is:

1. A nanocomposite comprising:
   one or more 2D layers of a carbon material;
   one or more 2D layers of hexagonal boron nitride material; and sulfur,
wherein sulfur makes up between 40% and 90% by weight of the nanocomposite,
wherein a weight ratio of the carbon material to the hexagonal boron nitride material is between 1:99 and 99:1, and
wherein the nanocomposite is characterized in that the nanocomposite is thermally stable at a temperature of about 100° C. to about 450° C., as measured by the thermogravimetric analysis.

2. The nanocomposite of claim 1, wherein the weight ratio of the 2D carbon material to the hexagonal boron nitride material is between 1:9 and 9:1.

3. The nanocomposite of claim 1, wherein the 2D carbon material is selected from the group consisting of reduced graphene oxide, graphene, and graphene oxide, or combinations thereof.

4. The nanocomposite of claim 1, wherein the 2D carbon material is reduced graphene oxide.

5. The nanocomposite of claim 1, further comprising $Co_3O_4$.

6. An electrode including the nanocomposite of claim 1.

7. A supercapacitor including an anode, a cathode, an electrolyte and a separator between the anode and the cathode, wherein the cathode includes the nanocomposite of claim 1.

8. A supercapacitor including an anode, a cathode, an electrolyte and a separator between the anode and the cathode, wherein the cathode includes the nanocomposite of claim 1.

9. A supercapacitor including an anode, a cathode, an electrolyte and a separator between the anode and the cathode, wherein the cathode includes the nanocomposite of claim 1.

10. A lithium-sulfur battery including an anode, a cathode, an electrolyte, an electrolyte and a separator between the anode and the cathode, wherein the cathode includes the nanocomposite of claim 1.

11. An electrode including the nanocomposite of claim 5.

12. The nanocomposite of claim 1, wherein the nanocomposite further includes a nickel foam substrate.

13. The nanocomposite of claim 5, wherein the nanocomposite further includes a nickel foam substrate.

14. An electrode including the nanocomposite of claim 12.

15. An electrode including the nanocomposite of claim 13.

* * * * *